(12) United States Patent
Smith

(10) Patent No.: US 6,597,924 B1
(45) Date of Patent: *Jul. 22, 2003

(54) COUPLED PORTABLE TELEPHONE/ INTERFACE MODULE

(75) Inventor: Ronald L. Smith, Temple, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/603,665

(22) Filed: Feb. 20, 1996

(51) Int. Cl.[7] .................................. H04B 1/38
(52) U.S. Cl. .................. 455/557; 379/433.05; 379/447
(58) Field of Search ............................... 455/557, 558, 455/559, 556, 550, 90, 346, 349; 379/446, 438, 447, 450, 433.05; 439/217, 218, 221, 224, 650, 502, 638, 649, 946.2, 945

(56) References Cited

U.S. PATENT DOCUMENTS

| | | | | |
|---|---|---|---|---|
| 4,255,853 A | * | 3/1981 | Campillo et al. | 439/502 |
| 5,020,090 A | * | 5/1991 | Morris | 455/556 |
| 5,263,875 A | * | 11/1993 | Spicer et al. | 439/367 |
| 5,303,291 A | * | 4/1994 | Takagi et al. | 379/433 |
| 5,333,177 A | * | 7/1994 | Braitberg et al. | 455/557 |
| 5,335,273 A | * | 8/1994 | Takagi et al. | 379/433 |
| 5,353,334 A | * | 10/1994 | O'Sullivan | 455/557 |
| 5,457,601 A | * | 10/1995 | Georgopulos et al. | 361/686 |
| 5,490,202 A | * | 2/1996 | Maekawa | 455/558 |
| 5,535,274 A | * | 7/1996 | Braitberg et al. | 379/446 |
| 5,555,287 A | * | 9/1996 | Gulick et al. | 455/557 |
| 5,566,226 A | * | 10/1996 | Mizoguchi et al. | 455/558 |
| 5,608,545 A | * | 3/1997 | Kagawa | 455/557 |
| 5,608,606 A | * | 3/1997 | Blaney | 439/946 X |
| 5,657,371 A | * | 8/1997 | Suomi et al. | 455/557 |

* cited by examiner

*Primary Examiner*—Tracy Legree
(74) *Attorney, Agent, or Firm*—Ronald O. Neerings; Wade James Brady, III; Frederick J. Telecky, Jr.

(57) ABSTRACT

The present invention provides a solution to the dual problems of mobility and portability associated with using a portable telephone in combination with a portable computer in a telecommunications environment. The invention comprises a coupled portable telephone(16)/interface module (40) that may be directly coupled to a portable computer (62). The interface module (40) portion of the invention includes a first interface (44) for coupling to an interface (34) on a portable telephone (16) and a second interface (58) for coupling to an interface (68) on a portable computer (62). The interface module (40) facilitates a direct connection between a coupled portable telephone (16)/interface module (40) and a portable computer (62). When the second interface (58) is directly connected to the interface (68) on a portable computer, the interface module (40) electrically couples the portable telephone (16) to the portable computer (62) thus eliminating the need for a cable or tethered connection between the portable computer (62) and portable telephone (16). In one embodiment of the invention, the interface module (40) is constructed to fit within a cavity (76) in the portable computer (62). In another embodiment of the invention, the interface module portion of the coupled interface module/portable computer (60) facilitates a physical connection to the portable computer (62) by a latching mechanism when full inserted into the computer (62).

21 Claims, 65 Drawing Sheets

COUPLED PORTABLE TELEPHONE/ INTERFACE MODULE

FIELD OF THE INVENTION

The present invention relates to the fields of mobile telecommunications and portable computers. More specifically, the present invention relates to a coupled portable telephone/interface module.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

BACKGROUND OF THE INVENTION

The demands of modem life require many mobile workers, students and business people to carry at least one electronic device to perform their daily work. Some of the more commonly utilized electronic devices are the pager, personal digital assistant "PDA", the cellular telephone, the portable computer and a modem for the portable computer.

Figure 1:
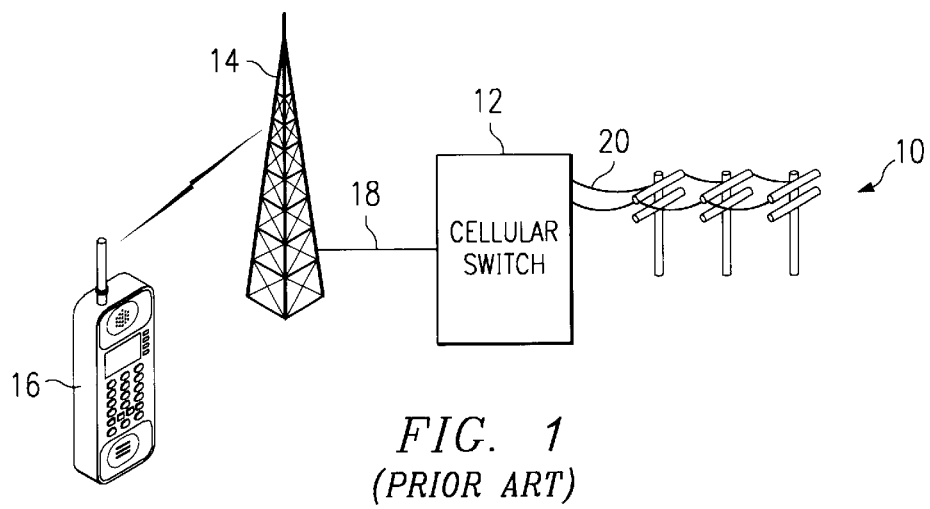
FIG. 1 illustrates a basic prior art cellular telephone network.
Figure 2:
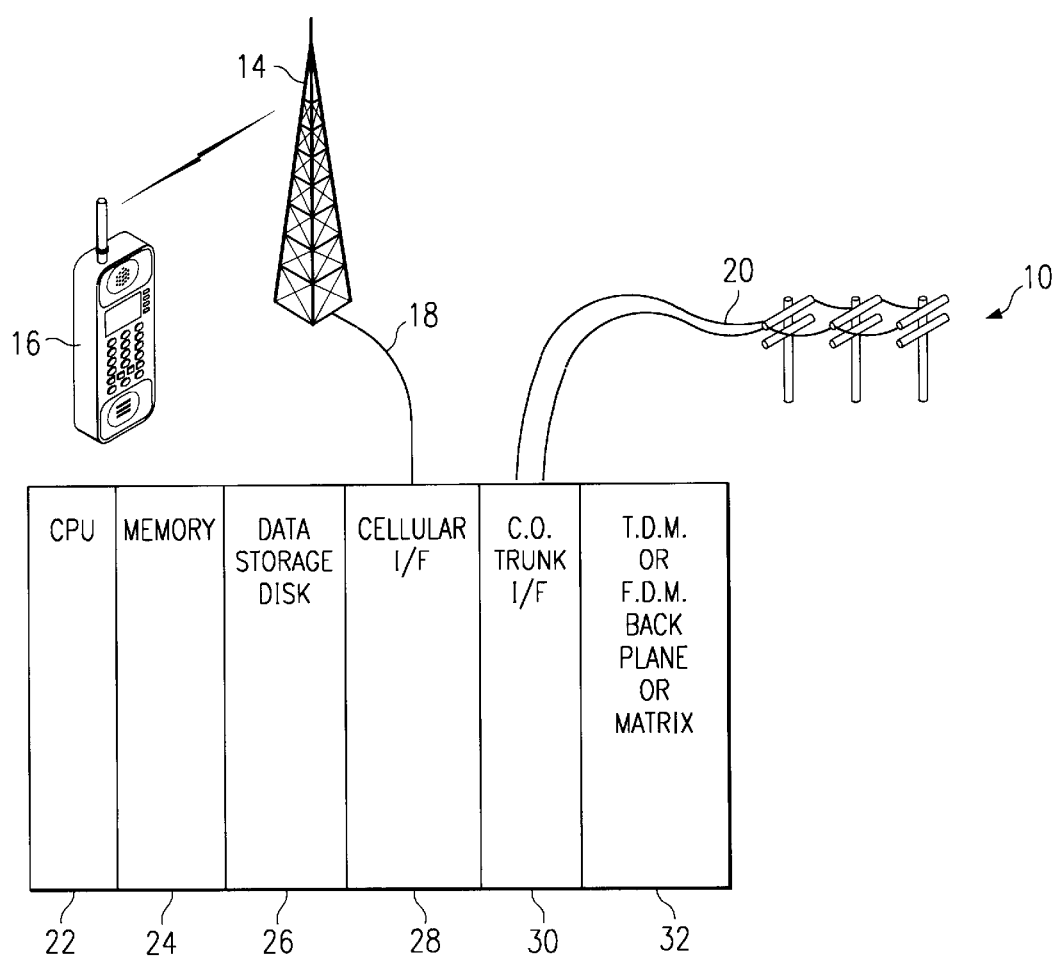
FIG. 2 is a block diagram of the cellular telephone network of FIG. 1.

Portable computers are available in various models, functionality and costs from companies like Compaq, Toshiba, and Texas Instruments. Cellular telephones are available in various sizes, shapes, functionality and cost from companies such as Motorola, Nokia and Erricson. FIG. 1 illustrates a prior art cellular network 10 having a mobile cellular telephone exchange (MTX) switch 12 connected to a transceiver and antenna 14. A transceiver is located in each cell of the cellular network and communicates with the MTX to effect transmission and reception of signals to and from the mobile/portable telephone 16. The transceiver is typically connected to the cellular switch 12 via a leased or dedicated network line 18. The cellular switch 12 is typically connected to the land-based destinations via telephone network 20. FIG. 2 is a block diagram of the telephone network of FIG. 1. The hierarchical architecture of cellular switch 12 includes a central processing unit 22, memory 24, data storage disk 26, cellular interface 28 central office trunk interface 30 and a backplane or switching matrix 32.

While hand held cellular telephones have become increasingly popular with the public over the last few years, very few hand held cellular telephones presently incorporate internal modems or ports for connecting to stand alone modems since cellular telephones have rarely been used to transmit data due to problems associated with transmitting data in a mobile environment. Numerous errors are induced into data transmission because of problems associated with cellular telephone communication. Echo and fading problems cause multiple bit errors in the data stream, and such problems occur frequently with a moving vehicle. For example, the transmitted signal may hit a building or other obstacle and bounce erratically or fade as the vehicle is shielded from the cell antenna. This high frequency of error in the data stream transmitted by cellular transmission renders the error correction protocol present in conventional wire line modems unsuitable for cellular use. Errors occur so frequently in a cellular environment that the number of repeat requests becomes large and data transmission efficiency is reduced below an acceptable amount. In some instances, errors may occur so often that a correct packet may never be received. Thus, the error correction protocol present in conventional telephone modems is unable to cope with problems presented in a cellular environment.

One solution to the problem of transmitting data in a vehicle mounted cellular telephone environment is discussed in U.S. Pat. No. 4,697,281 to O'Sullivan, herein incorporated by reference. The patent describes a cellular telephone data communication system and method involving the use of a mobile data processing interface and a cooperating static data processing interface to effectively transmit data over a cellular telephone system. Each data processing interface includes a processor which operates in the transmitting mode to add an error control correction data format to data received from an external data source. The data is divided into packets and provided to a modem which is uniquely operated to eliminate the action of the modem scramble system and remain active in spite of a carrier signal loss. The modem is deactivated or disconnected by a disconnect signal from the processor, and when carrier signal loss occurs, this disconnect signal is provided only after the lapse of a delay period without the resumption of the carrier signal. The error control correction data format causes a receiver to evaluate the received data for error and to retransmit an acknowledgment signal, the processor will again provide a data packet of received data. In the absence of an acknowledgment signal, the processor will again provide a data packet to the modem for retransmission. Also, the processor will determine the frequency of error in the received data from the acknowledgment signals and subsequently adjust the data packet size in accordance with this error frequency.

Figure 3:
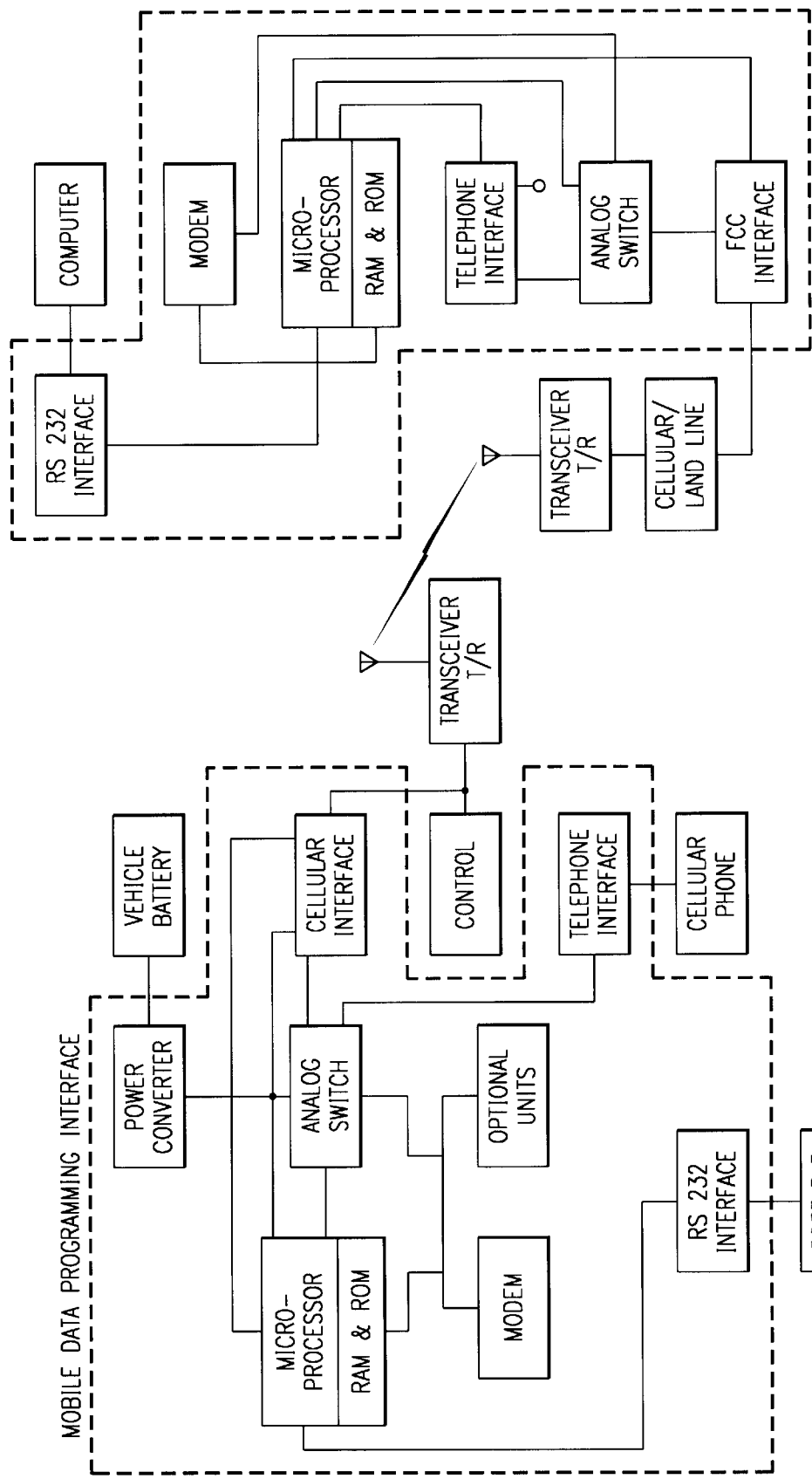
FIG. 3 is a block diagram of a prior art cellular telephone data communication system.

The portable computer disclosed in U.S. Pat. No. 4,697,281 is connected to the mobile data programming interface via a cable connected to an RS 232 interface in the mobile data programming interface, as illustrated in FIG. 3. The cable or tethered connection is fine as long as there is little movement between the portable computer and the mobile data programming interface and as long as the cable does not interfere with movement of a cellular telephone user. The problems of mobility and portability be more accurate it when the mobile phone is a hand held or portable cellular unit. Mobility is inhibited since a user of the hand held or portable cellular telephone can only move up to the distance of the cable or tethered connection from the portable computer, and when moving, the user must separately carry the portable telephone and the portable computer. Portability is inhibited since the cable or tethered connection must be removed and reattached each time the components are separated a distance greater than the cable or tethered connection. Additional problems include tripping over the cable or tethered connection, catching the cable or tethered connection on furniture, cut cables or tethered connections and worn out cable connections.

Figure 4:
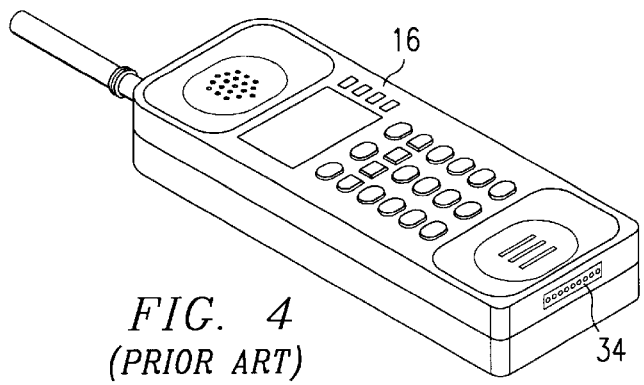
FIG. 4 illustrates a prior art cellular telephone.
Figure 5:
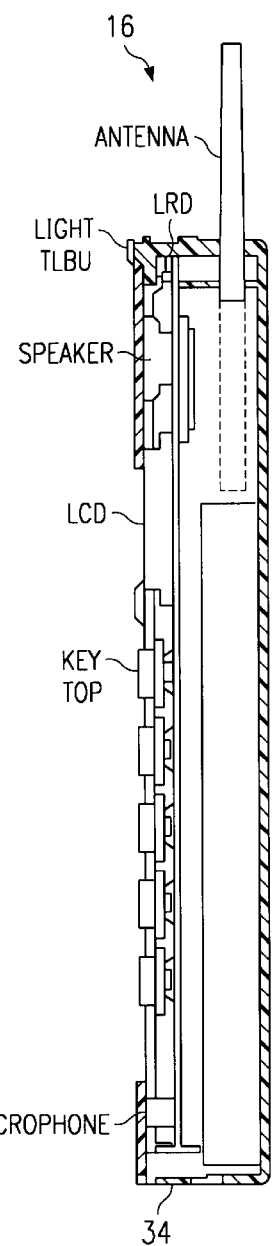
FIG. 5 illustrates an exposed side view of the telephone of FIG. 4.
Figure 6:
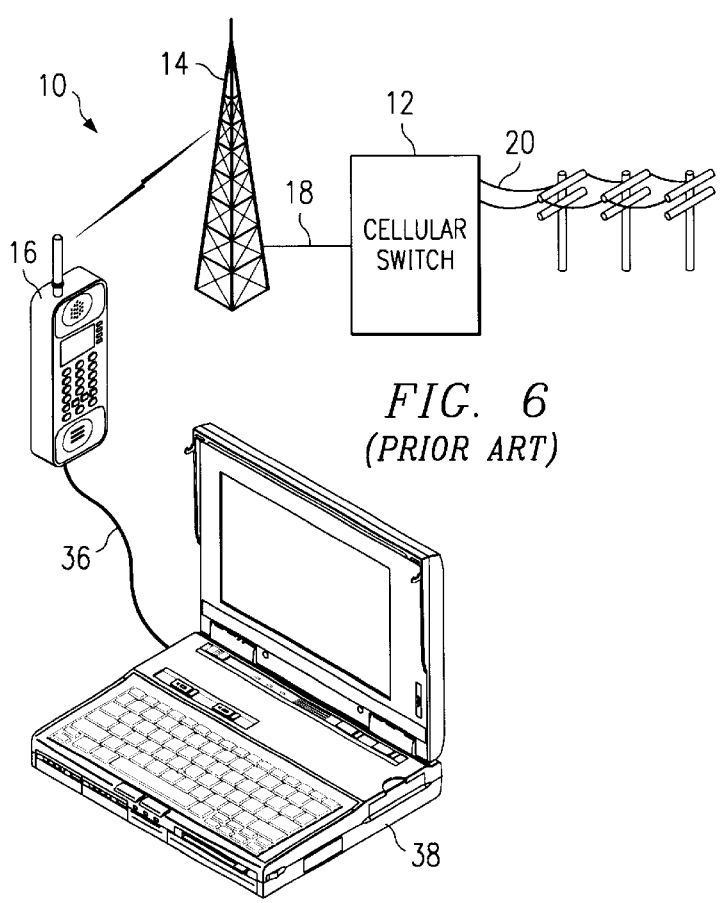
FIG. 6 illustrates a prior art cellular telephone network for transmitting/receiving data.

The same can be said for a telecommunications system that uses a cellular telephone, tethered to a portable computer, to transmit data. FIG. 4 illustrates a portable telephone 16 (cellular in the present case) having an external interface 34 that facilitates external electrical access to portable telephone 16. FIG. 5 illustrates an exposed side view of portable telephone 16. External interface 34 provides external electrical access to individual or various combinations of voice signal line(s), data signal line(s), command and/or control signal line(s), etc., depending upon the design and capability of the portable telephone 16. And while the external interface 34, as illustrated in FIG.4, is a fourteen contact connector on the bottom surface of portable telephone 16, it could just as easily be located at a different location on the telephone, have fewer or more electrical contacts, or be an assortment of individual electrical contacts not part of a connector. The electrical contacts of interface 34 can be accessed individually (typically by test equipment or as a whole with a mating connector when coupling portable telephone 16 via an electrical cable 36 to another apparatus, such as a portable computer 38, as illustrated in FIG. 6.

Thus, while the invention of U.S. Pat. No. 4,697,281 and the telecommunications system illustrated in FIG. 6 offer partial solutions problems associated with transmitting data in a cellular telephone environment, they fail to remedy mobility and portability problems caused by a cable or tethered connection between a portable telephone and a portable computer.

SUMMARY OF THE INVENTION

The present invention provides a solution to the dual problems of mobility and portability associated with using a portable telephone in combination with a portable computer. The invention comprises a coupled portable telephone/interface module that may be directly coupled to to a portable computer. The interface module portion of the invention has an external case having a one interface for directly coupling to an interface of a portable telephone and another interface for directly coupling to an interface of a portable computer. Electrical contacts on the interface module couple with electrical contacts on the portable telephone interface. The interface module may further comprise guide pins for mating with corresponding guide receptacles in the portable telephone and/or attachment prongs for mating with correspondence attachment receptacles in the portable telephone. The interface module also includes electrical contacts for coupling with corresponding electrical contacts of a portable computer interface.

The interface module is dimensioned physically such that it may be attached electrically and physically to a portable telephone and must be capable of coupling to an interface located on or in a computer. In one embodiment of the invention, the interface module is dimensioned to fit within a cavity in a portable computer so as to be able to couple with an interface located within the computer (such as a cavity that otherwise accepts a battery pack—like the front loading battery pack for the Texas Instruments TM-5000 portable computer—or other device when not utilized as a portable telephone port). The interface module (and indirectly the portable telephone which is physically connected to the interface module) is physically connected to the portable computer by a latching mechanism. Physically and electrically connecting the portable telephone to the portable computer via the interface module eliminates the need for a cable or tethered connection between a portable telephone and a computer.

The interface module may be used in embodiments of a telecommunications system wherein a portable telephone serves as a portable computer's modem and function while coupled to computer. The interface module may also be used in embodiments of a telecommunications system wherein the portable computer (and not the portable telephone), contains the modem that is utilized for telephonic data communications. In yet another embodiment of the invention, the interface module may be used in an embodiment of a telecommunications system wherein a modem may be omitted altogether omitted when the portable telephone is designed to operate in a completely digital telephone network. An operator of the coupled portable telephone/interface module also has the option of using the portable telephone for voice transmission independently of the computer, or, when coupled to an interface on the computer, may enjoy hands free voice operation by using the portable computer's internal speaker and microphone. Some embodiments of the interface module facilitate portable telephone operation on the computers internal battery/power system while installed in the portable computer and on it's own battery (charged while in the portable computer) when used independently of the portable computer.

DETAILED DESCRIPTION OF PREFERRED EMBODIMENTS

Figure 7:
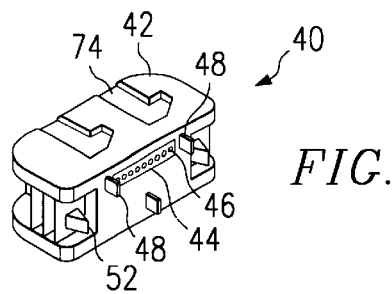
FIG. 7 illustrates an elevational view of an interface module, according to one embodiment of the invention.
Figure 8:
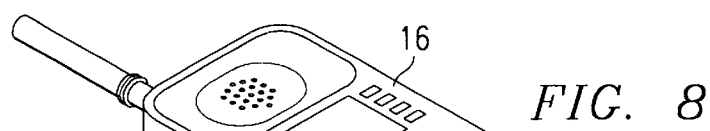
FIG. 8 illustrates an elevational view of a portable telephone having a means for electrically and mechanically coupling to the interface module of FIG. 7.

FIG. 7 illustrates an interface module 40 for a portable telephone 16 that facilitates direct portable telephone/portable computer coupling. The interface module has an external case 42 (manufactured out of plastic in the present embodiment of the invention) having an interface 44 for directly coupling to an external interface 34 of a portable telephone 16. Interface 44 is illustrated as having 14 pins, but could have any number of pins 46 or other type of electrical contacts so longs as they provide a mechanism for coupling with the electrical contacts 47 of external interface 34. Interface module 40 further comprises guide pins 48 for mating with corresponding guide receptacles 50 in portable telephone 16 and attachment prongs 52 for mating with correspondence attachment receptacles 54 in portable telephone 16, as illustrated in FIG. 8.

Figure 9:
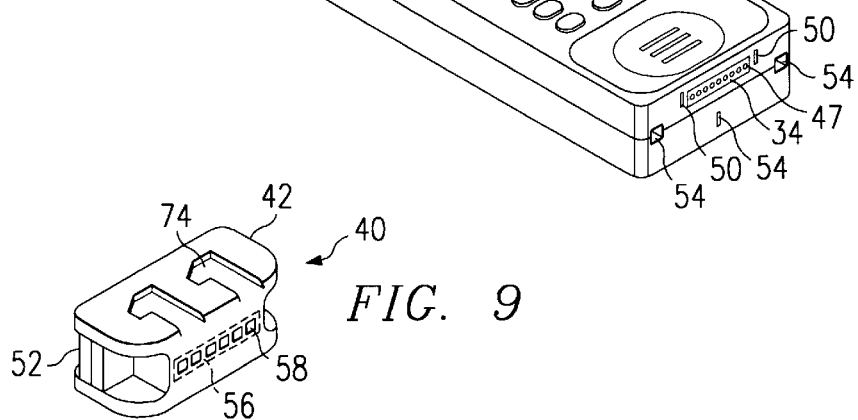
FIG. 9 illustrates an elevational view of the interface module from an angle 180 degrees opposite the view shown in FIG. 7.
Figure 10:
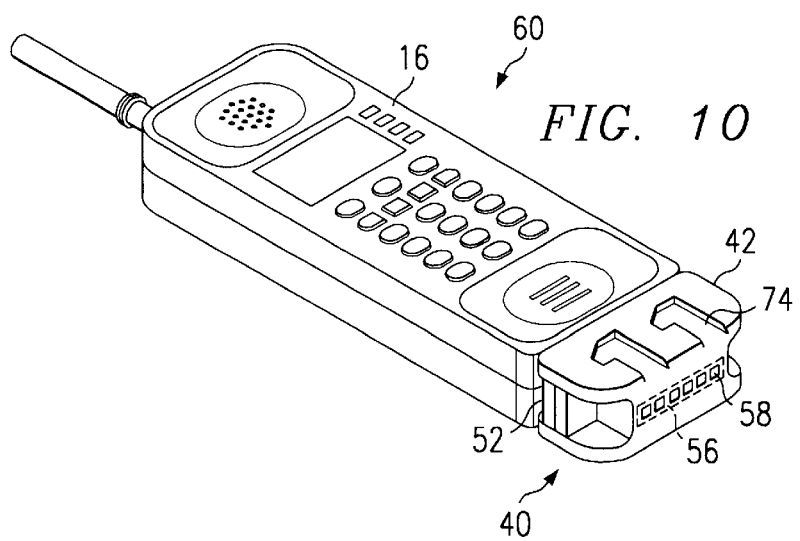
FIG. 10 illustrates an elevational view of the interface module of FIGS. 7 and 9 coupled to the telephone of FIG. 8, according a preferred embodiment of the invention.

FIG. 9 illustrates an interface 56, comprising electrical contacts 58, that facilitates direct coupling of interface module 40 and an electrical interface of a portable computer. In the embodiment of the invention illustrated in FIG. 9, interface 56 is on a surface of interface module 40 opposite interface 44. FIG. 10 illustrates a coupled portable telephone 16 and interface module 40, generally at 60. Attachment prongs 52 secure interface module 40 to portable telephone 16 when attachment prongs 52 engage with attachment receptacles 54.

Figure 11:
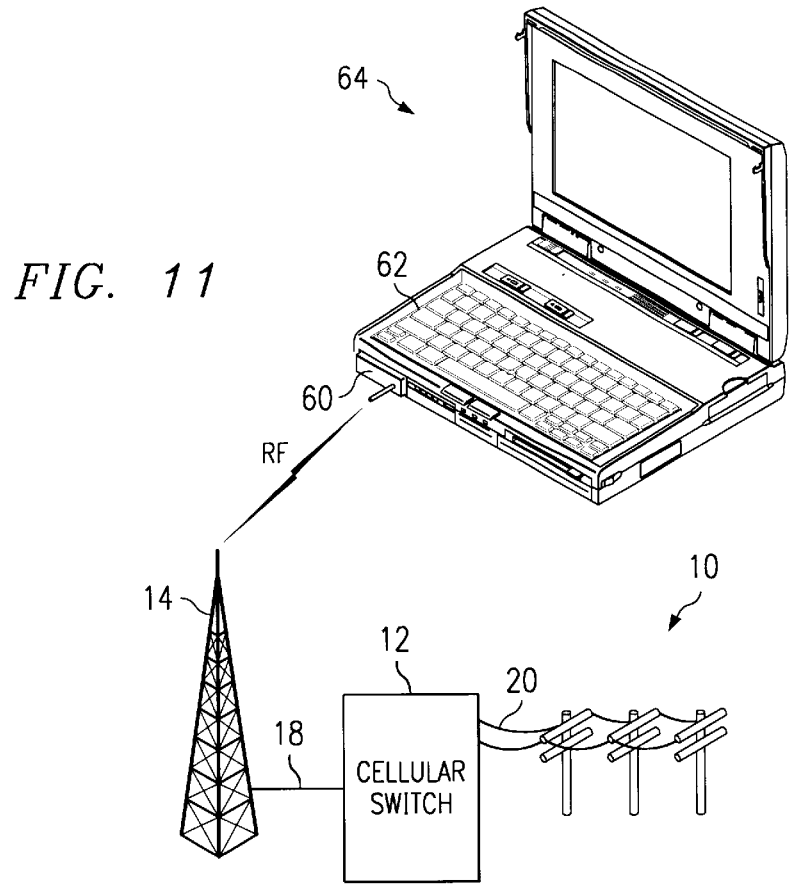
FIG. 11 illustrates a cellular telephone network for transmitting/receiving voice and data signals, according to a preferred embodiment of the invention.
Figure 12:
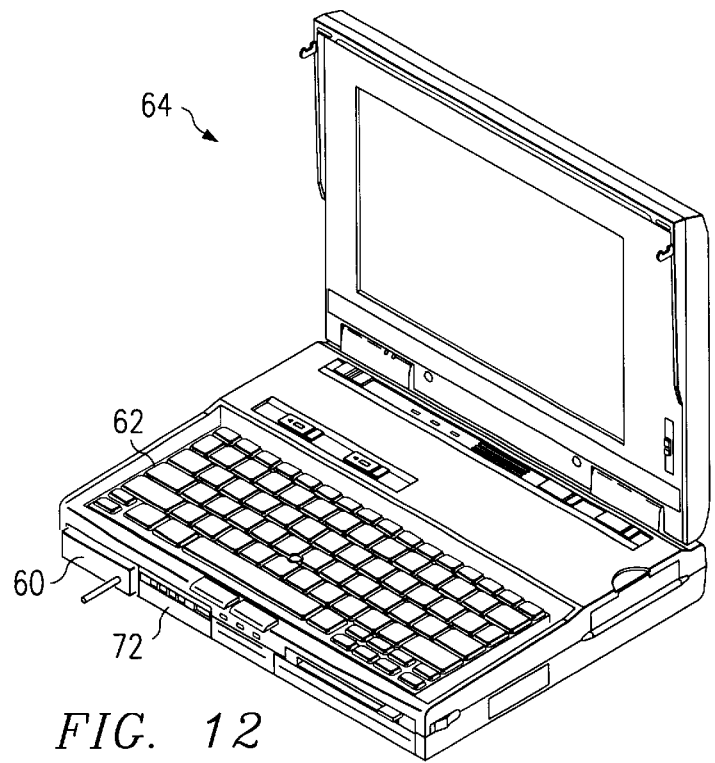
FIG. 12 illustrates a coupled portable telephone/interface module installed within a portable computer, according to a preferred embodiment of the invention.
Figure 13:
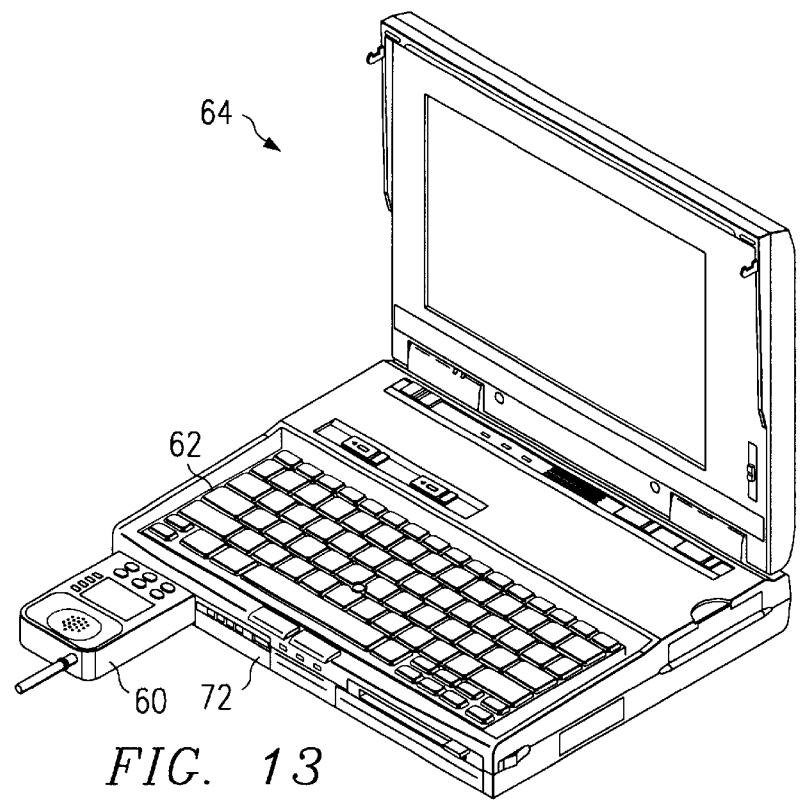
FIG. 13 illustrates the coupled portable telephone/interface module partially removed from a portable computer.

The size and thickness of the coupled portable telephone/interface module 60 can be dimensioned to make it ideally suited to fit within a cavity in a portable computer 62 (such a cavity in the Texas Instruments TM-5000 portable computer, the cavity otherwise accepting a battery pack when not being utilized as a portable telephone port). Interface 56 mates with a corresponding electrical interface within portable computer 62. The resulting coupled portable computer/interface module/portable telephone 64 is illustrated in FIG. 1. FIG. 12 illustrates an enlarged view of the portable computer/interface module/portable telephone combination 64 (A portable telephone, an interface module attached to the portable telephone and Texas Instruments Inc.'s TM-5000 portable computer), as shown in FIG. 11. FIG. 13 illustrates the portable telephone/interface module 60 partially removed from portable computer 62.

Figure 14:
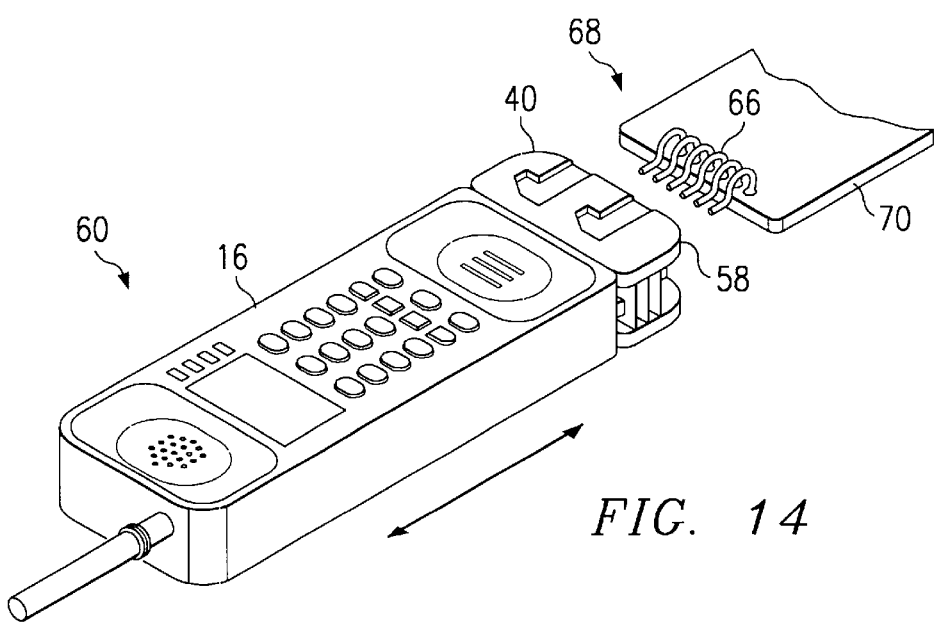
FIG. 14 illustrates a method of coupling contacts on the coupled portable telephone/interface module to electrical contacts on an interface in a computer, according to a preferred embodiment of the invention.
Figure 15:
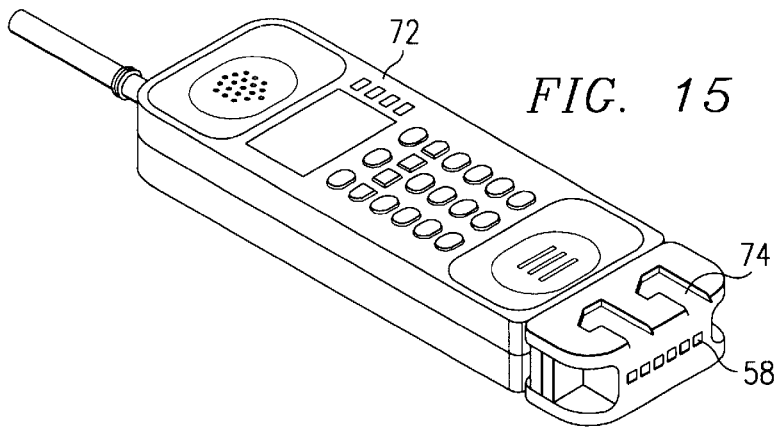
FIG. 15 illustrates a battery module that may be coupled to electrical contacts on an interface in a computer.
Figure 16:
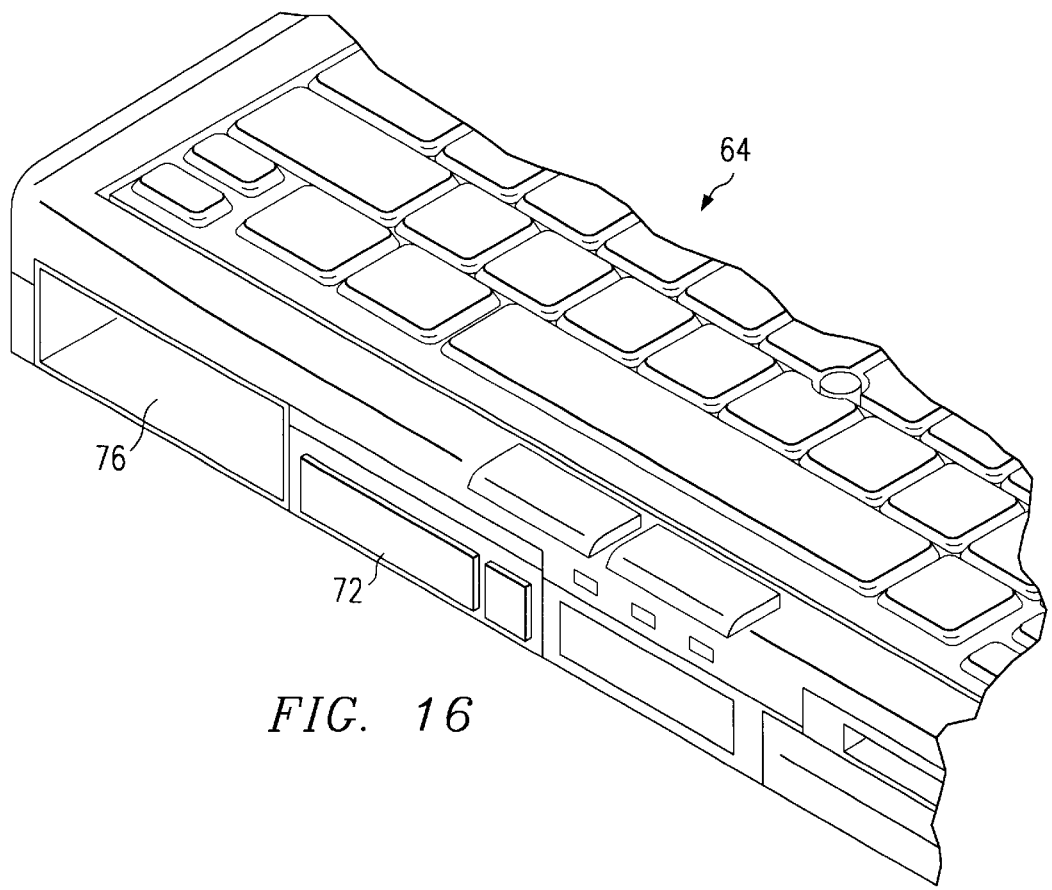
FIG. 16 illustrates a partial elevational view of a computer having a void or cavity within which the coupled portable telephone/interface module may be inserted in order to interface with the computer, according to a preferred embodiment of the invention.

Electrical contacts 58 in interface 56 mate with corresponding electrical contacts 66 in interface 68 in portable computer 62. In the embodiment of the invention illustrated in FIG. 14, electrical contacts 66 are individual curved contacts each soldered or otherwise electrically and physically connected to a circuit board 70 within the portable computer. Contacts 66 provide an electrical connection and a spring tension force against electrical contacts 58 when either portable computer/interface module/portable telephone 64 or battery 72, illustrated in FIG. 15, is fully inserted within a cavity 76, illustrated in FIG. 16, in portable computer 64. The spring tension force makes removal of the interface module/portable telephone 60 or battery 72 easier when a latch within the cavity is released from latch locking bracket 74. And while electrical contacts 58 have been shown as individual contacts being formed in the bottom of interface module 40, and electrical contacts 66 have been shown as being curved individual contacts electrically and physically connected to a circuit board in portable computer 64, commercially available or customized electrical connectors can be used in lieu of the electrical contacts disclosed.

Figure 17:
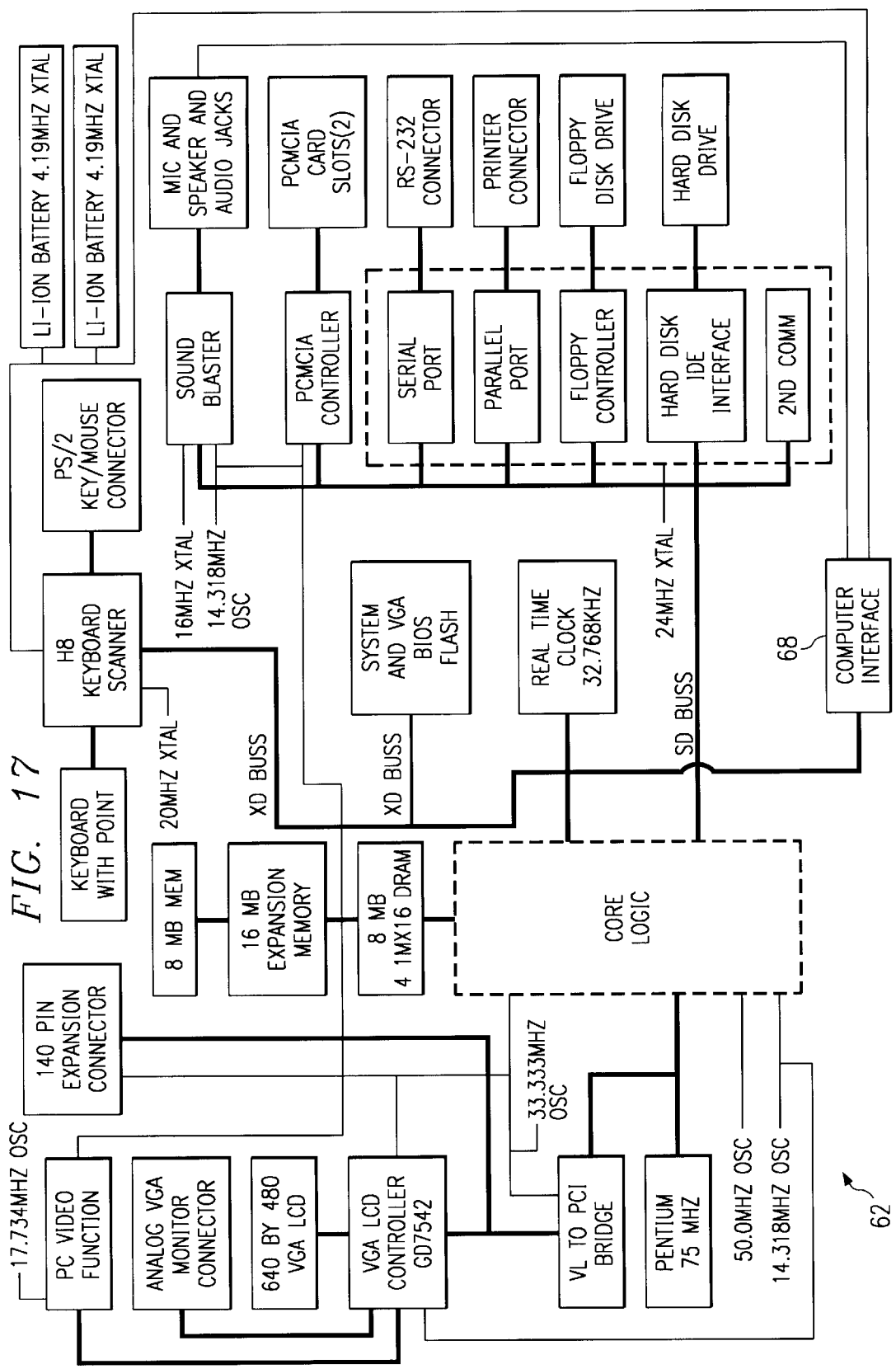
FIG. 17 illustrates a block diagram of a computer to which the coupled portable telephone/interface module may be coupled, according to one embodiment of the invention.

FIG. 17 is a block diagram of one embodiment of portable computer 62. Portable computer 62 is a color portable notebook computer based upon the Intel Pentium microprocessor. Operating speed of the Pentium is 75 Mhz internal to the processor but with a 50 Mhz external bus speed. A 50 Mhz oscillator is supplied to the ACC Microelectronics 2056 core logic chip which in turn uses this to supply the microprocessor. This 50 Mhz CPU clock is multiplied by a phase locked loop internal to the processor to achieve the 75 Mhz CPU speed. the management features of the present invention may cause the CPU clock to stop periodically to conserve power consumption which reduces CPU temperature. The processor contains 16 KB of internal cache and 256 KB of external cache on the logic board.

The 50 Mhz bus of the CPU is connected to a VL to PCI bridge chip from ACC microelectronics to generate the PCI bus. The bridge chip takes a 33.333 Mhz oscillator to make the PCI bus clock. The Cirrus Logic GD7542 video controller is driven from this bus and this bus has an external connector for future docking options. The GD542 video controller is driven from this bus and this bus has an external connector for future docking options. The GD542 video controller has a 14.318 Mhz oscillator input which is uses internally to synthesize the higher video frequencies necessary to drive an internal 10.4" TFT panel may be operated at the same time as the external analog monitor. For Super VGA resolutions only the external CRT may be used.

Operation input to portable computer 62 is made through the keyboard. An internal pointing device is imbedded in the keyboard. External connections are provided for a parallel device, a serial device, a PS/2 mouse or keyboard, a VGA monitor, and the expansion bus. Internal connections are made for a Hard Disk Drive, a Floppy Disk Drive, and additional memory. Portable computer 62 contains 8 Megabytes of standard memory which may be increased by the user up to 32 Megabytes by installing optional expansion memory boards. The first memory expansion board can be obtained with either 8 or 16 Megabytes of memory. With the first expansion board installed another 8 Megabytes of memory may be attaches to this board to make the maximum amount. The two batteries 72 for portable computer 62 are Lithium Ion and have internal controllers which monitor the capacity of the battery. These controllers use a 4.19 Mhz crystal internal to the battery.

Figure 18:
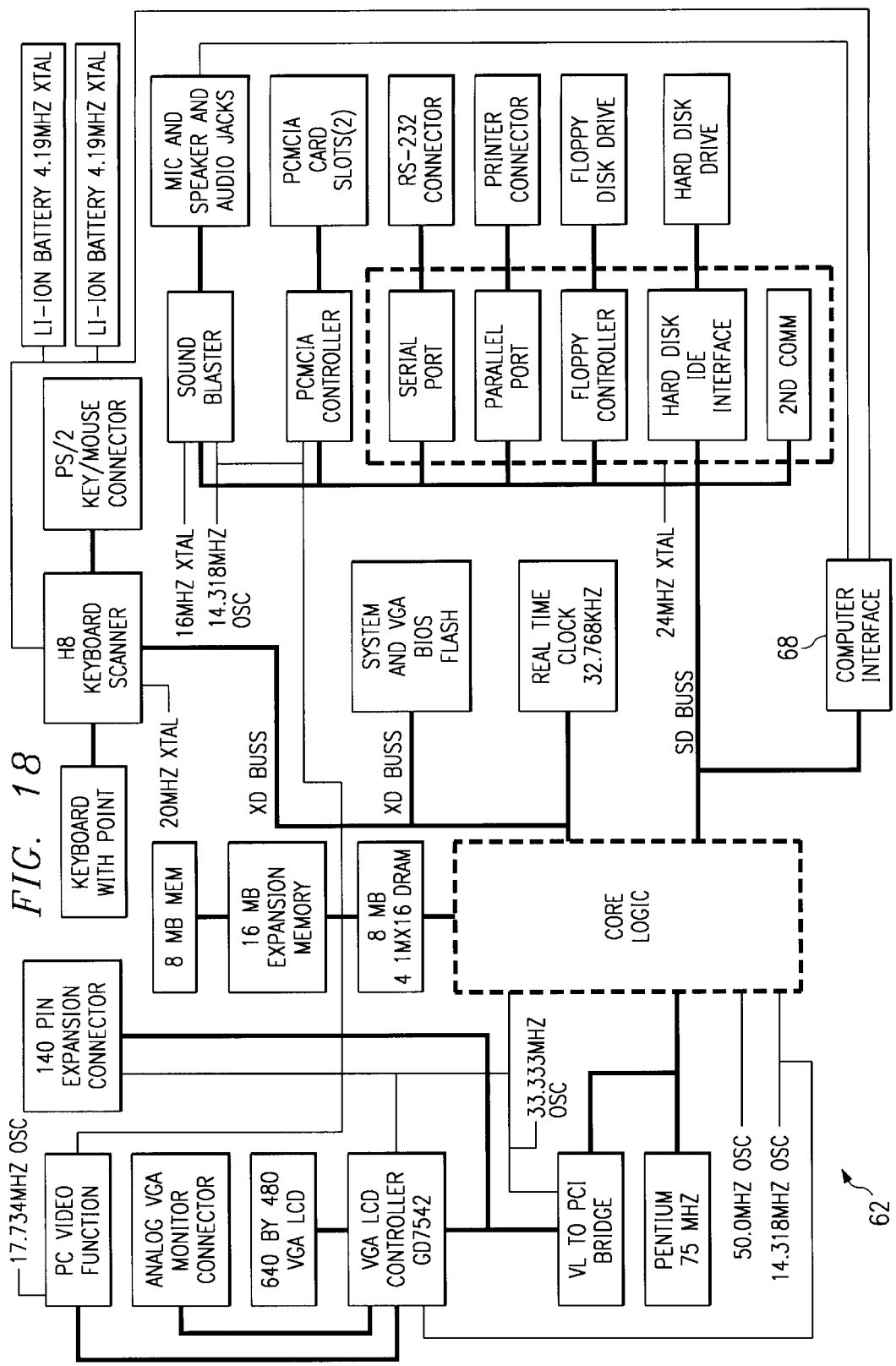
FIG. 18 illustrates a block diagram of a computer to which the coupled portable telephone/interface module may be coupled, according to another embodiment of the invention.
Figure 19:
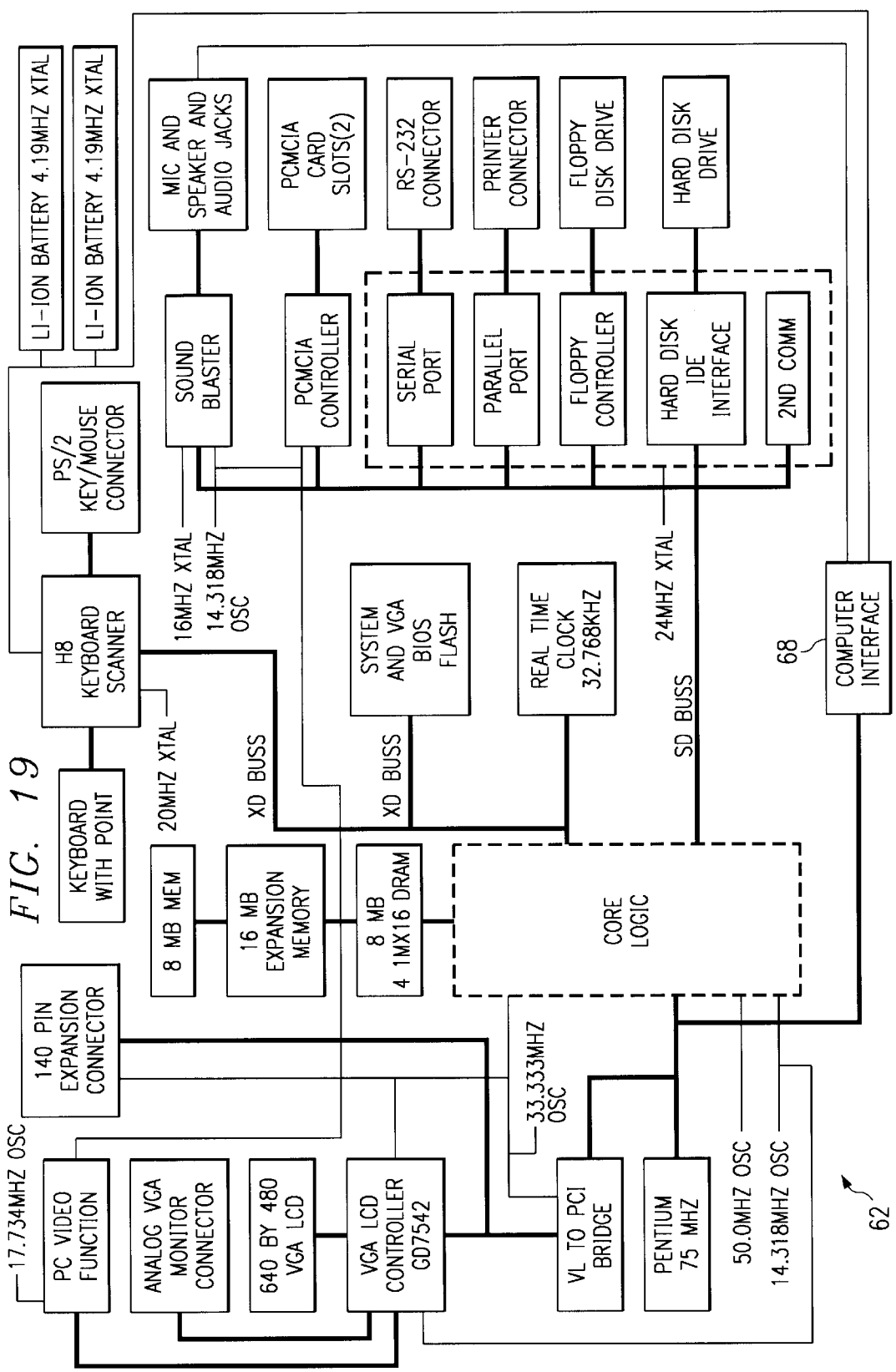
FIG. 19 illustrates a block diagram of a computer to which the coupled portable telephone/interface module may be coupled, according to yet another embodiment of the invention.

Portable computer 62 also has two slots for PCMCIA cards. These slots may be used with third party boards to provide various expansion options. Portable computer 62 also has an internal sound chip set which can be used to generate or record music and/or sound effects. An internal speaker and microphone built into the notebook. In addition, three audio jacks are provide for external microphones, audio input, and audio output. Block diagrams of other embodiments of portable computer 62 are illustrated in FIGS. 18 and 19.

Figure 20:
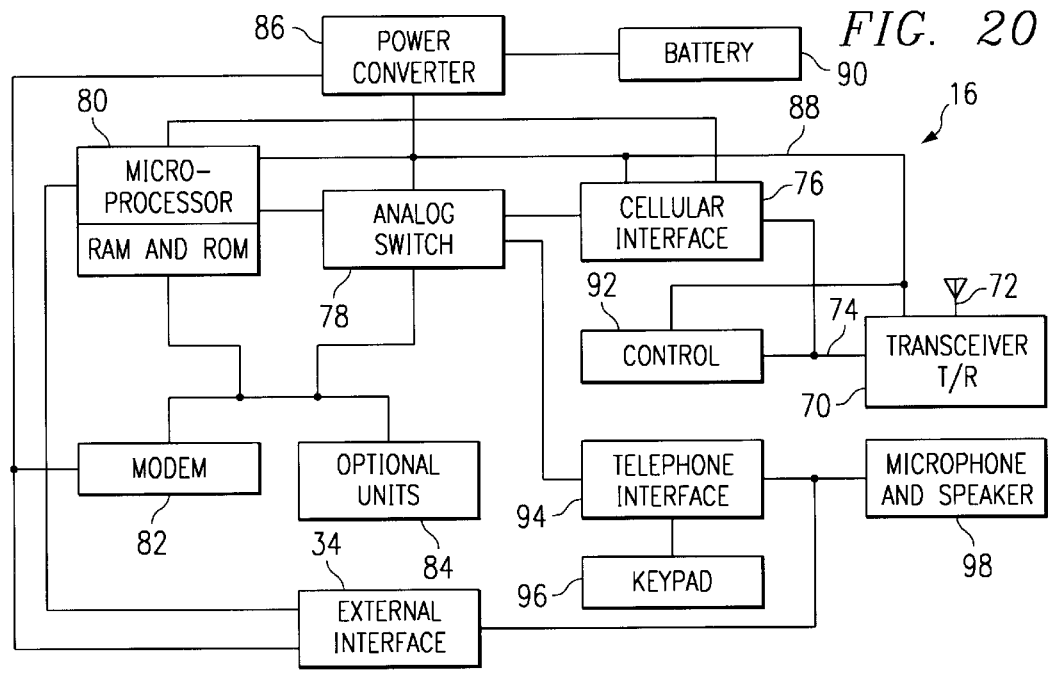
FIG. 20 illustrates a block diagram of a portable telephone to which an interface module may be coupled, according to one embodiment of the invention.

Portable telephones are available in various sizes, shapes, functionality and costs from companies such as Motorola, Nokia and Erricson. Cellular telephones are presently the most popular type of portable telephones. A block diagram of one embodiment of a cellular telephone 16 is illustrated in FIG. 20. The cellular telephone of FIG. 20 includes a transceiver 70 which transmits and/or receives voice and/or data signals in the radio frequency range by means of an antenna 72. Voice and/or data signals transmitted by the antenna 72 are received by an antenna connected to a transceiver located in a specific cell area of a cellular telephone network (see FIG. 3). The cellular telephone network transceiver is connected to the cellular land line equipment which is operative to transmit the received signal over conventional telephone lines. Voice and/or data signals from the telephone lines may also be transmitted by the cellular telephone network transceiver and a corresponding antenna back to the antenna 72 to and through the transceiver 70 of the portable telephone 16 which is connected to the transceiver by means of a cellular telephone bus 74.

A cellular interface 76 renders the programming interface function of the portable telephone compatible with the cellular bus 74. For example, with AMPS compatible cellular telephones, the cellular interface 76 would consist of an eight bit parallel I/O, port party line drivers and receivers, operational amplifiers providing differential driving and receiving analog conversion between the −20 dbV signal on the cellular bus and the defined levels required by an analog switch and condition system 78. Cellular interfaces of this type are known, commercially available items, as exemplified by cellular interfaces sold by Motorola Corporation of Schaumberg, Ill. or Oki of Japan.

The analog switch and conditioning system 78 is implemented using currently known switching technology. The system may incorporate CMOS analog switches operative in response to microprocessor generated control signals to switch the state of signal processing operational amplifiers. Basically, this analog switch and condition system operates to selectively connect various components of the cellular phone to the cellular interface 76. Microprocessor 80 provides control functions for the cellular interface 76 and analog switch and conditioning system 78 as well as for other portions of the cellular phone. Microprocessor 80 may be a conventional 8/16 bit microprocessor, such as the Intel 8088 manufactured by Intel Corporation, or a digital signal processor "DSP", such as the TMS 320C52 manufactured by Texas Instruments Incorporated. The microprocessor includes random access (RAM), read only (ROM) memory, and flash memory storage systems which contain the control and data error programs necessary to adapt computer data for cellular telephone transmission.

The modem 82 may be one of a number of conventional modems used for telephone wire line transmission which has test mode capabilities for deactivating certain modem functions. A particular commercially available modem suitable of use as the modem 82 is the AMI 3530 modem manufactured by Gould Advanced Semiconductors of 3800 Hemstead Road, Santa Clara, Calif. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally this scrambler system in the modem prevents this tactic condition where loss of synchronization by the PLL or the interpretation of the static signal as a switch command is most likely to occur. However, modems such as the AMI 3530 incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 82.

The data stream from the microprocessor 80, including error correction data from the microprocessor, is transmitted by the modem 82 through the analog switch 78 and cellular interface 76 to the transceiver 70. This data is then transmitted as a radio frequency signal by the antenna 72 to an antenna connected to a transceiver located in a specific cell area of a cellular telephone network (see FIG. 3). The cellular telephone network transceiver is connected to the cellular land line equipment which is operative to transmit the received signal over conventional telephone lines. Data signals from the telephone lines may also be transmitted by the cellular telephone network transceiver and a corresponding antenna back to the antenna 72 to and through the transceiver 70 of the portable telephone 16 which is connected to the transceiver by means of a cellular telephone bus 74.

Figure 21:
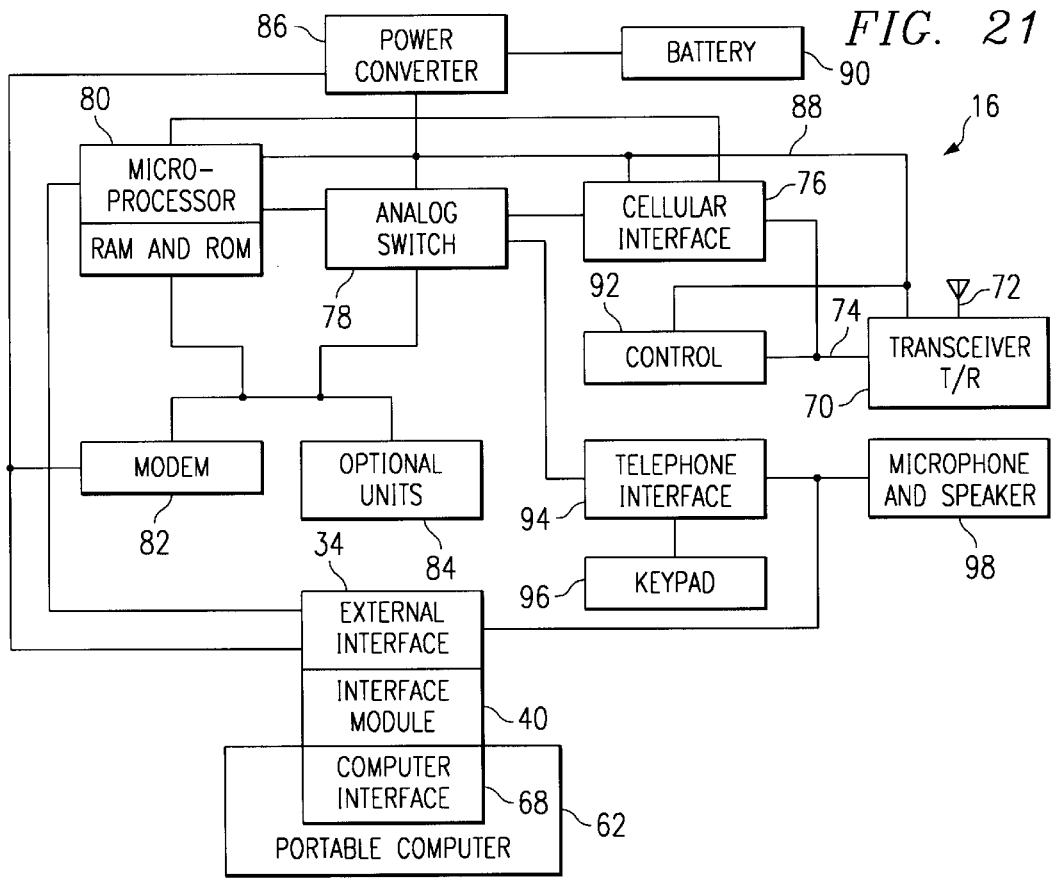
FIG. 21 illustrates a block diagram of an interface module coupling the portable telephone of FIG. 20 to a portable computer, according to one embodiment of the invention.

A serial data stream may be provided to the microprocessor 80 from an external computer 62, and from the microprocessor 80 to an external computer 62, by means of an interface module 40, as illustrated in FIG. 21. Interface module 40 will be described later in more detail.

Figure 22:
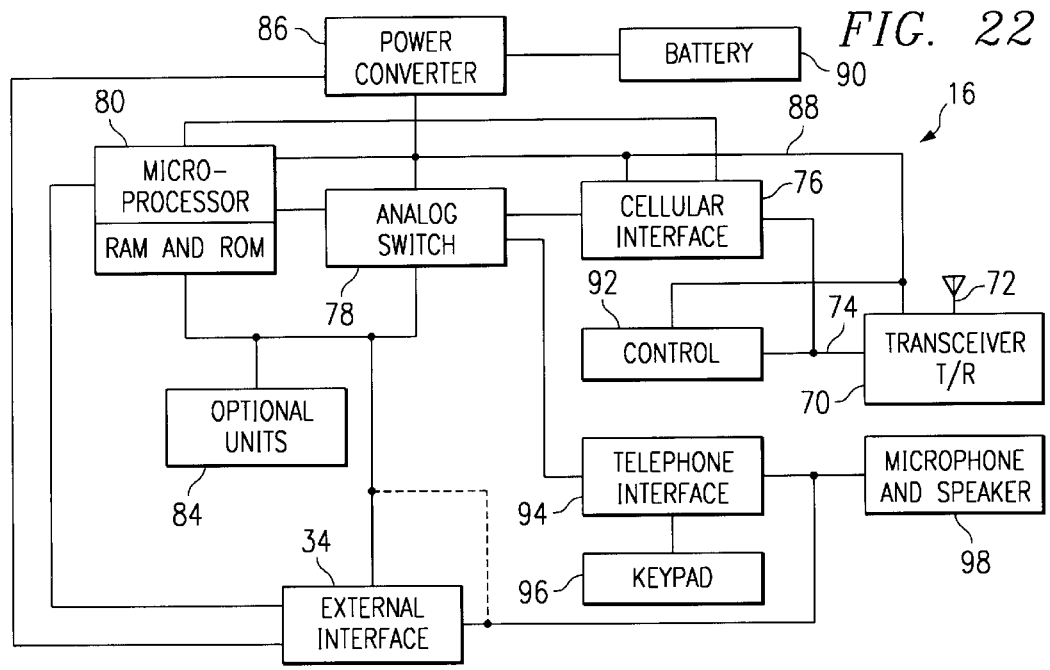
FIG. 22 illustrates a block diagram of a portable telephone to which an interface module may be coupled, according to another embodiment of the invention.
Figure 23:
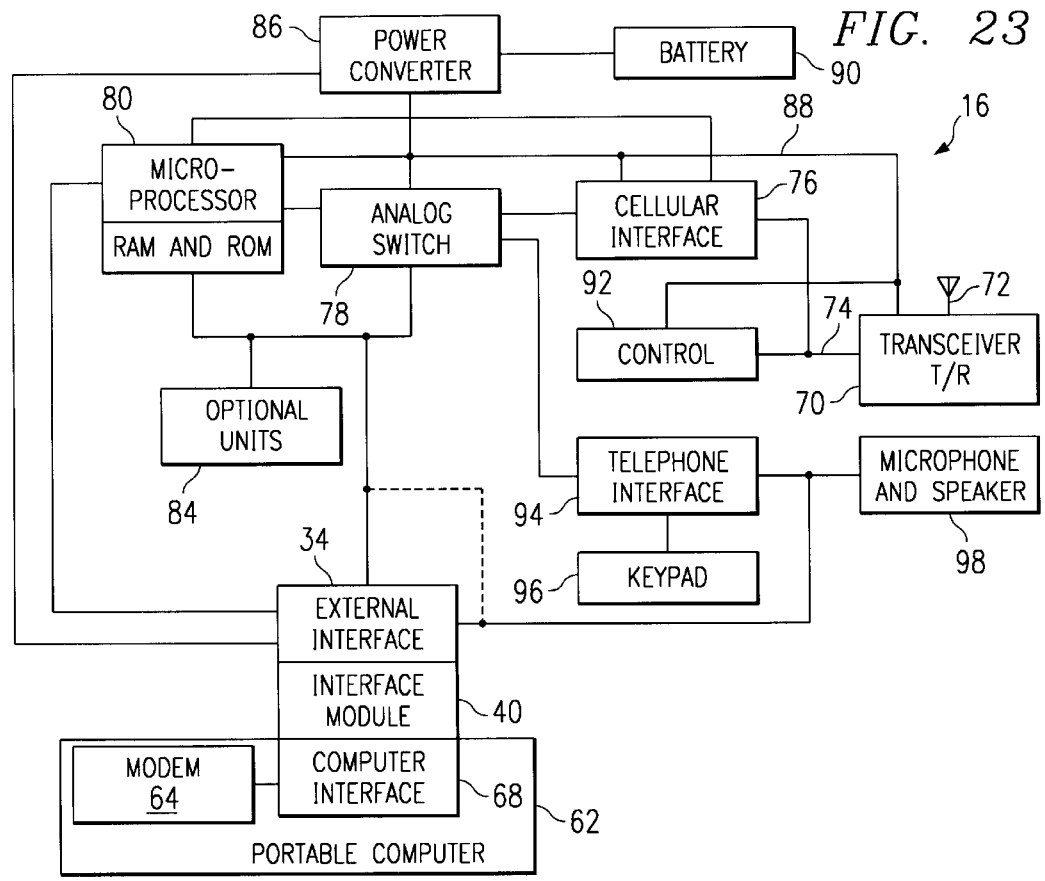
FIG. 23 illustrates a block diagram of an interface module coupling the portable telephone of FIG. 22 to a portable computer, according to another embodiment of the invention.

Another embodiment of portable telephone 16 is illustrated in FIG. 22. A modem 64 is omitted in this embodiment of portable telephone 16 and is instead located in the computer 62 to which it may be coupled, as illustrated in FIG. 23. The modem 64 located in the computer may also be one of a number of conventional modems used for telephone wire line transmission which has test mode capabilities for deactivating certain modem functions. The modem may be a separate board that is inserted into the portable computer as an integral part of the computer (as in the case of the Texas Instruments TM-4000E portable computer), or as part of a card insertable into the PCMCIA card slot in the portable computer (as in the case of the Texas Instruments TM-5000 portable computer). One modem suitable for use as modem 64 in devices having an internal modem option is the AMI 3530 modem manufactured by Gould Advanced Semiconductors of 3800 Hemstead Road, Santa Clara, Calif. As an example, the TM-4000E portable computer manufactured by Texas Instruments, Inc., has an internal modem (optional). The TM-5000 portable computer, on the other hand, does not. The TM-5000 can be modified for this modem function by using a PCMCIA modem card (such as the XJ2288 PCMCIA card available from Megahertz) and modifying it so that analog line connections are routed back into the notebook computer. Alternatively, the TM-5000 can be modified to contain an internal modem. Other suitable modems are commercially available. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally this scrambler system in the modem prevents this tactic condition where loss of synchronization by the PLL or the interpretation of the static signal as a switch command is most likely to occur. However, modems such as the AMI 3530 or modified Megahertz PCMCIA modem card incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 64.

The data stream from the microprocessor in the computer, including error correction data from the microprocessor, is sent from modem 64 via interface 68 and interface module 40 and through interface 34 to modem 64, through analog switch 56 and cellular interface 52 to the transceiver 36. This data is then transmitted as a radio frequency signal by the antenna 38 to the antenna 40, where it is converted by a transceiver and cellular land line equipment to a signal suitable for transmission over conventional telephone lines.

Figure 24:
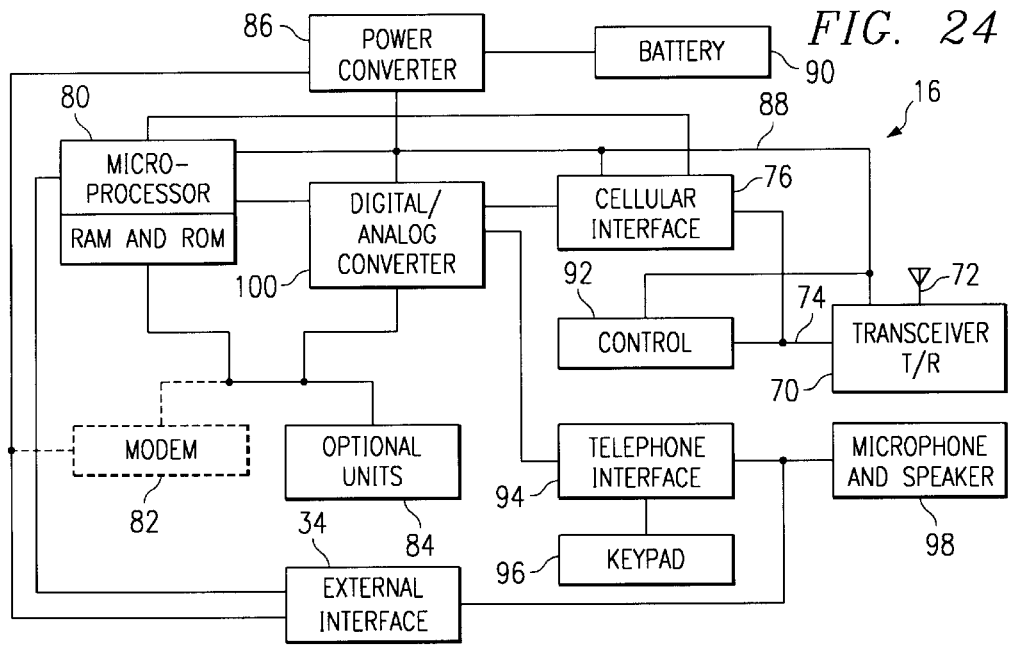
FIG. 24 illustrates a block diagram of a portable telephone to which an interface module may be coupled, according to yet another embodiment of the invention.

Yet another embodiment of a portable telephone 16 is illustrated in FIG. 24. This embodiment of a portable telephone utilizes digital transmitting/receiving radio frequency communication in contrast to the analog transmitting/receiving radio frequency communication of the previous embodiments of portable telephone 16. The modem may be omitted when telephone 16 is to be used in a completely digital telephone network.

Figure 25:
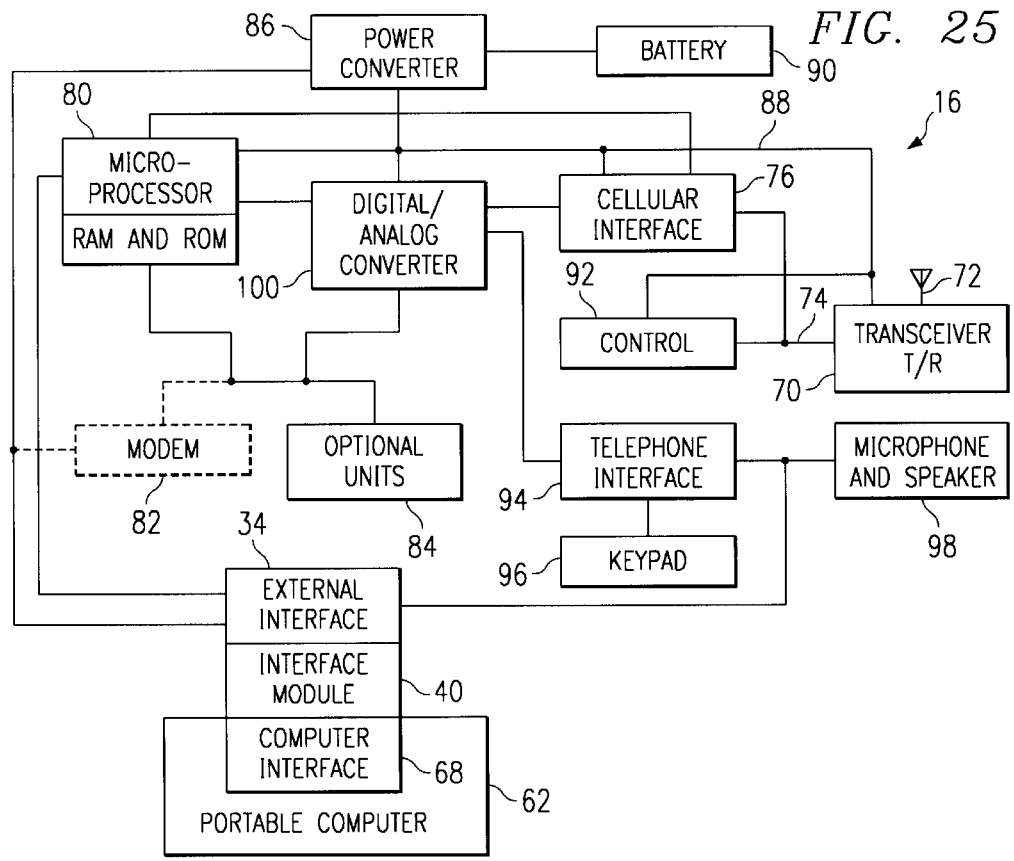
FIG. 25 illustrates a block diagram of an interface module coupling the portable telephone of FIG. 24 to a portable computer, according to yet another embodiment of the invention.

In the digital embodiment of the invention, illustrated in FIG. 25, data is sent directly from portable computer 62 through interface 68, interface module 40 and interface 34, and to microprocessor 80. A data stream from the microprocessor 80, including error correction data from the microprocessor, is sent via digital/analog converter 100 which converts digital to analog and analog to digital, and cellular interface 76 to the transceiver 70. This data is then transmitted as a radio frequency signal by the antenna 72 to an antenna where it is converted by a transceiver and cellular land line equipment to a signal suitable for transmission over conventional telephone lines.

Figure 26:
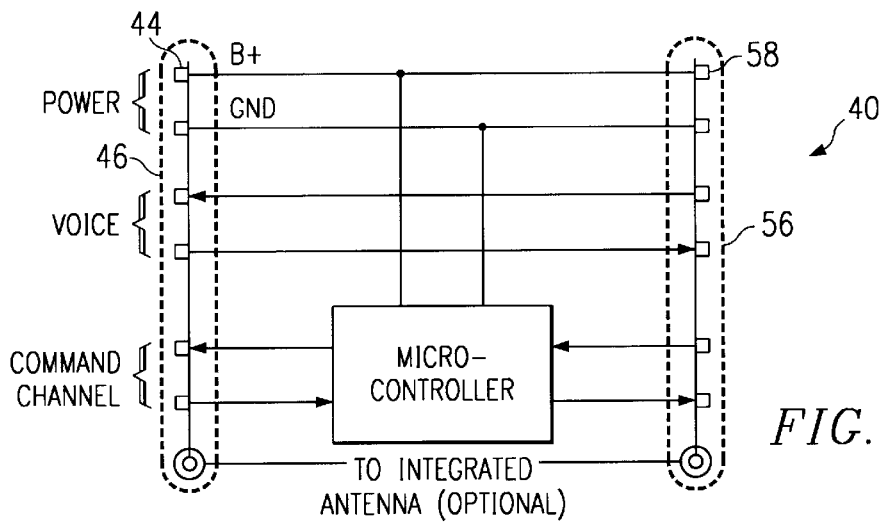
FIGS. 26–169 illustrate various embodiments of interface modules that facilitate coupling of a portable telephone to a portable computer.
Figure 27:
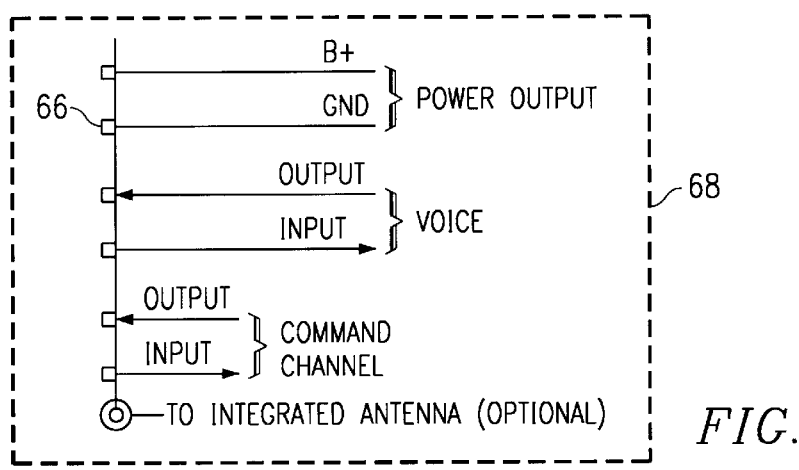
Figure 28:
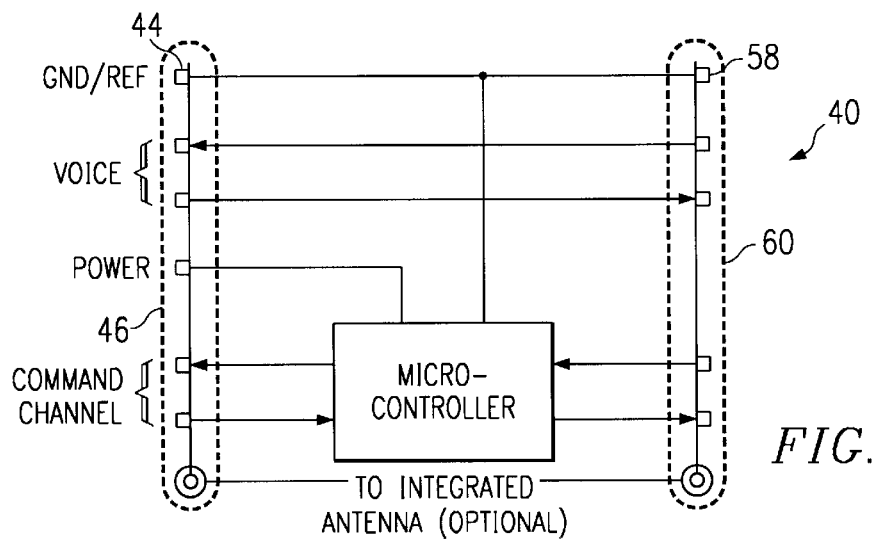
Figure 29:
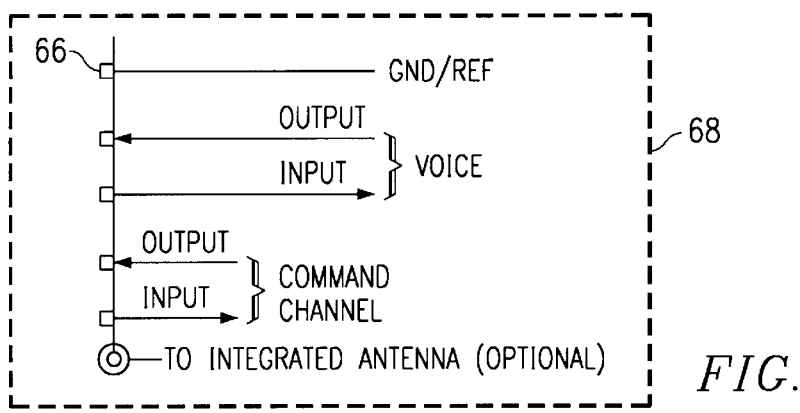

In the embodiment of the invention illustrated in FIG. 26, interface module 40 comprises: power leads for charging the portable telephone's battery(s) while connected to the computer; two signal lines (voice input and output) for full duplex mode; a microcontroller having input and output command channel leads; a signal line (optional) for coupling the portable telephone to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 27. In the embodiment of the invention illustrated in FIG. 28, interface module 40 comprises: a ground/reference signal line; two signal lines (voice input and output) for full duplex mode; a microcontroller having input and output command channel leads; a signal line (optional) for coupling to antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 29.

Figure 30:
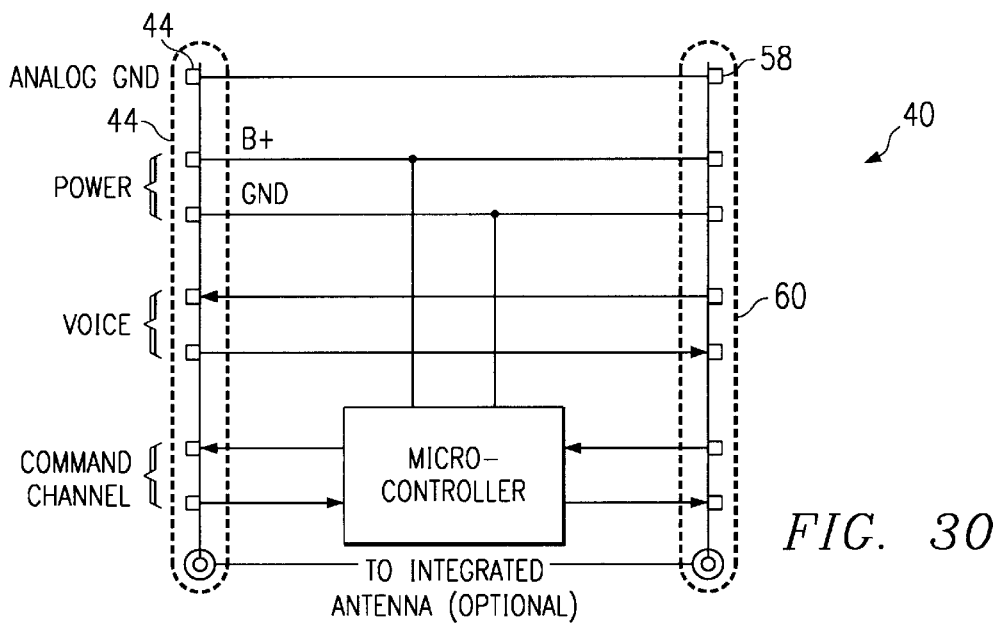
Figure 31:
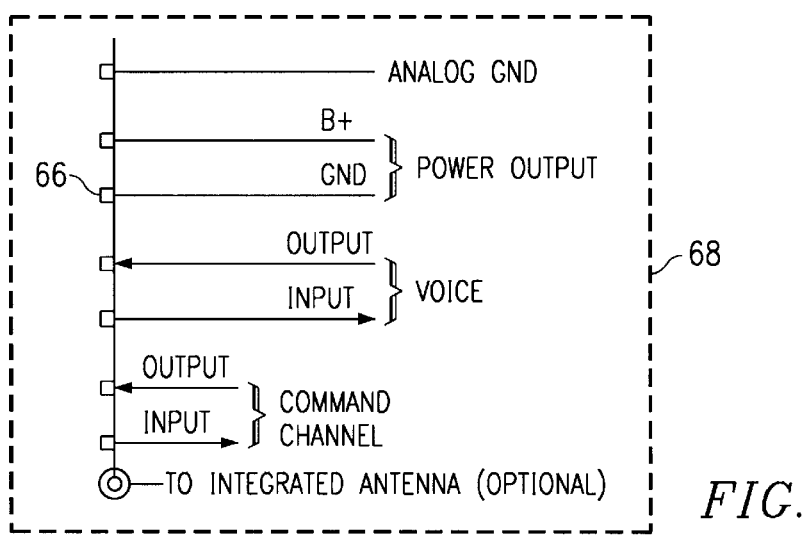
Figure 32:
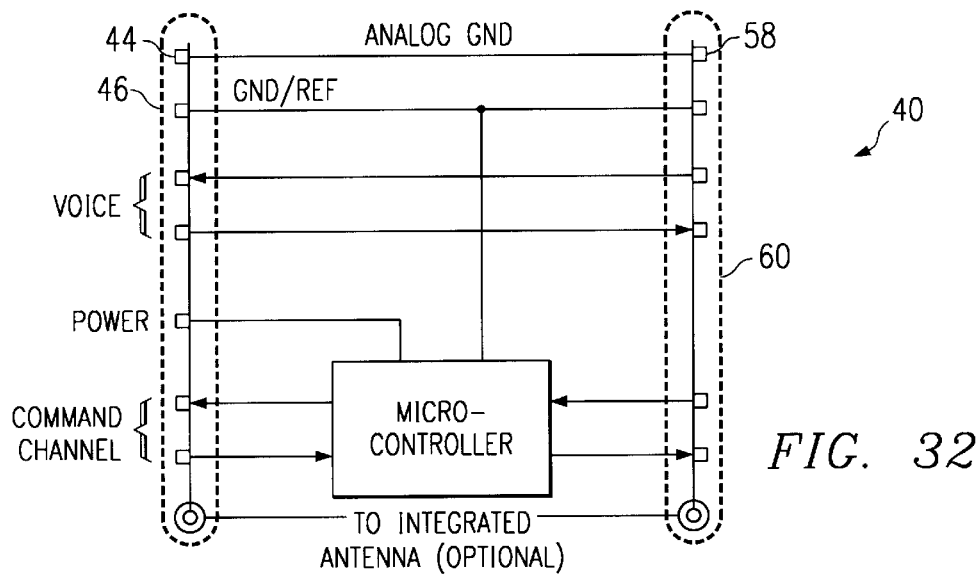
Figure 33:
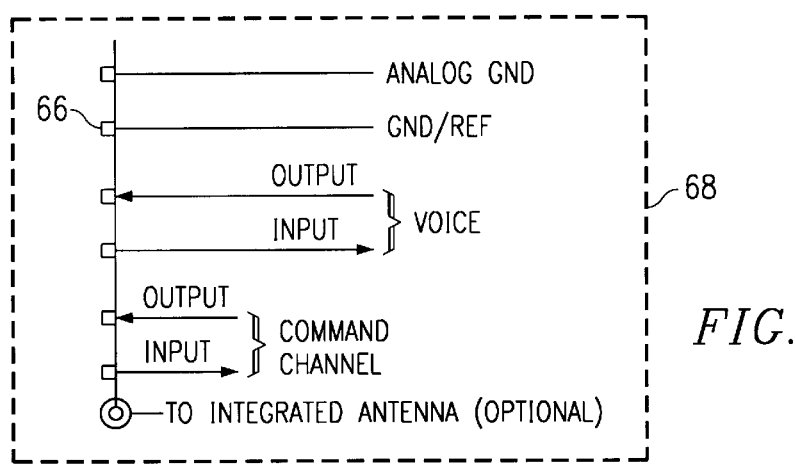

In the embodiment of the invention illustrated in FIG. 30, interface module 40 comprises: an analog ground lead line; power leads for charging the portable telephone's battery(s) while connected to the computer; two signal lines (voice input and output) for full duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 31. In the embodiment of the invention illustrated in FIG. 32, interface module 40 comprises: an analog ground lead line; a ground/reference signal line; two signal lines (voice input and output) for full duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 33. Power leads may be omitted in embodiments of the invention where computer charging of the portable telephone's battery(s) is not desired.

Figure 34:
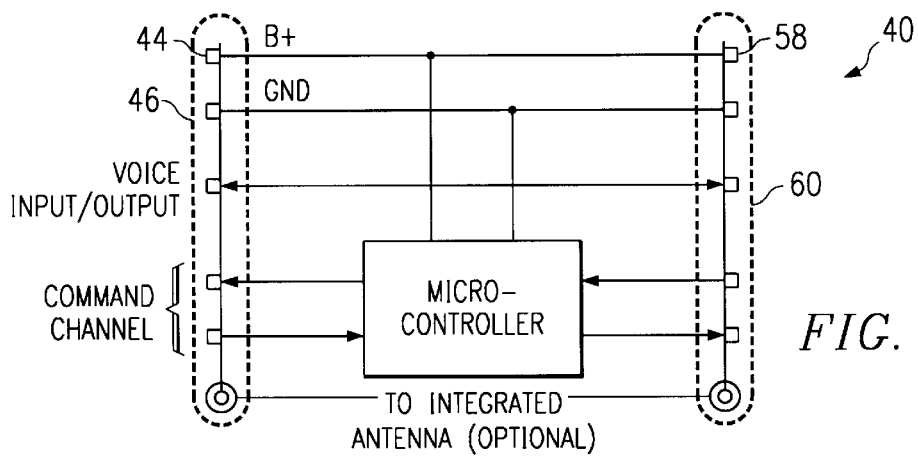
Figure 35:
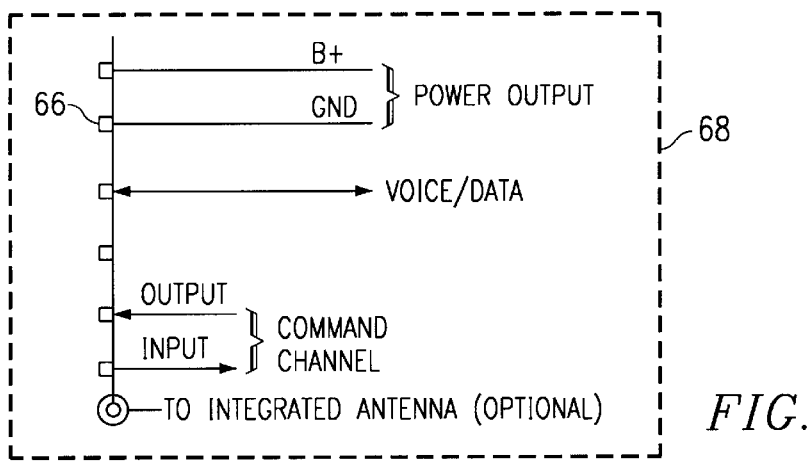
Figure 36:
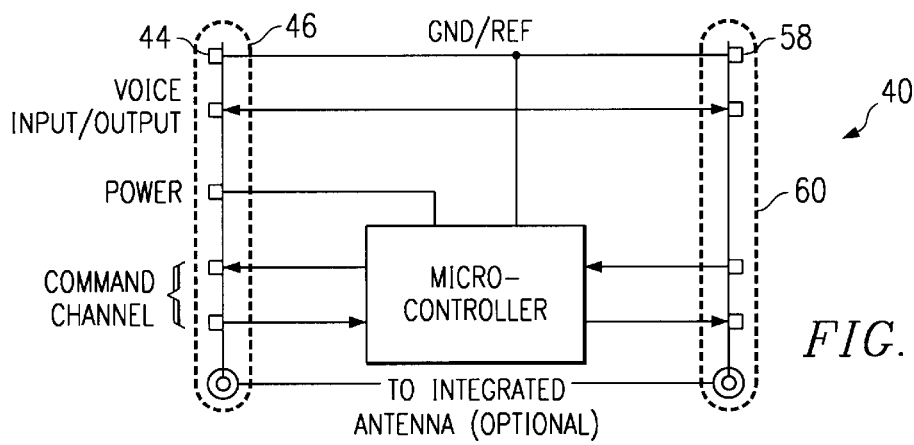
Figure 37:
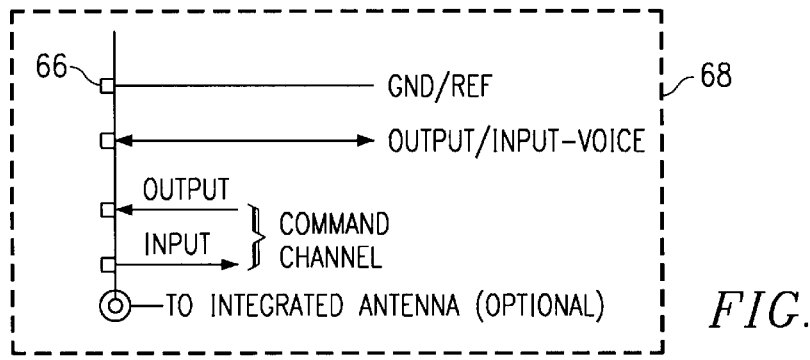

In the embodiment of the invention illustrated in FIG. 34, interface module 40 comprises: power leads for charging the portable telephone's battery(s) while connected to the computer; one signal line (voice input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 35. In the embodiment of the invention illustrated in FIG. 36, interface module 40 comprises: a ground/reference signal line; one signal line (voice input and output) for operating in a bi-directional half duplex mode; a microcontroller having input and output command channel leads; a signal line (optional) for coupling to an antenna integrated in the computer; and electrical contacts 47 in portable telephone 16 and electrical contacts 58 for coupling the leads to corresponding electrical contacts 66 in portable computer 62, as illustrated in FIG. 37. Power leads may be omitted in embodiments of the invention where computer charging of the portable telephone's battery(s) is not desired.

Figure 38:
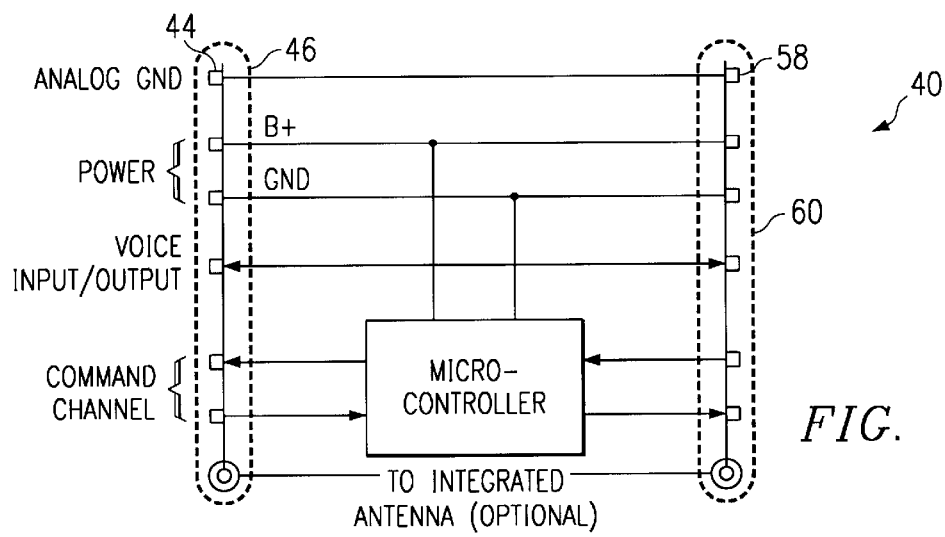
Figure 39:
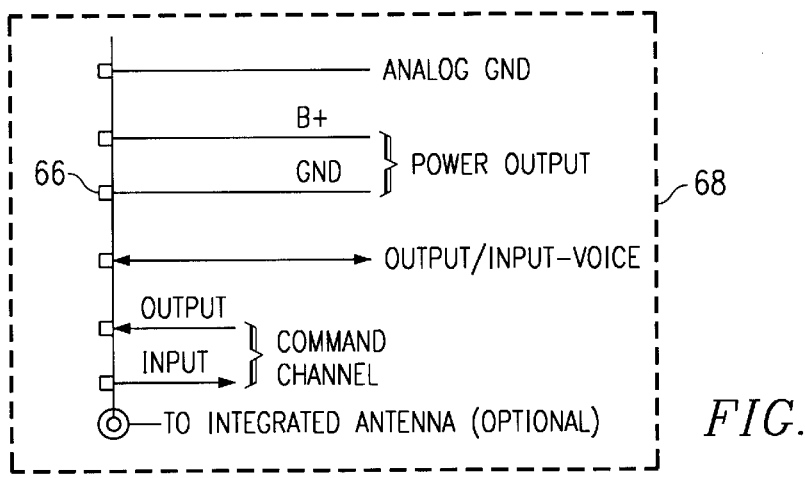
Figure 40:
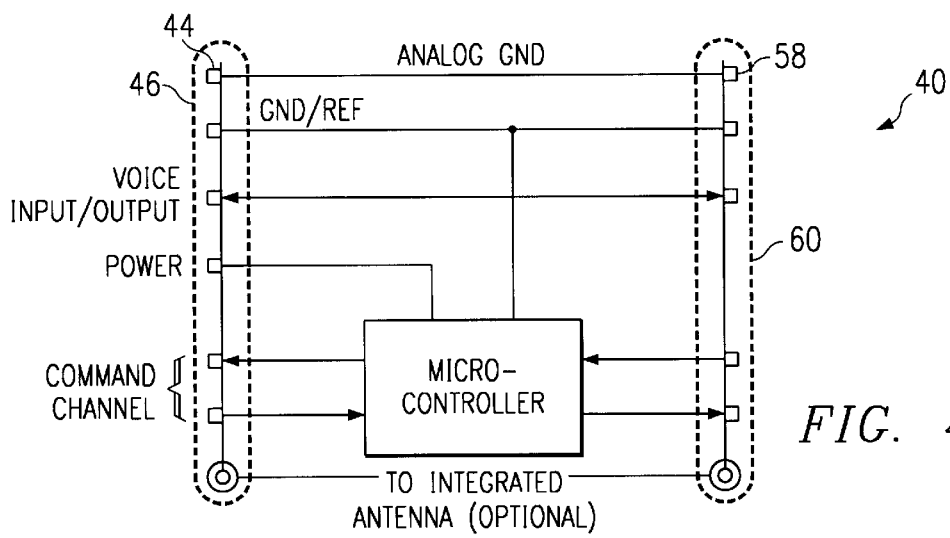
Figure 41:
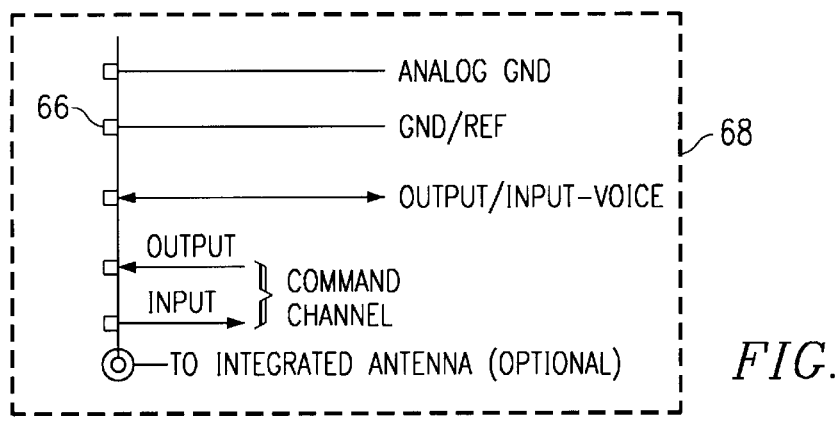

In the embodiment of the invention illustrated in FIG. 38, interface module 40 comprises: an analog ground lead line; power leads for charging the portable telephone's battery(s) while connected to the computer; one signal line (voice input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 39. In the embodiment of the invention illustrated in FIG. 40, interface module 40 comprises: an analog ground lead line; a ground/reference signal line; one signal line (voice input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 41. Power leads may be omitted in embodiments of the invention where computer charging of the portable telephone's battery(s) is not desired.

Figure 42:
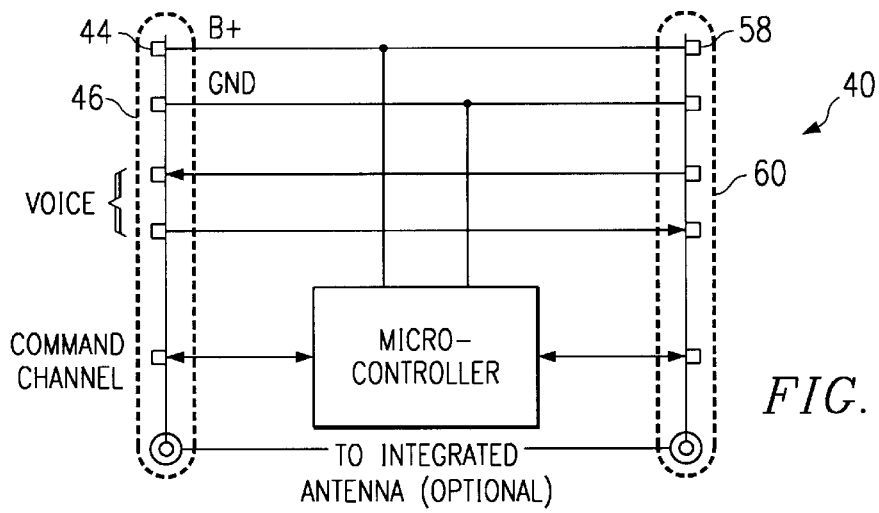
Figure 43:
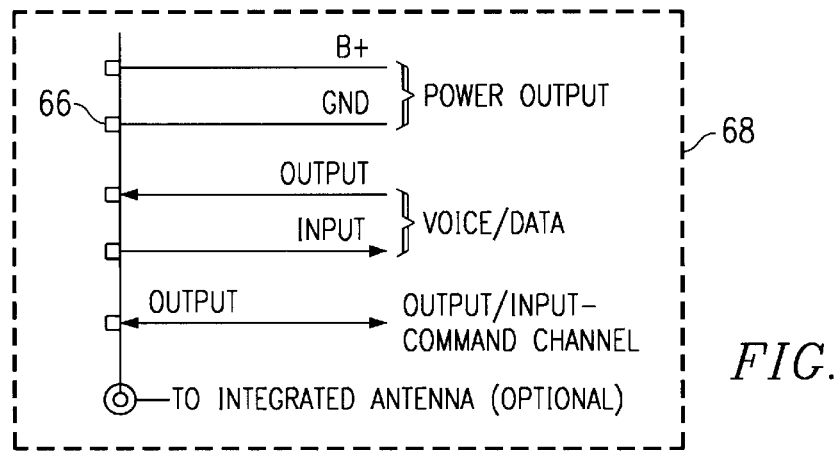
Figure 44:
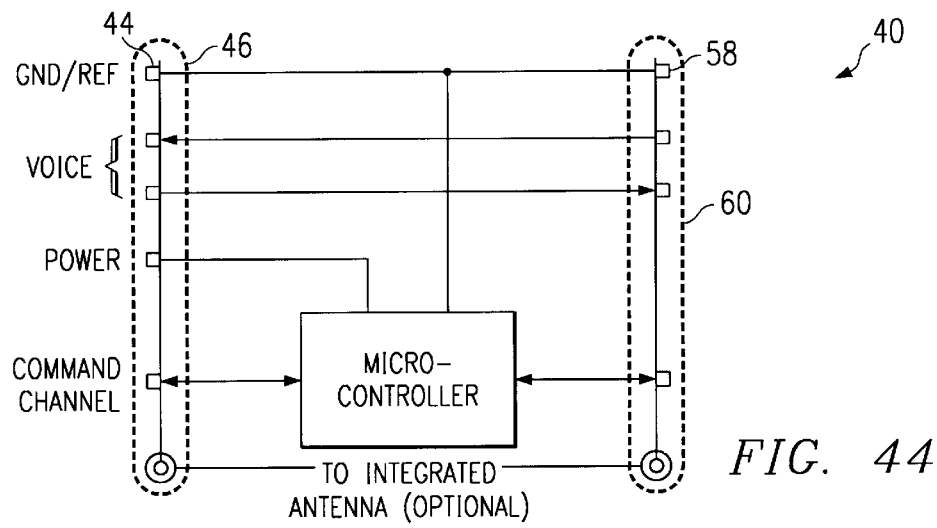
Figure 45:
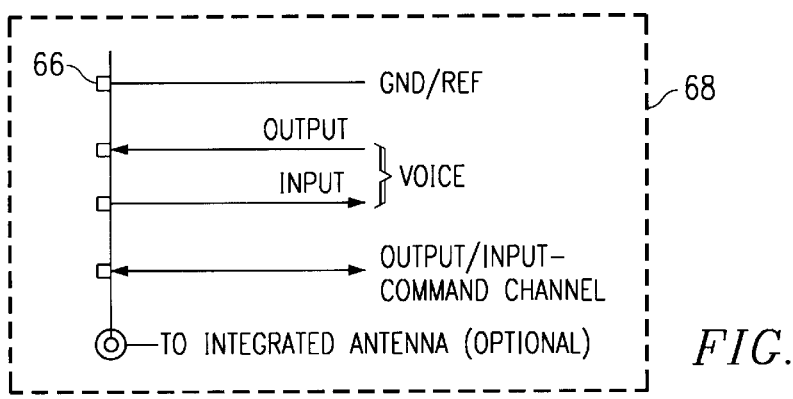

In the embodiment of the invention, illustrated in FIG. 42, interface module 40 comprises: power leads for charging the portable telephone's battery(s) while connected to the computer; two signal lines (voice input and output) for full duplex mode; a microcontroller having one input/output command channel lead line for operating in a bi-directional half duplex mode; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 43. In the embodiment of the invention illustrated in FIG. 44, interface module 40 comprises: a ground/reference signal line; two signal lines (voice input and output) for full duplex mode; a microcontroller having one input/output command channel lead line for operating in a bi-directional half duplex mode; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 45. Power leads may be omitted in embodiments of the invention where computer charging of the portable telephone's battery(s) is not desired.

Figure 46:
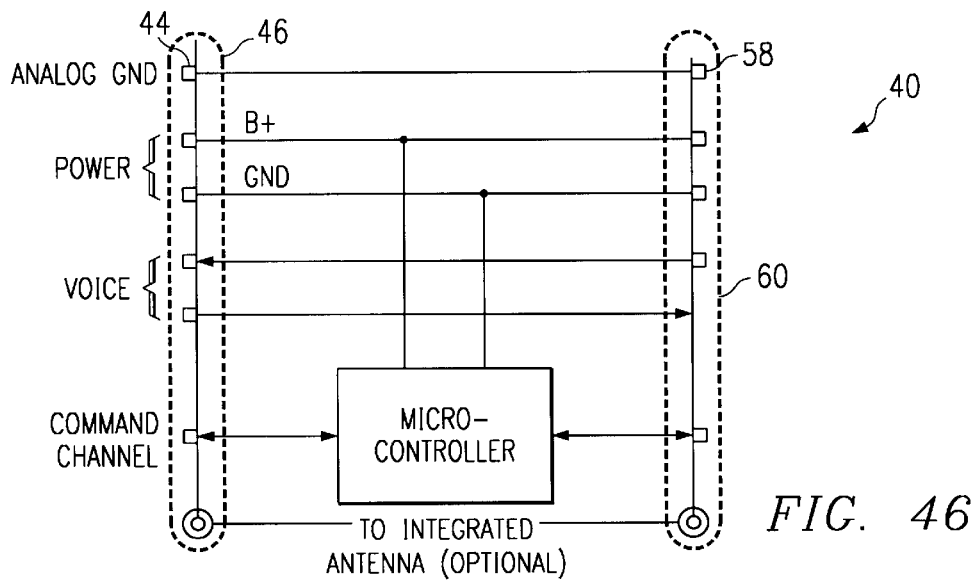
Figure 47:
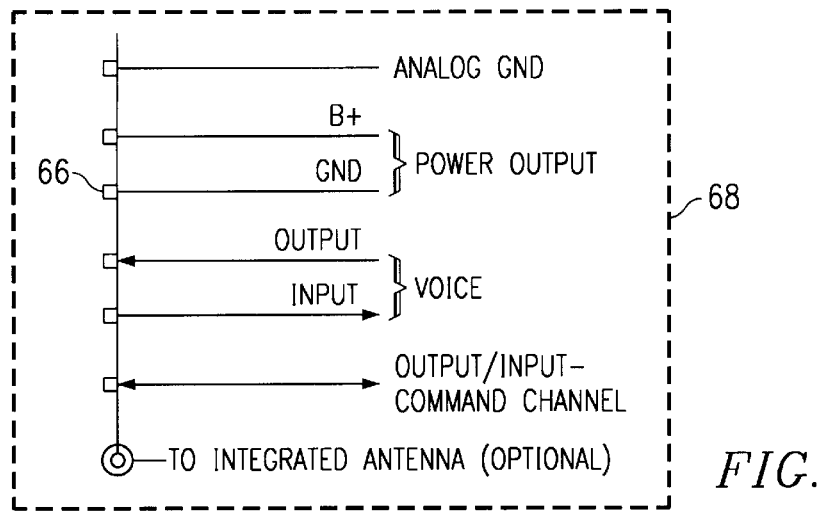
Figure 48:
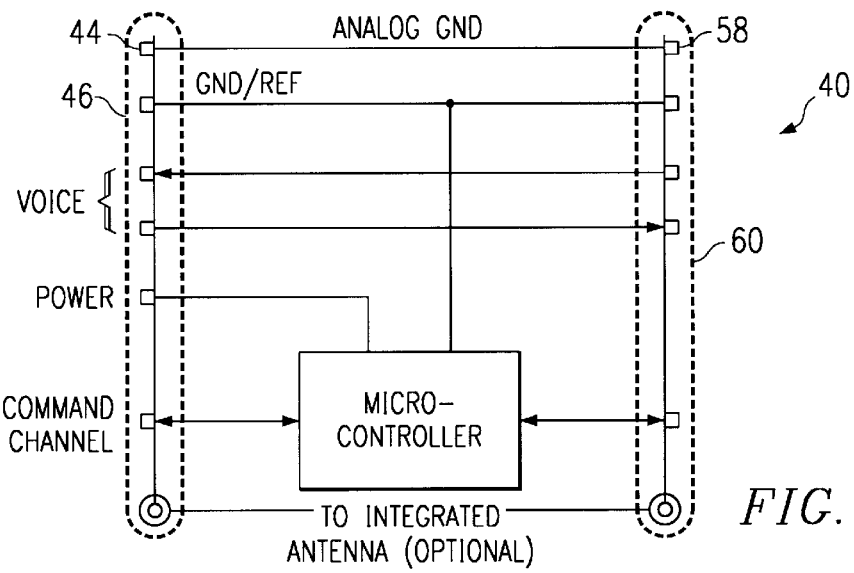
Figure 49:
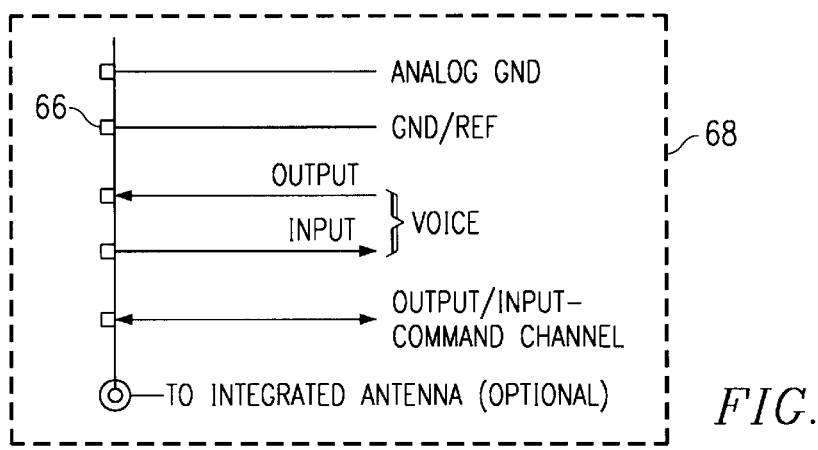

In the embodiment of the invention illustrated in FIG. 46, interface module 40 comprises: an analog ground lead line; power leads for charging the portable telephone's battery(s) while connected to the computer; two signal lines (voice input and output) for full duplex mode; a microcontroller having one input/output command channel lead line for operating in a bi-directional half duplex mode; a signal line (optional) for coupling to an antenna integrated in the computer; and electrical contacts for coupling the leads to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 47. In the embodiment of the invention illustrated in FIG. 48, interface module 40 comprises: an analog ground lead line; a ground/reference signal line; two signal lines (voice input and output) for full duplex mode; a microcontroller having one input/output command channel lead line for operating in a bi-directional half duplex mode; a signal line (optional) for coupling to an antenna integrated in the computer; and electrical contacts for 46 for coupling the leads to corresponding electrical contacts 47 in portable telephone 16 and electrical contacts 58 for coupling the leads to corresponding electrical contacts 66 in portable computer 62, as illustrated in FIG. 49.

Figure 50:
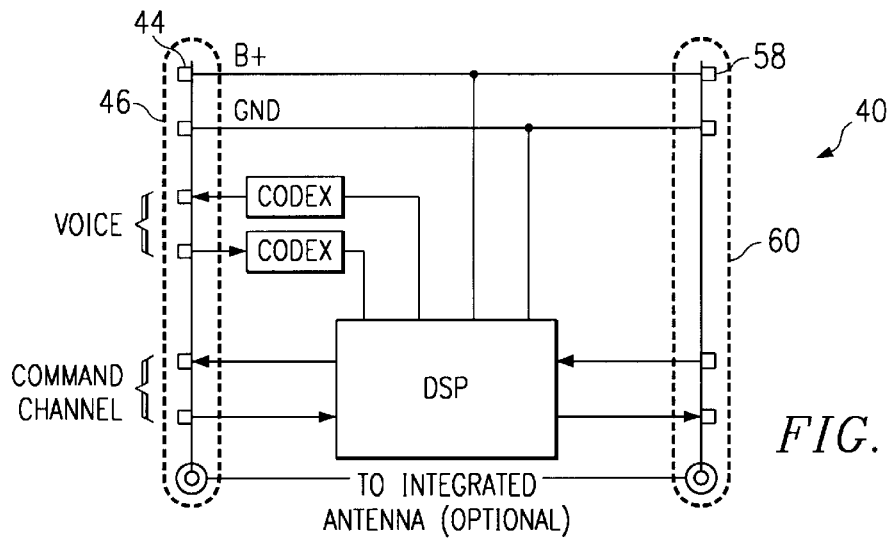
Figure 51:
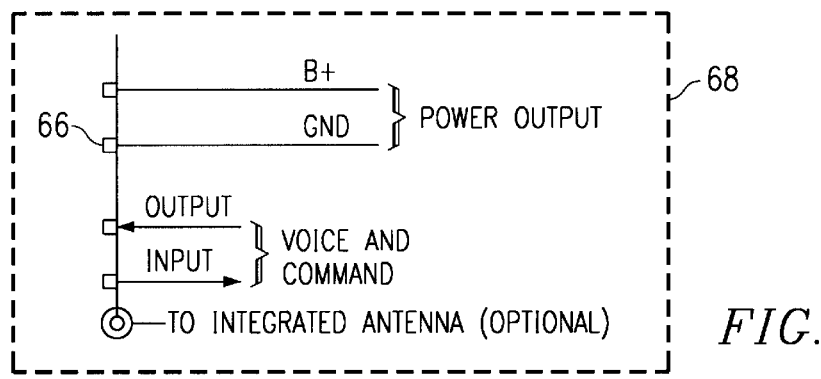
Figure 52:
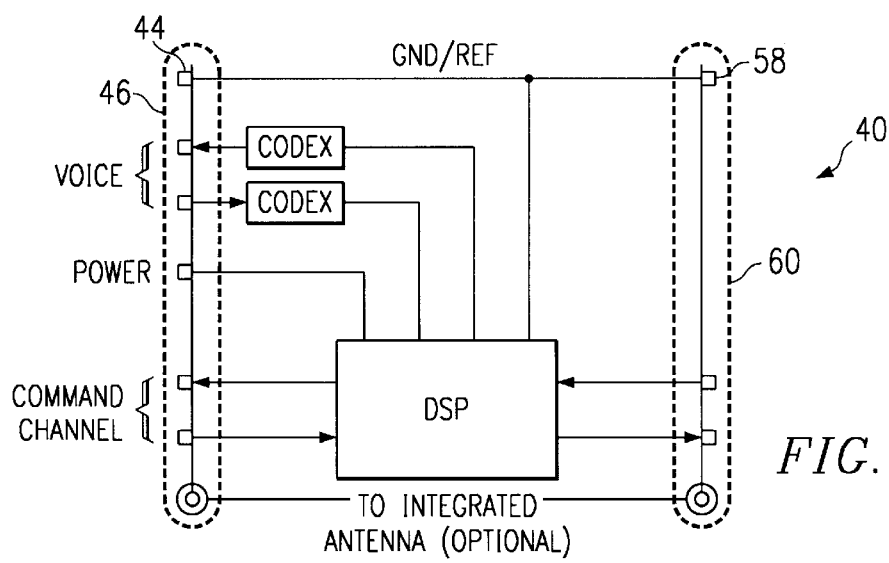
Figure 53:
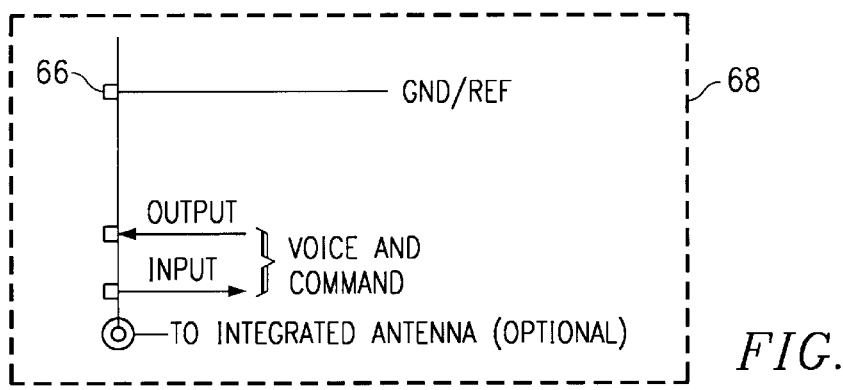

In the embodiment of the invention illustrated in FIG. 50, interface module 40 comprises: power leads for charging the portable telephone's battery(s) while connected to the computer; two codex circuits for coupling two signal lines (voice input and output) to a digital signal processor (DSP); input and output command channel leads, a signal line (optional) for coupling to an antenna integrated in the computer; and electrical contacts for coupling the power leads and at least two input/output leads coupled to the DSP, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 51. In the embodiment of the invention illustrated in FIG. 52, interface module 40 comprises: a ground/reference signal line; two codex circuits for coupling two signal lines (voice input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 53.

Figure 54:
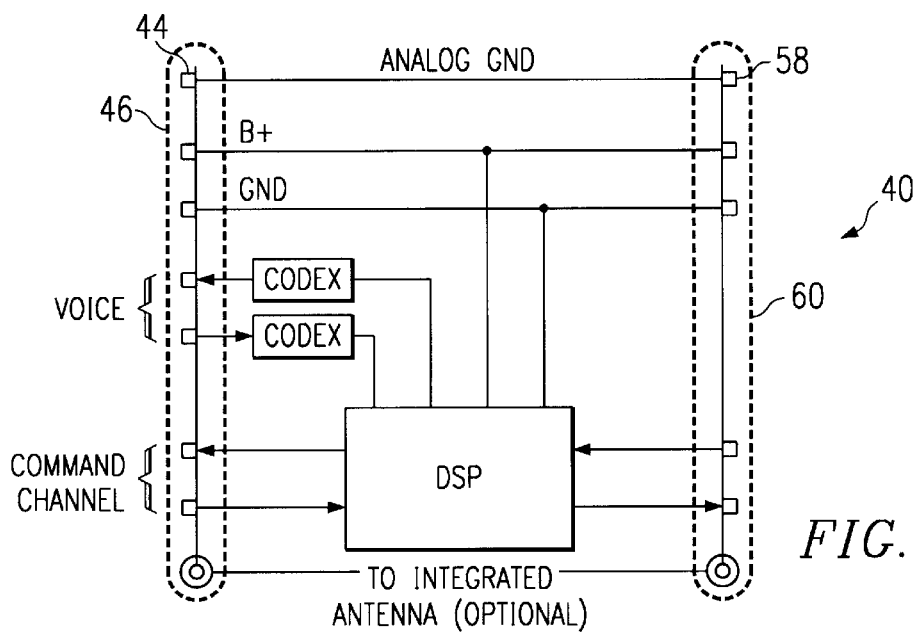
Figure 55:
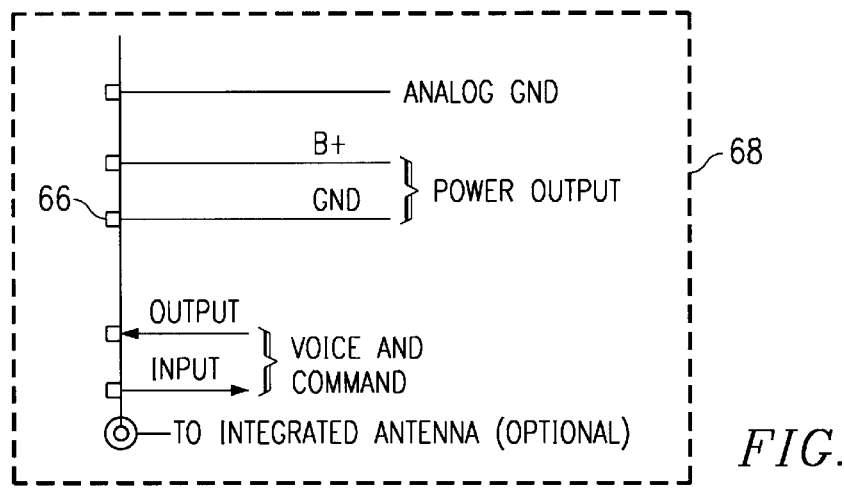
Figure 56:
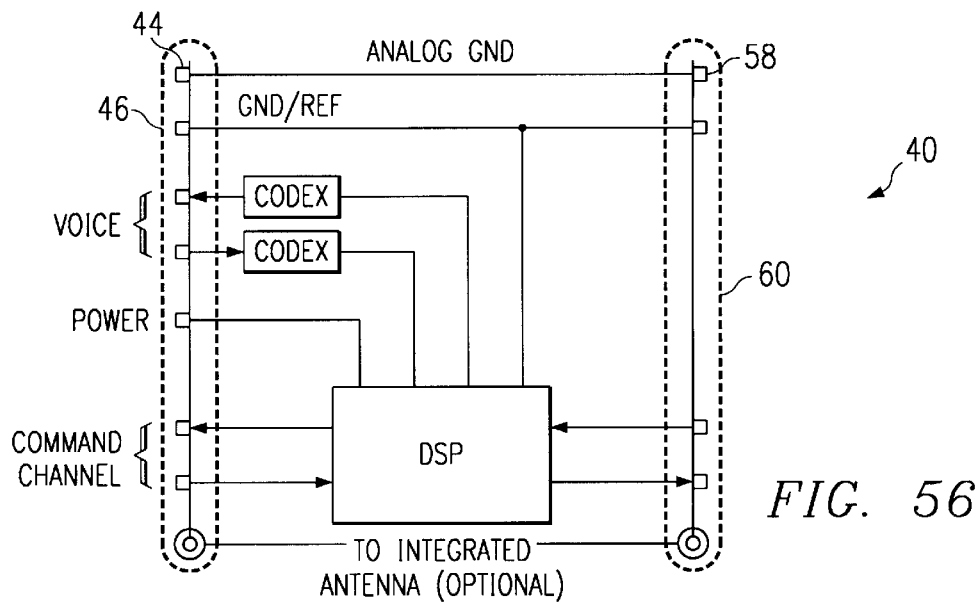
Figure 57:
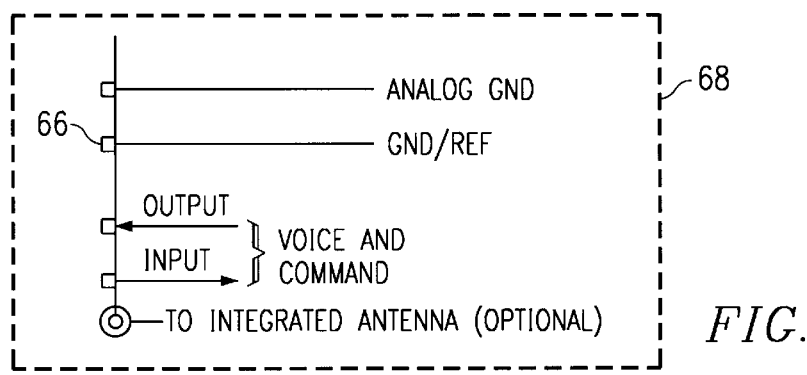

In the embodiment of the invention illustrated in FIG. 54, interface module 40 comprises: an analog ground lead line; two codex circuits for coupling two signal lines (voice input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 55. In the embodiment of the invention illustrated in FIG. 56, interface module 40 comprises: an analog ground lead line; a ground/reference signal line; two codex circuits for coupling two signal lines (voice input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 57. Power leads may be omitted in embodiments of the invention where computer charging of the portable telephone's battery(s) is not desired.

Figure 58:
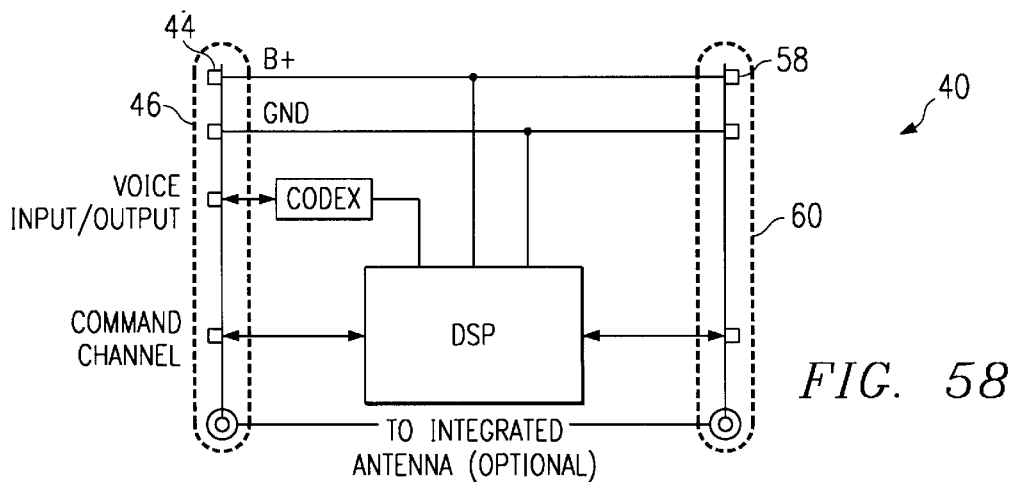
Figure 59:
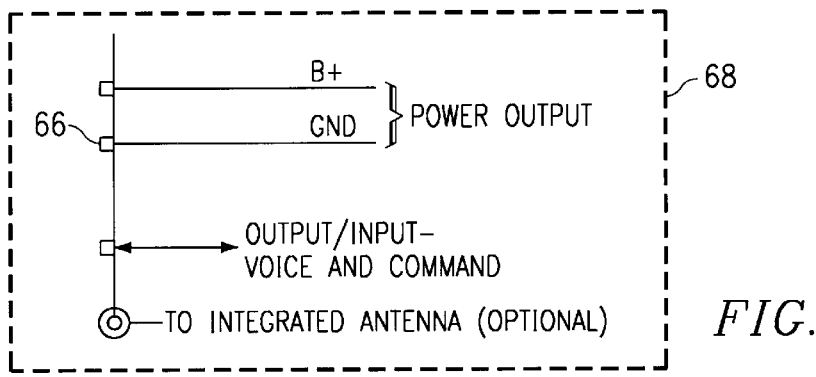
Figure 60:
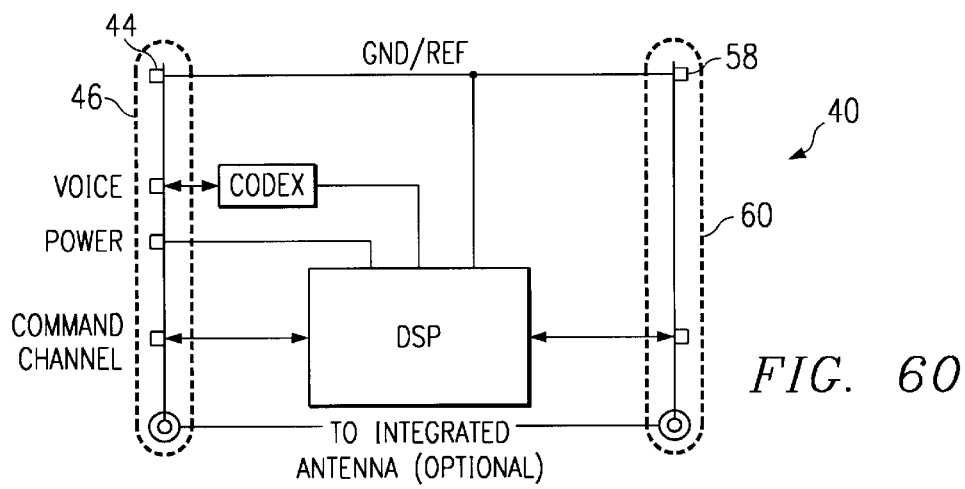
Figure 61:
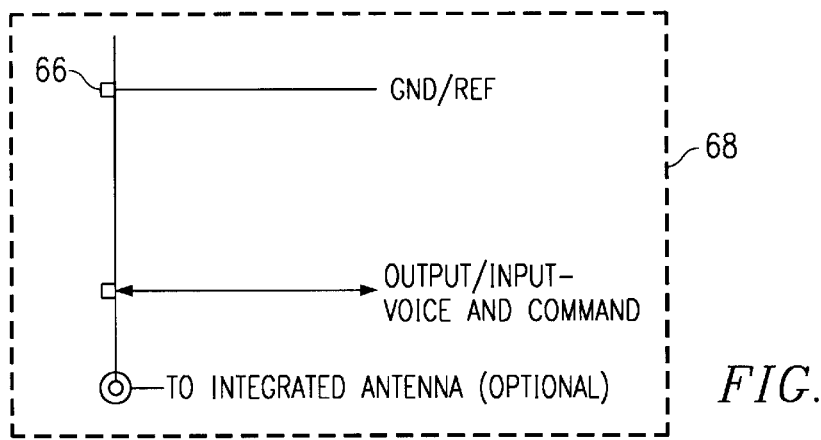

In the embodiment of the invention illustrated in FIG. 58, interface module 40 comprises: power leads for charging the portable telephone's battery(s) while connected to the computer; a codex circuit for coupling a signal line (voice input and output for operating in a bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 59. In the embodiment of the invention illustrated in FIG. 60, interface module 40 comprises: a ground/reference signal line; a codex circuit for coupling a signal line (voice input and output for operating in bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 61.

Figure 62:
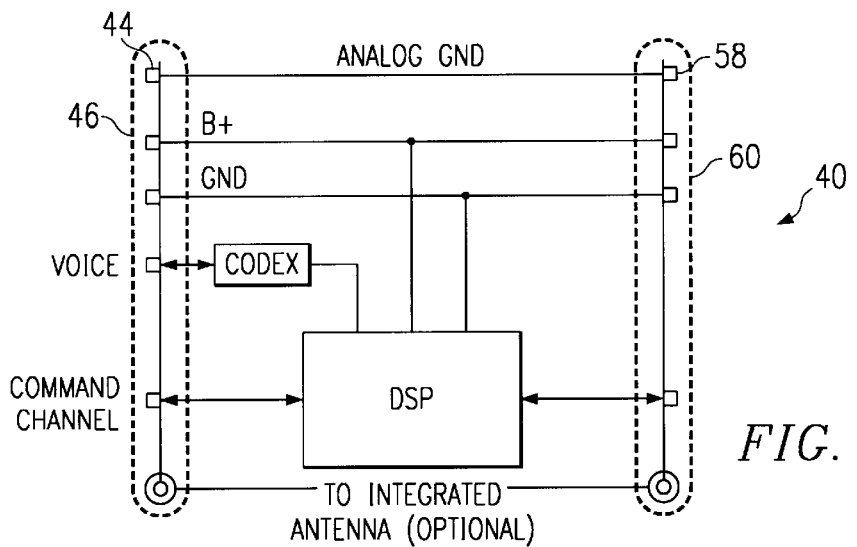
Figure 63:
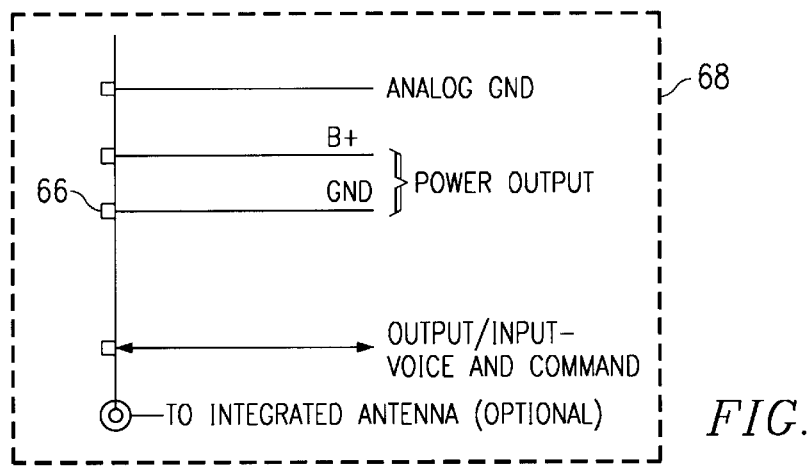
Figure 64:
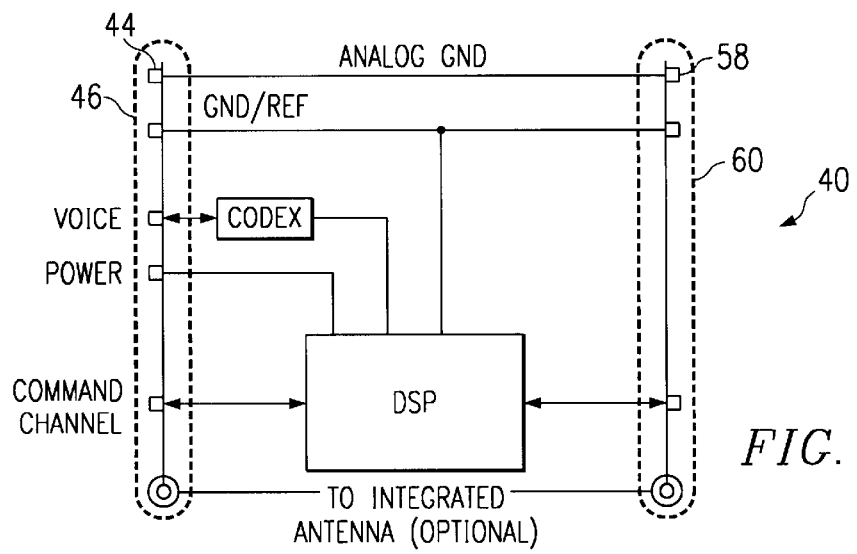
Figure 65:
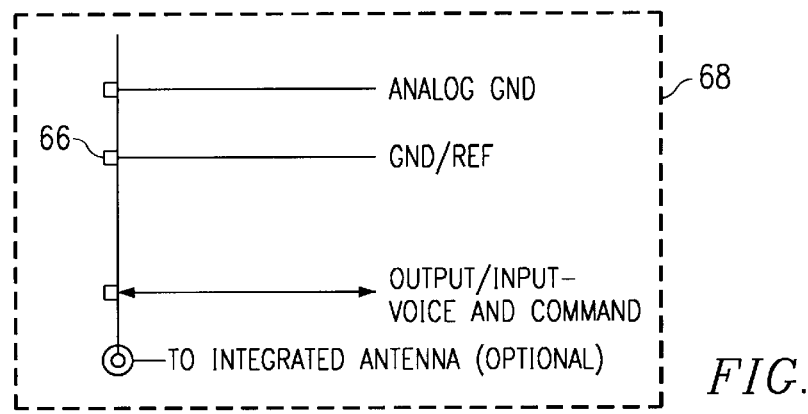

In the embodiment of the invention illustrated in FIG. 62, interface module 40 comprises: an analog ground lead line; power leads for charging the portable telephone's battery(s) while connected to the computer; a codex circuit for coupling a signal line (voice input and output for operating in a bi-directional half duplex mode) to a digital signal processor (DSP); and input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 63. In the embodiment of the invention illustrated in FIG. 64, interface module 40 comprises: an analog ground lead line; a ground/reference signal line; a codex circuit for coupling a signal line (voice input and output for operating in a bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 65.

Figure 66:
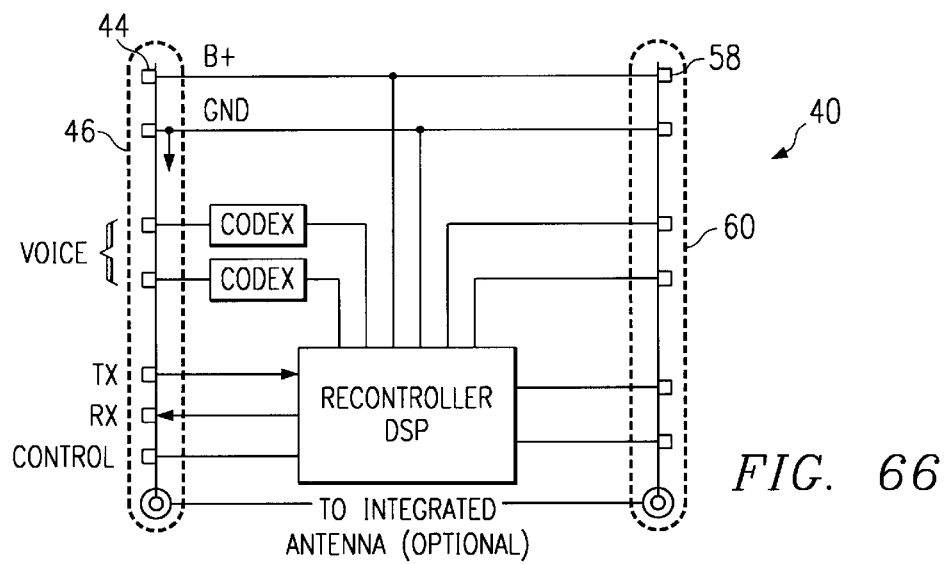
Figure 67:
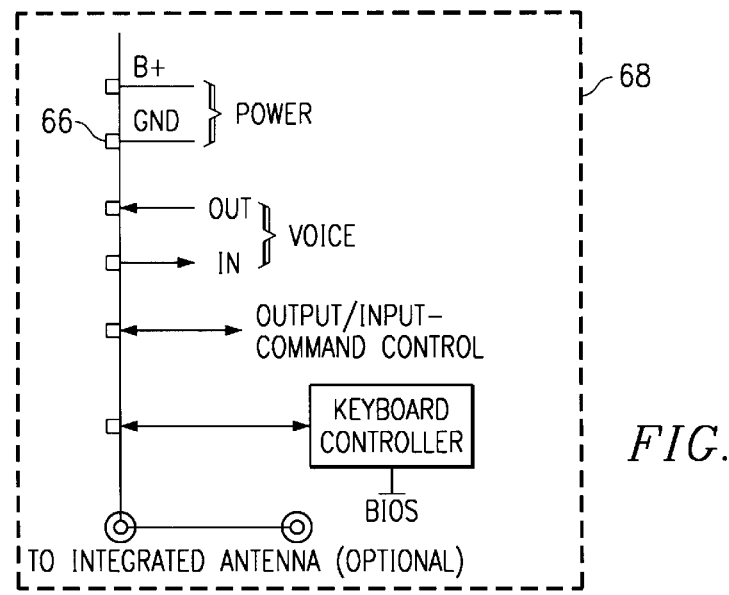
Figure 68:
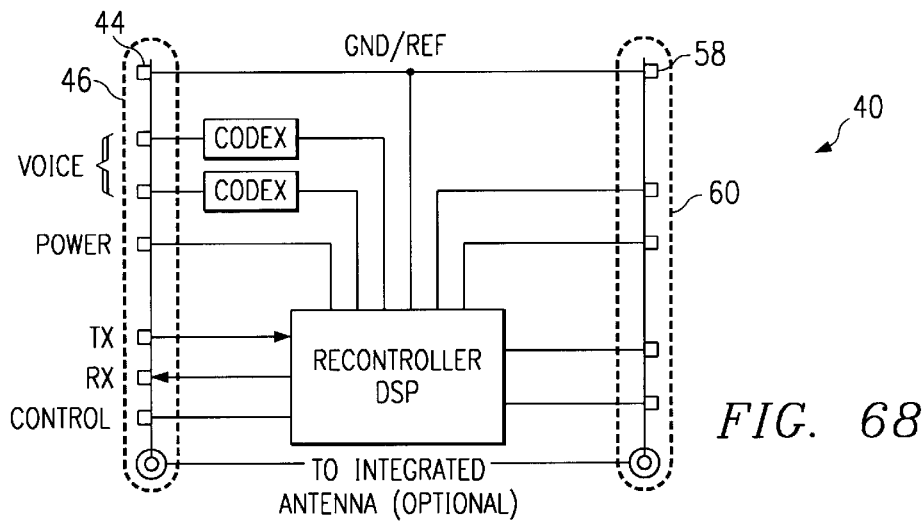
Figure 69:
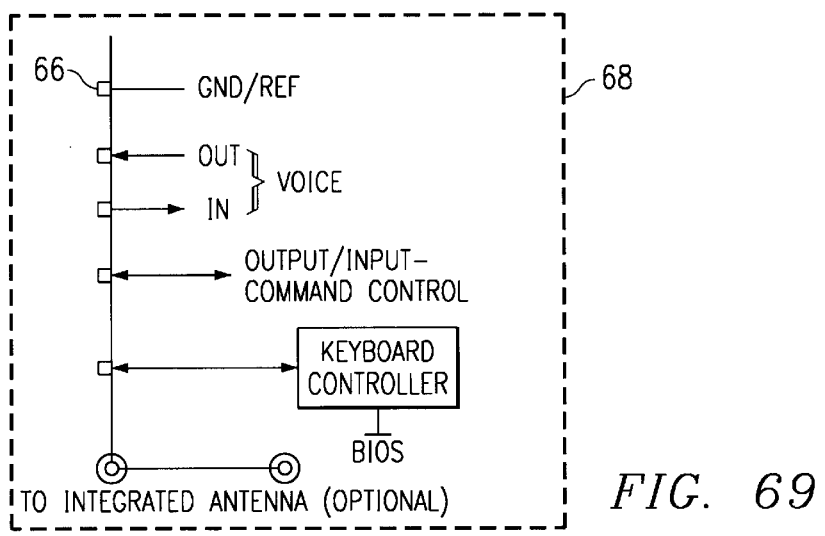

In the embodiment of the invention illustrated in FIG. 66, interface module 40 comprises: power leads for charging the portable telephone's battery(s) while connected to the computer; two codex circuits for coupling two signal lines (voice input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 67. In the embodiment of the invention illustrated in FIG. 68, interface module 40 comprises: a ground/reference signal line; two codex circuits for coupling two signal lines (voice input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 69.

Figure 70:
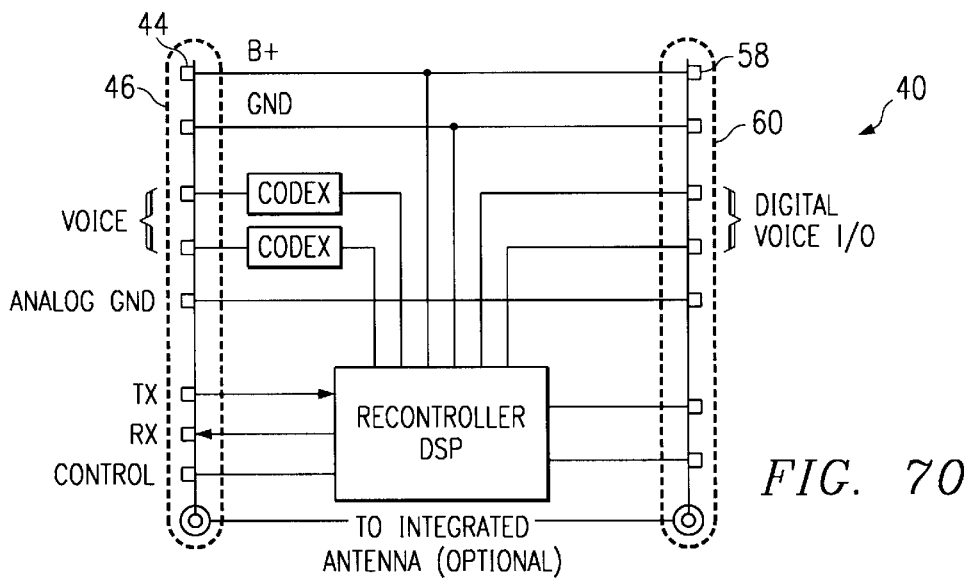
Figure 71:
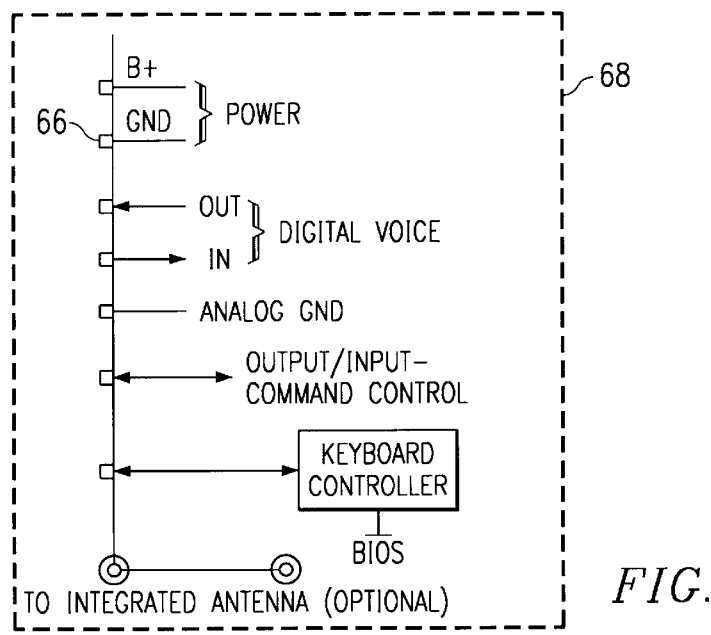
Figure 72:
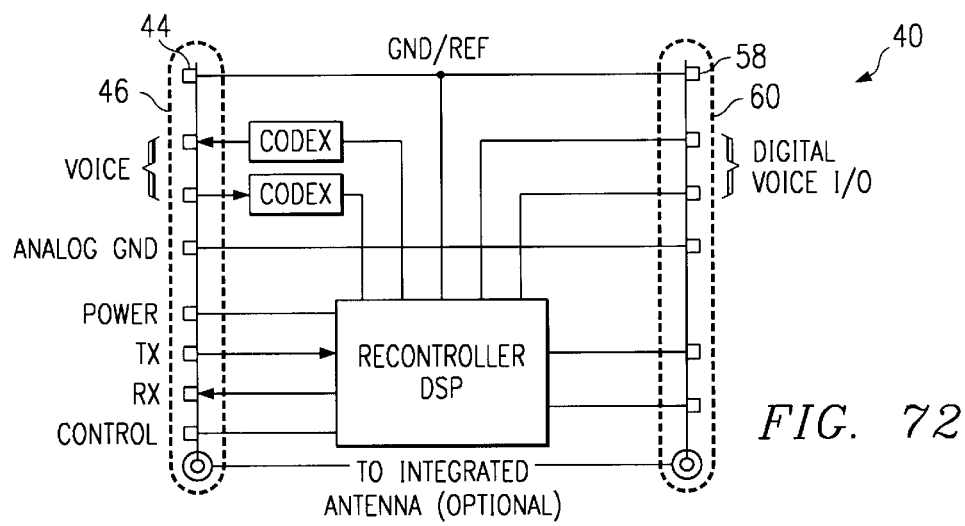
Figure 73:
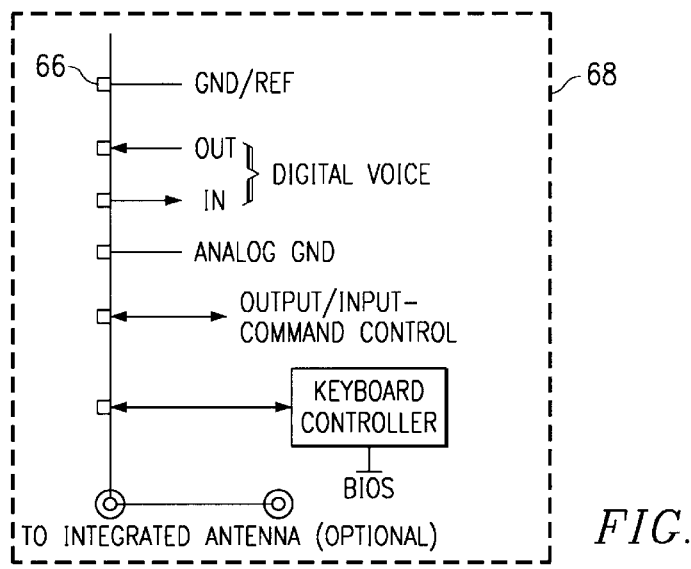

In the embodiment of the invention in FIG. 70, interface module 40 comprises: power leads for changing the portable telephone's battery(s) while connected to the computer; two codex circuits for coupling two signal lines (voice input and output) to a microcontroller DSP; an analog ground lead line; transmit, receive and control internal/external audio signal lines coupled to the microcontroller DSP; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 71. In the embodiment of the invention illustrated in FIG. 72, interface module 40 comprises: a ground/reference signal line; two codex circuits for coupling two signal lines (voice input and output) to a microcontroller DSP; an analog ground lead line; transmit, receive and control internal/;external audio signal lines coupled to the microcontroller DSP; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 73.

Figure 74:
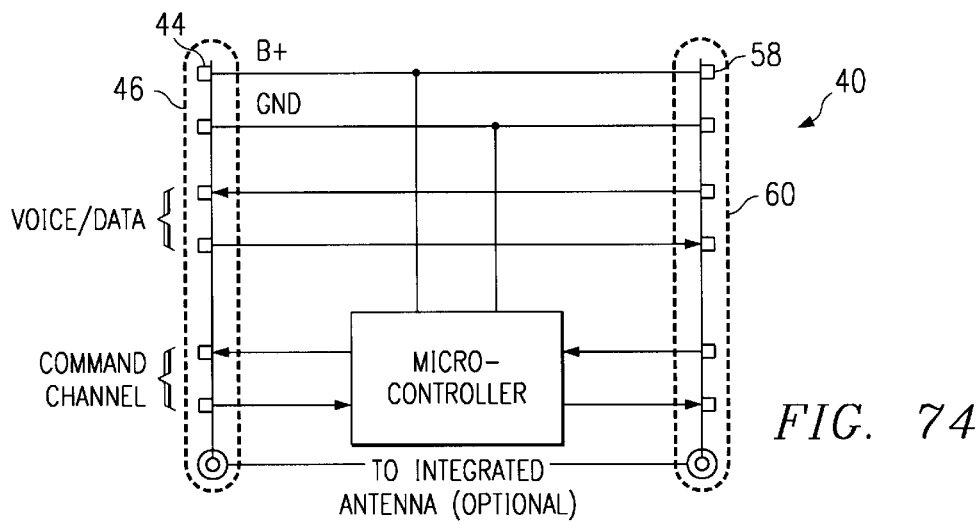
Figure 75:
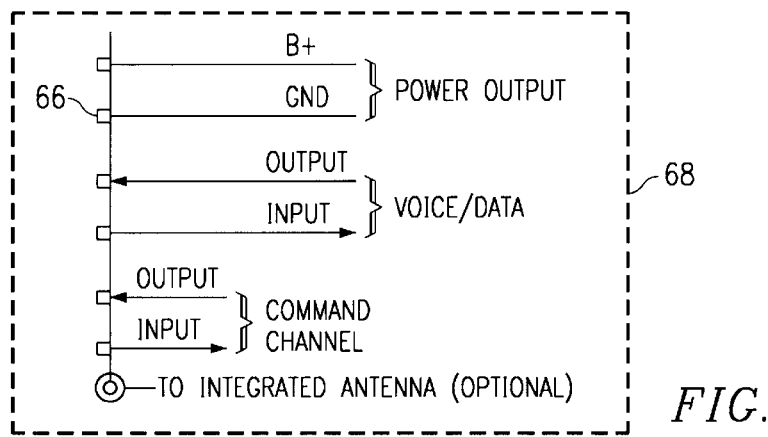
Figure 76:
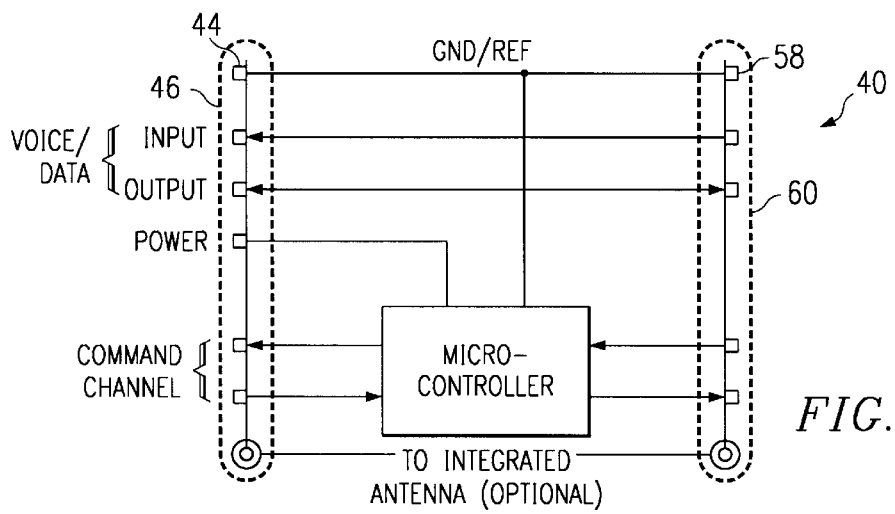
Figure 77:
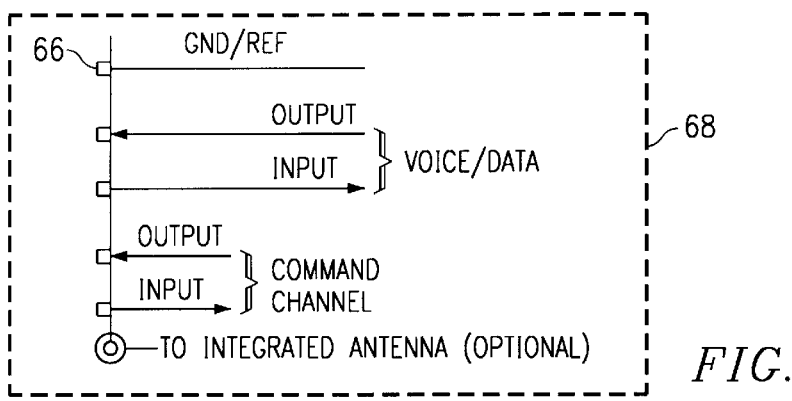

In the embodiment of the invention illustrated in FIG. 74, interface module 40 comprises: power leads for charging the portable telephone's battery(s) while connected to the computer; two signal lines (voice/data input and output) for full duplex mode; a microcontroller having input and output command channel leads; a signal line (optional) for coupling the portable telephone to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 75. In the embodiment of the invention illustrated in FIG. 76, interface module 40 comprises: a ground/reference signal line; two signal lines (voice/data input and output) for full duplex mode; a microcontroller having input and output command channel leads; a signal line (optional) for coupling to antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 77.

Figure 78:
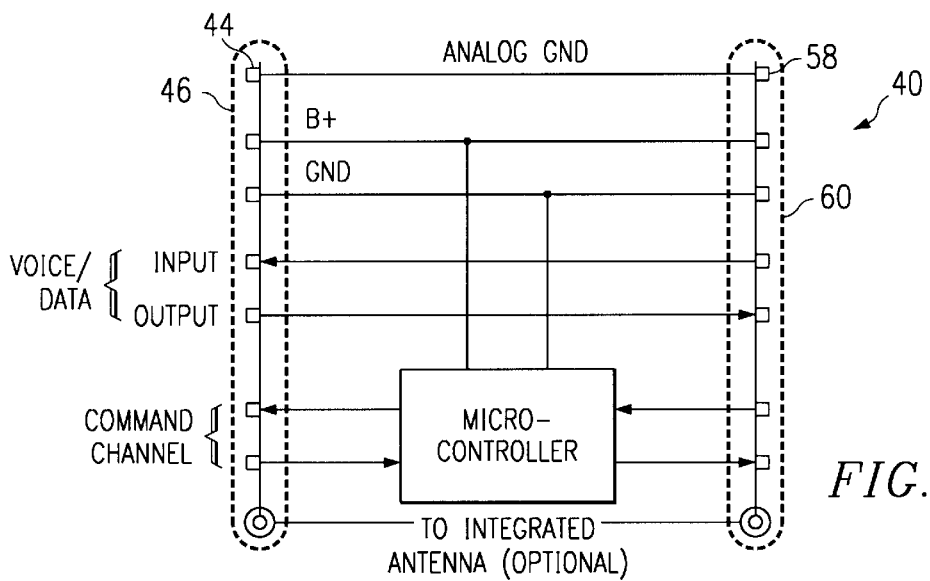
Figure 79:
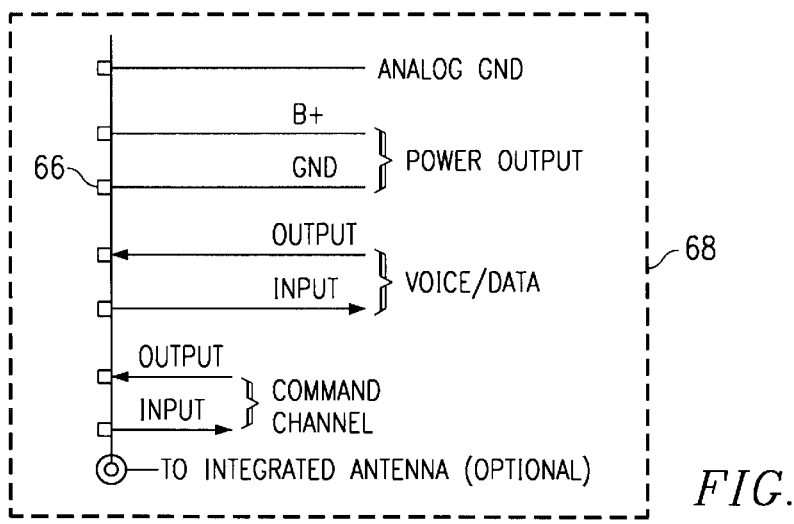
Figure 80:
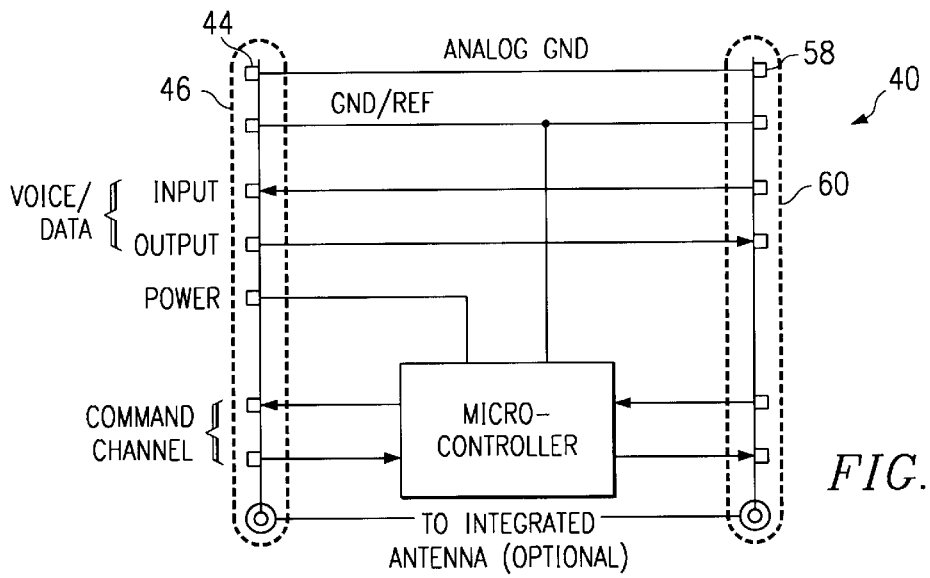
Figure 81:
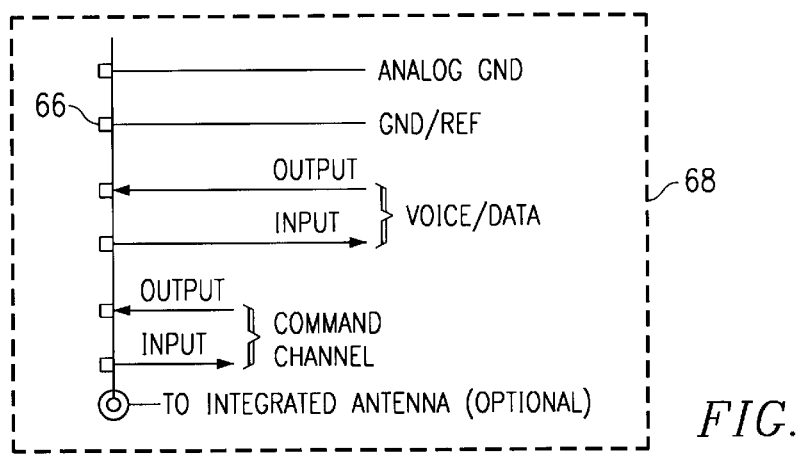

In the embodiment of the invention illustrated in FIG. 78, interface module 40 comprises: an analog ground lead line; power leads for charging the portable telephone's battery(s) while connected to the computer; two signal lines (voice/data input and output) for full duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 79. In the embodiment of the invention illustrated in FIG. 80, interface module 40 comprises: an analog ground lead line; a ground/reference signal line; two signal lines (voice/data input and output) for full duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 81. Power leads may be omitted in embodiments of the invention where computer charging of the portable telephone's battery(s) is not desired.

Figure 82:
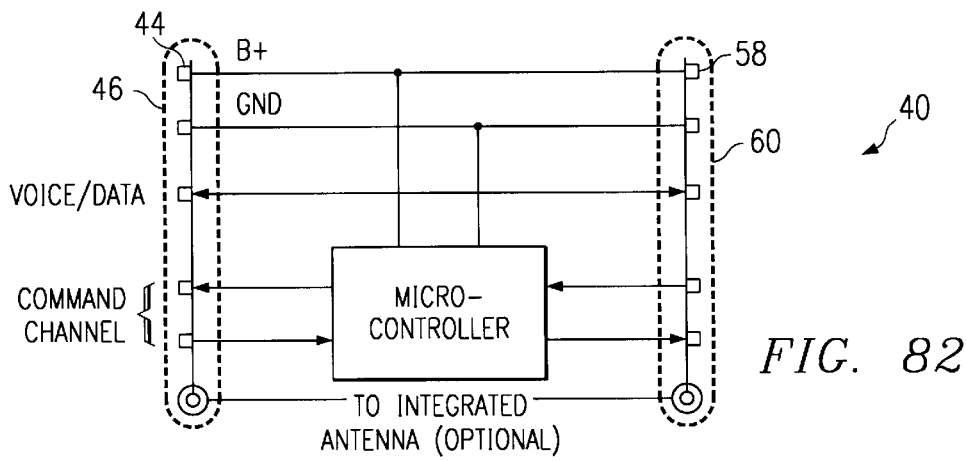
Figure 83:
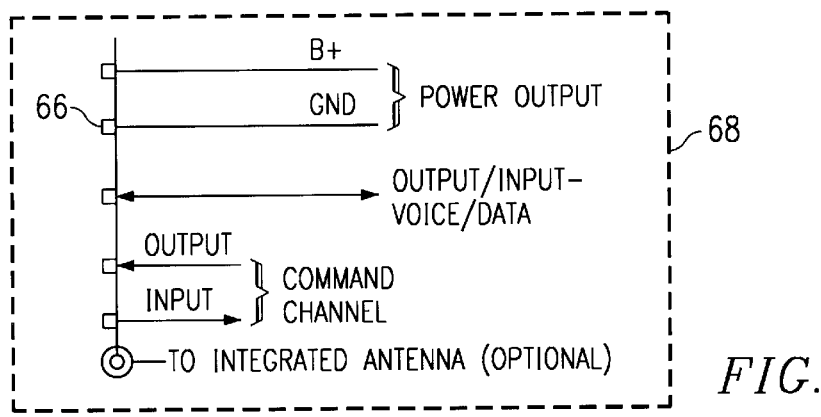
Figure 84:
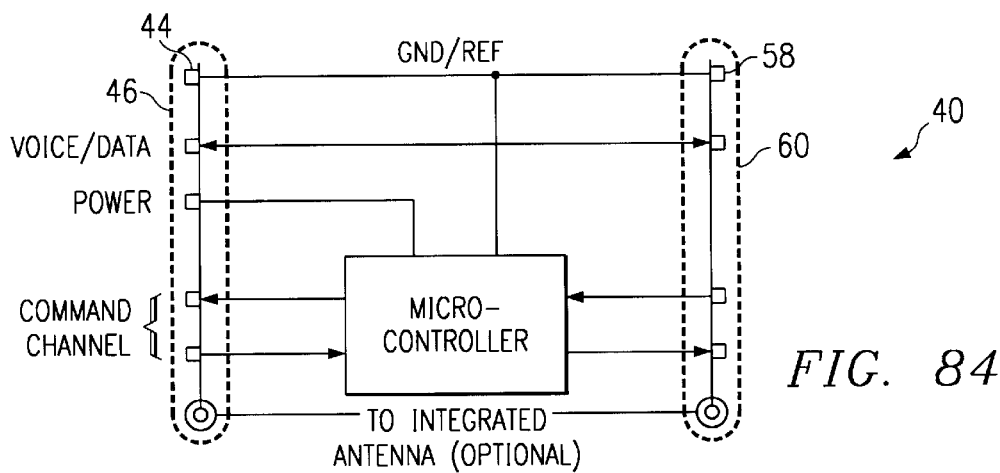
Figure 85:
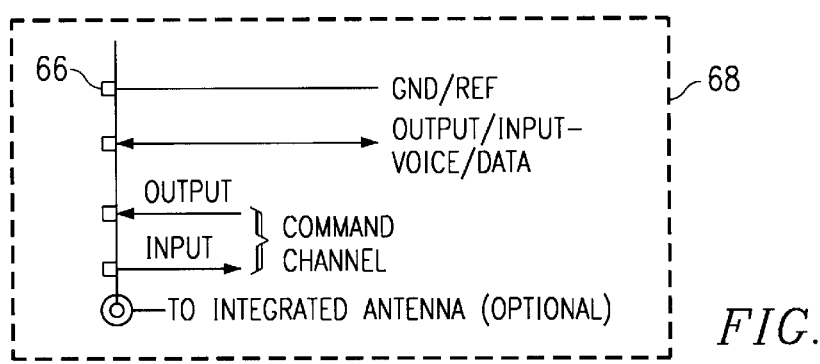

In the embodiment of the invention illustrated in FIG. 82, interface module 40 comprises: power leads for charging the portable telephone's battery(s) while connected to the computer; one signal line (voice/data input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 83. In the embodiment of the invention illustrated in FIG. 84, interface module 40 comprises: a ground/reference signal line; one signal line (voice/data input and output) for operating in a bi-directional half duplex mode; a microcontroller having input and output command channel leads; a signal line (optional) for coupling to an antenna integrated in the computer; and electrical contacts 47 in portable telephone 16 and electrical contacts 58 for coupling the leads to corresponding electrical contacts 66 in portable computer 62, as illustrated in FIG. 85. Power leads may be omitted in embodiments of the invention where computer charging of the portable telephone's battery (s) is not desired.

Figure 86:
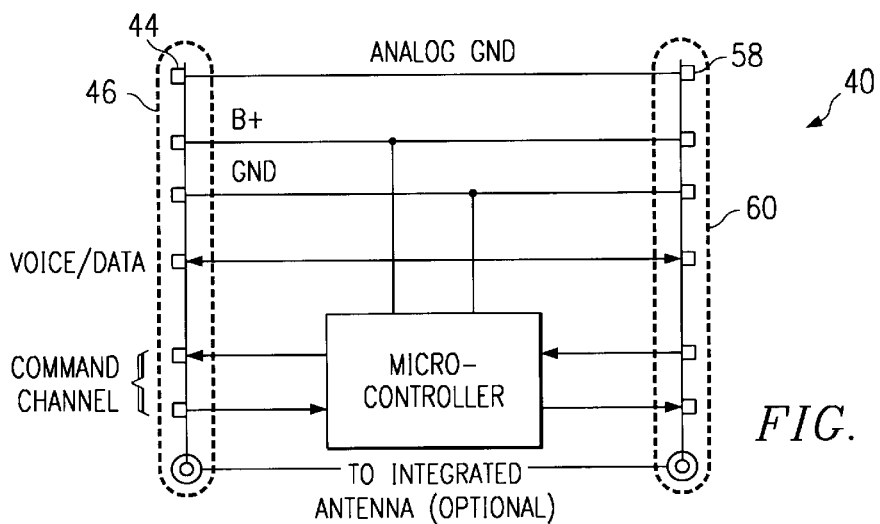
Figure 87:
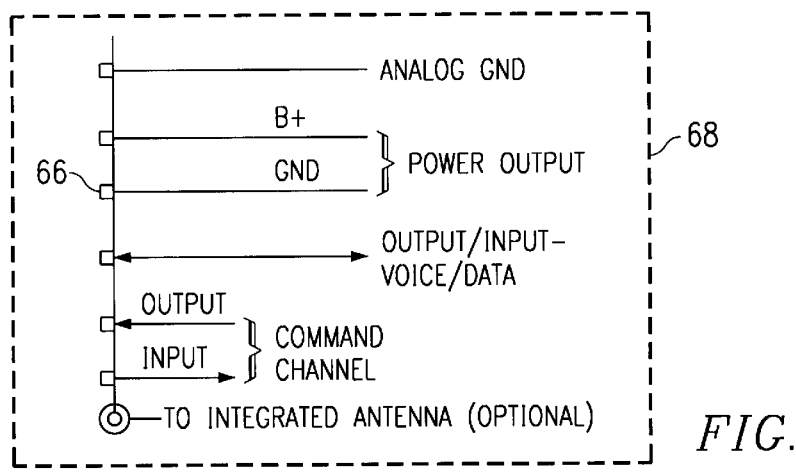
Figure 88:
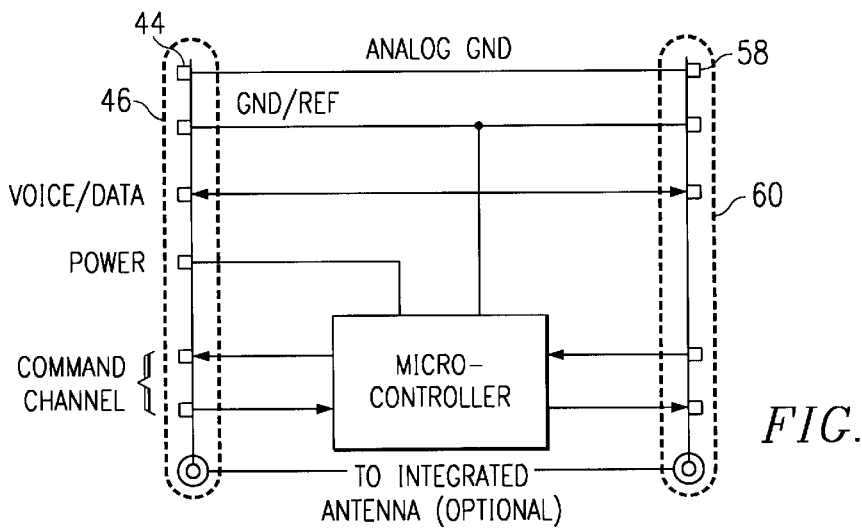
Figure 89:
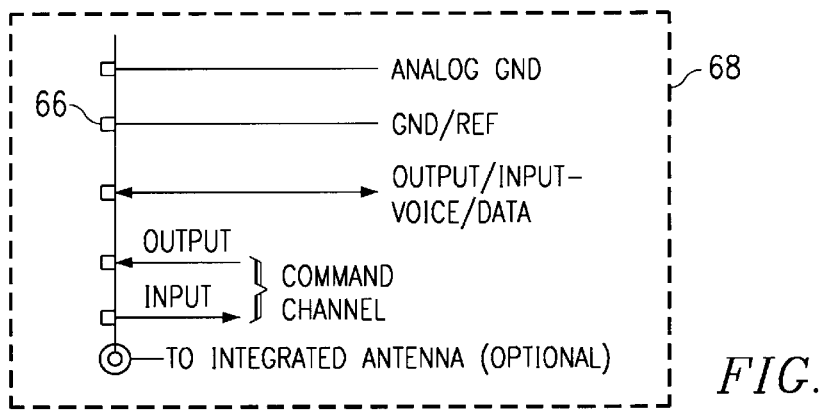

In the embodiment of the invention illustrated in FIG. 86, interface module 40 comprises: an analog ground lead line; power leads for charging the portable telephone's battery(s) while connected to the computer; one signal line (voice input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 87. In the embodiment of the invention illustrated in FIG. 88 interface module 40 comprises: an analog ground lead line; a ground/reference signal line; one signal line (voice/data input and output) for operating in a bi-directional half duplex mode; a microcontroller having input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 89. Power leads may be omitted in embodiments of the invention where computer charging of the portable telephone's battery(s) is not desired.

Figure 90:
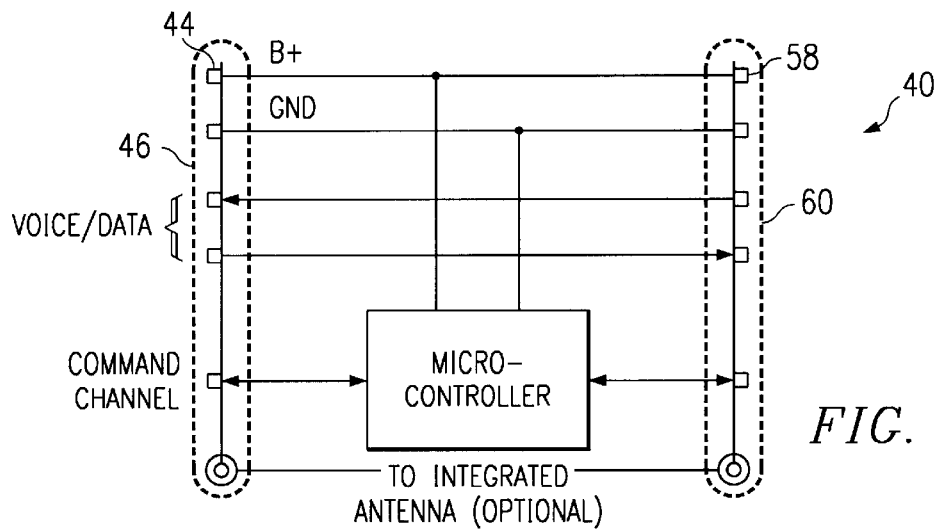
Figure 91:
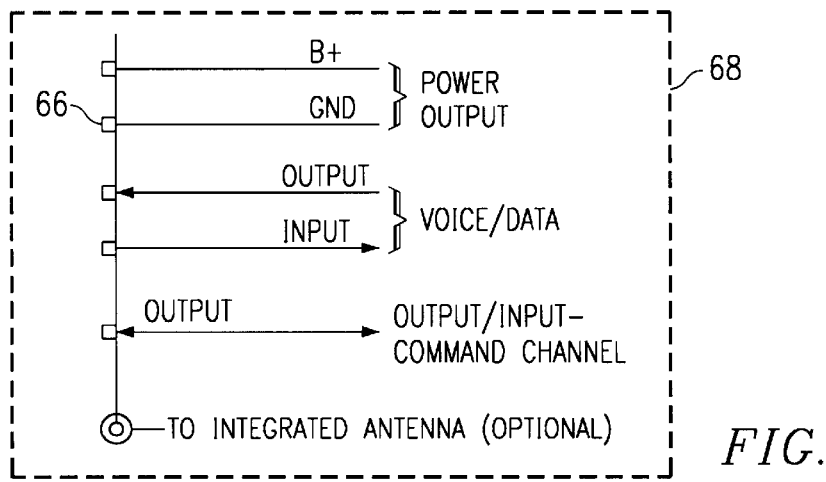
Figure 92:
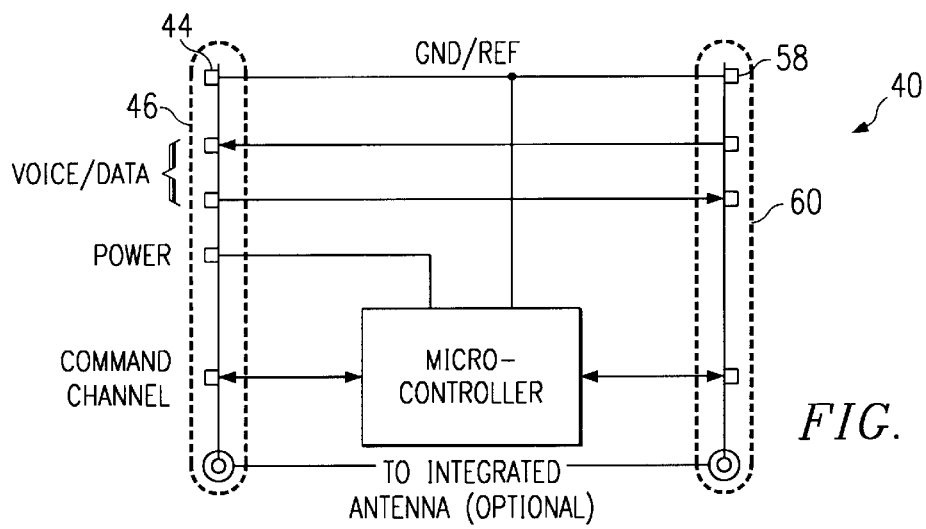
Figure 93:
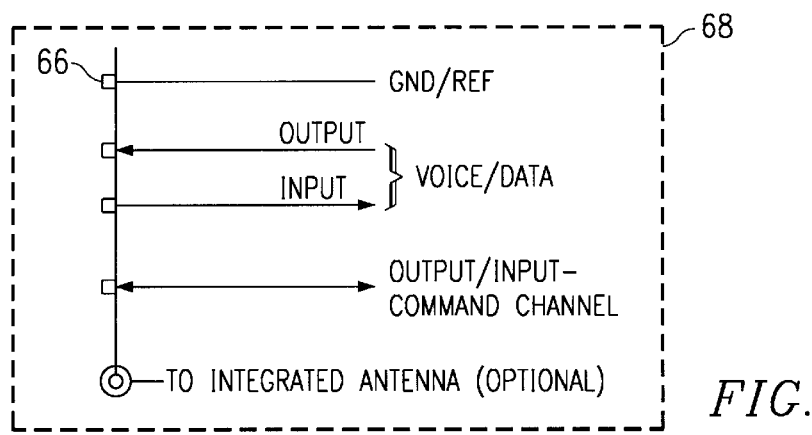

In the embodiment of the invention, illustrated in FIG. 90, interface module 40 comprises: power leads for charging the portable telephone's battery(s) while connected to the computer; two signal lines (voice/data input and output) for full duplex mode; a microcontroller having one input/output command channel lead line for operating in a bi-directional half duplex mode; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 91. In the embodiment of the invention illustrated in FIG. 92, interface module 40 comprises: a ground/reference signal line; two signal lines (voice input and output) for full duplex mode; a microcontroller having one input/output command channel lead line for operating in a bi-directional half duplex mode; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 93. Power leads may be omitted in embodiments of the invention where computer charging of the portable telephone's battery(s) is not desired.

Figure 94:
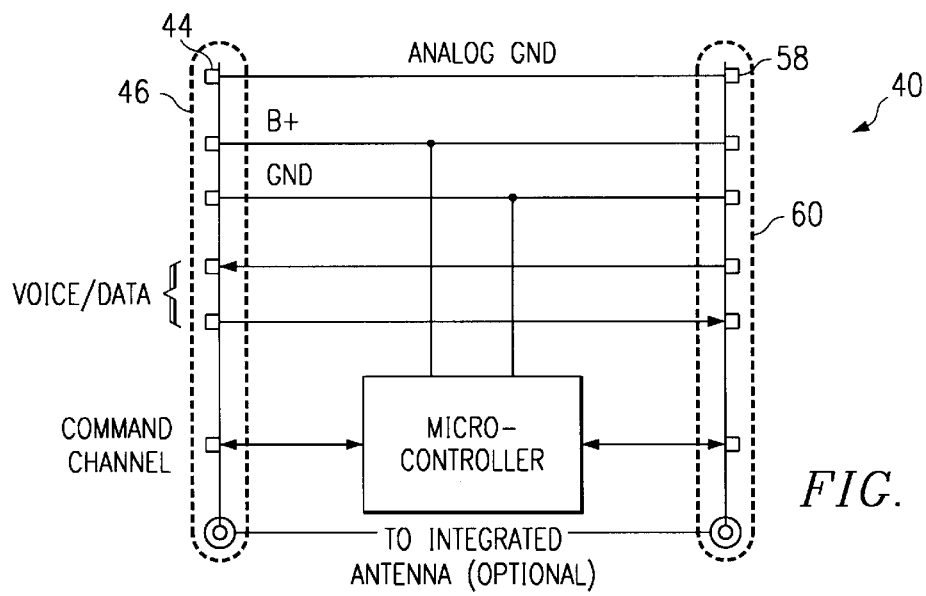
Figure 95:
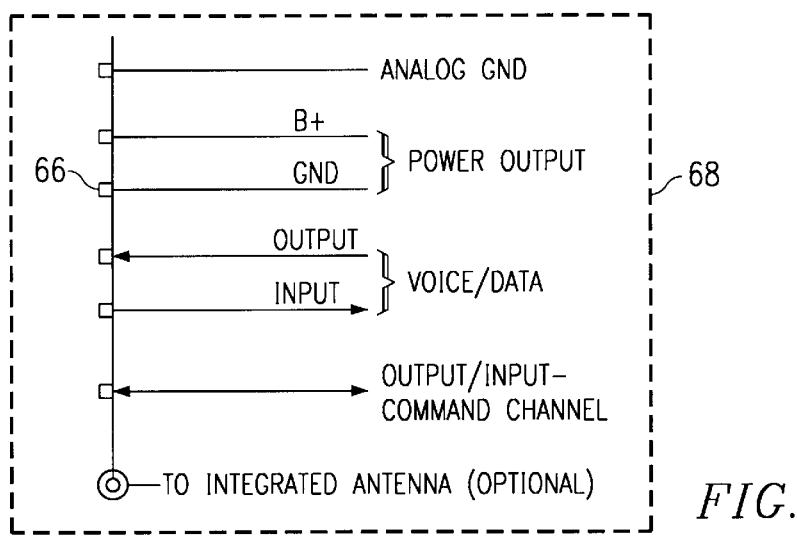
Figure 96:
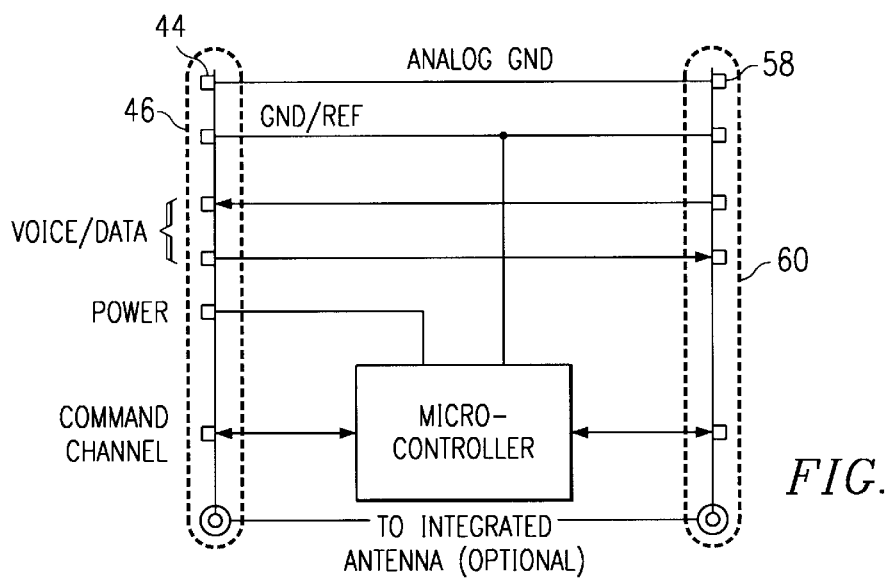
Figure 97:
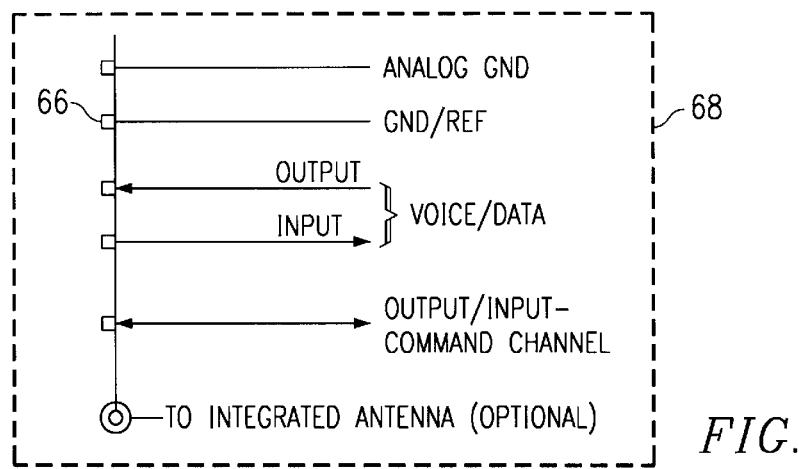

In the embodiment of the invention illustrated in FIG. 94, interface module 40 comprises: an analog ground lead line; power leads for charging the portable telephone's battery(s) while connected to the computer; two signal lines (voice/data input and output) for full duplex mode; a microcontroller having one input/output command channel lead line for operating in a bi-directional half duplex mode; a signal line (optional) for coupling to an antenna integrated in the computer; and electrical contacts for coupling the leads to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 95. In the embodiment of the invention illustrated in FIG. 96, interface module 40 comprises: an analog ground lead line; a ground/reference signal line; two signal lines (voice/data input and output) for full duplex mode; a microcontroller having one input/output command channel lead line for operating in a bi-directional half duplex mode; a signal line (optional) for coupling to an antenna integrated in the computer; and electrical contacts for 46 for coupling the leads to corresponding electrical contacts 47 in portable telephone 16 and electrical contacts 58 for coupling the leads to corresponding electrical contacts 66 in portable computer 62, as illustrated in FIG. 97.

Figure 98:
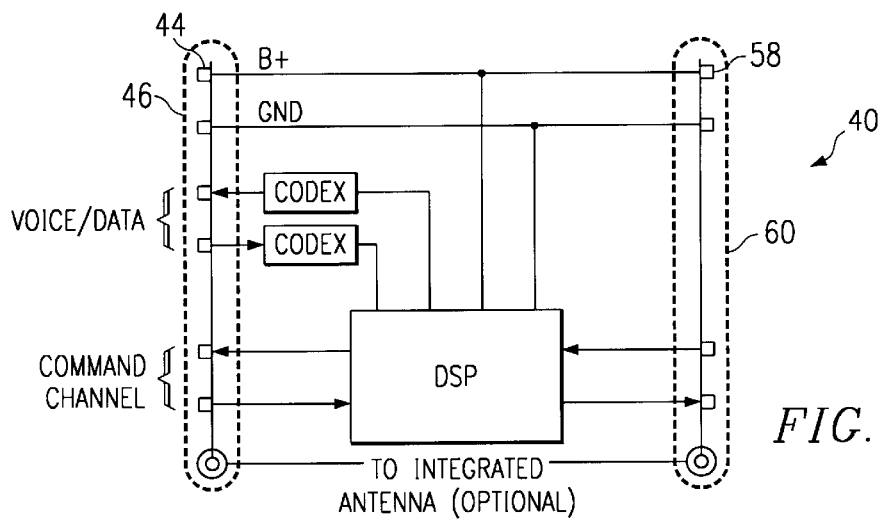
Figure 99:
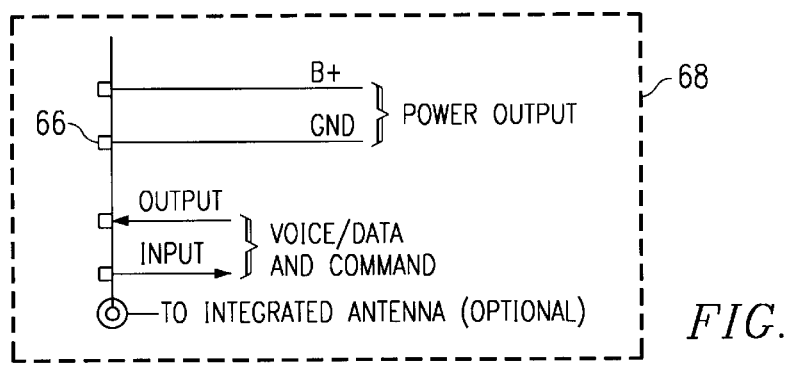
Figure 100:
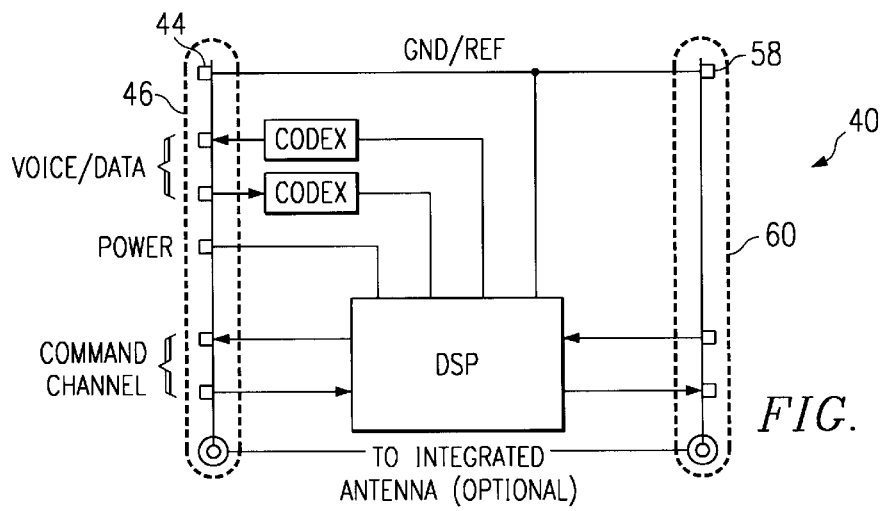
Figure 101:
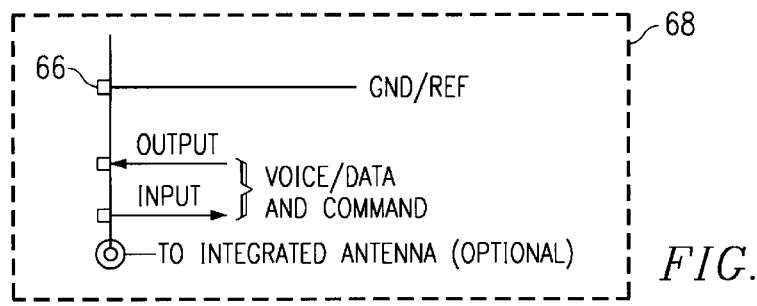

In the embodiment of the invention illustrated in FIG. 98, interface module 40 comprises: power leads for charging the portable telephone's battery(s) while connected to the computer; two codex circuits for coupling two signal lines (voice/data input and output) to a digital signal processor (DSP); input and output command channel leads, a signal line (optional) for coupling to an antenna integrated in the computer; and electrical contacts for coupling the power leads and at least two input/output leads coupled to the DSP, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 99. In the embodiment of the invention illustrated in FIG. 100, interface module 40 comprises: a ground/reference signal line; two codex circuits for coupling two signal lines (voice/data input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 101.

Figure 102:
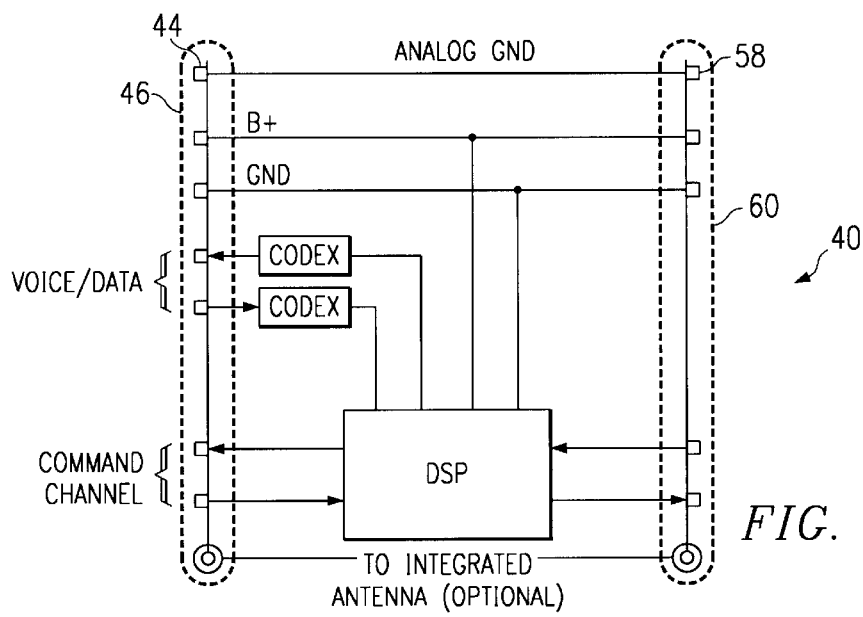
Figure 103:
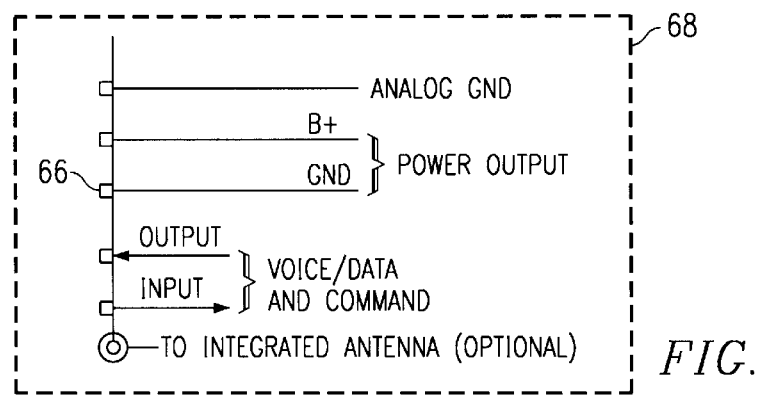
Figure 104:
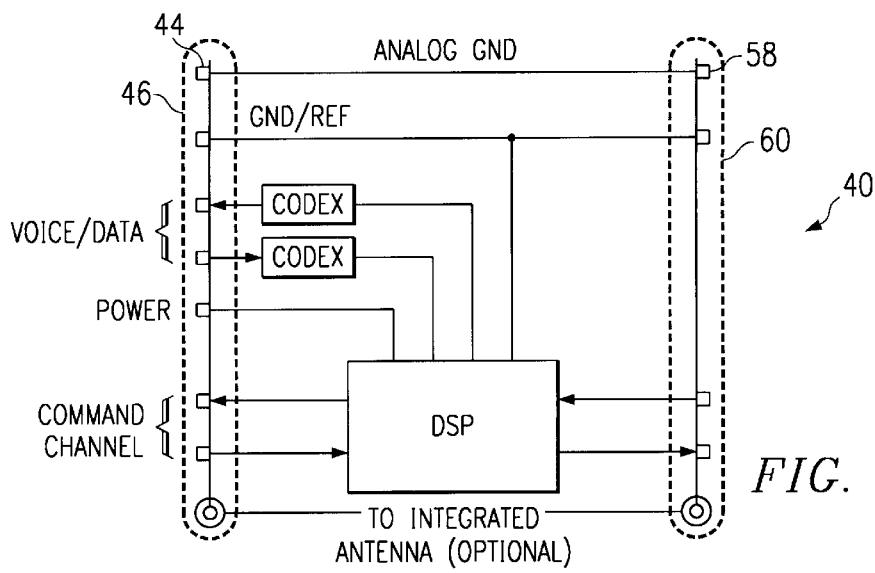
Figure 105:
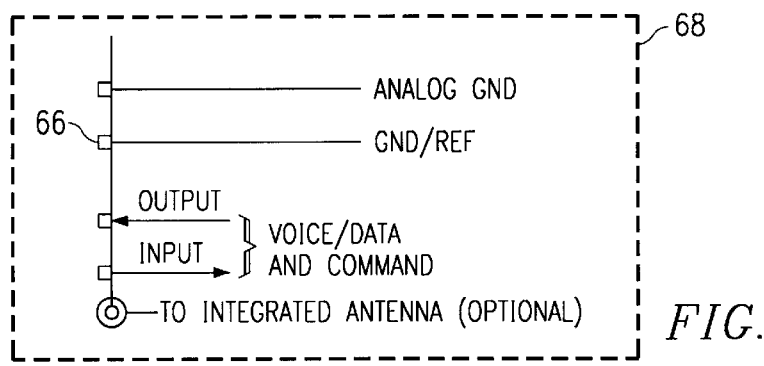

In the embodiment of the invention illustrated in FIG. 102, interface module 40 comprises: an analog ground lead line; two codex circuits for coupling two signal lines (voice/data input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 103. In the embodiment of the invention illustrated in FIG. 104, interface module 40 comprises: an analog ground lead line; a ground/reference signal line; two codex circuits for coupling two signal lines (voice/data input and output) to a digital signal processor (DSP); input and output command channel leads; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 105. Power leads may be omitted in embodiments of the invention where computer charging of the portable telephone's battery(s) is not desired.

Figure 106:
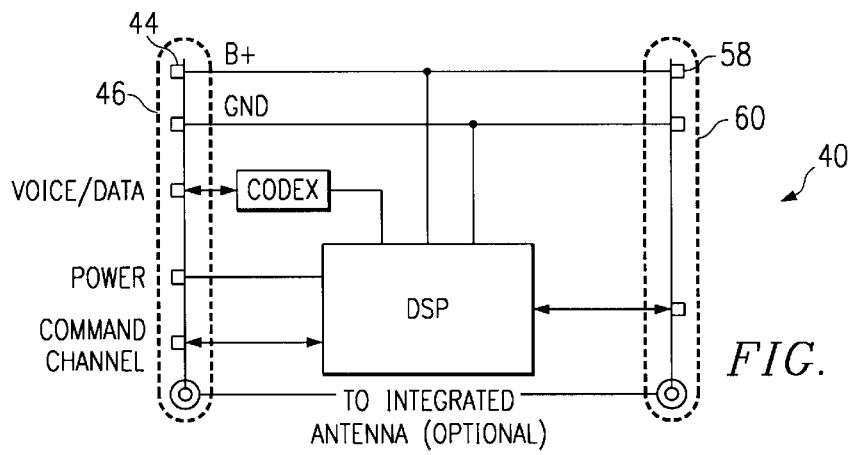
Figure 107:
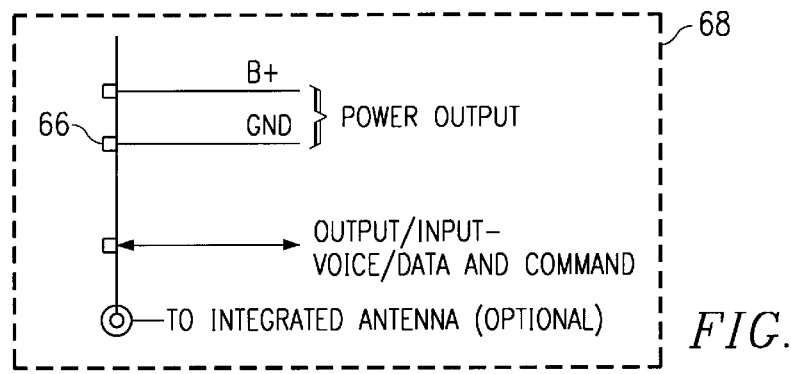
Figure 108:
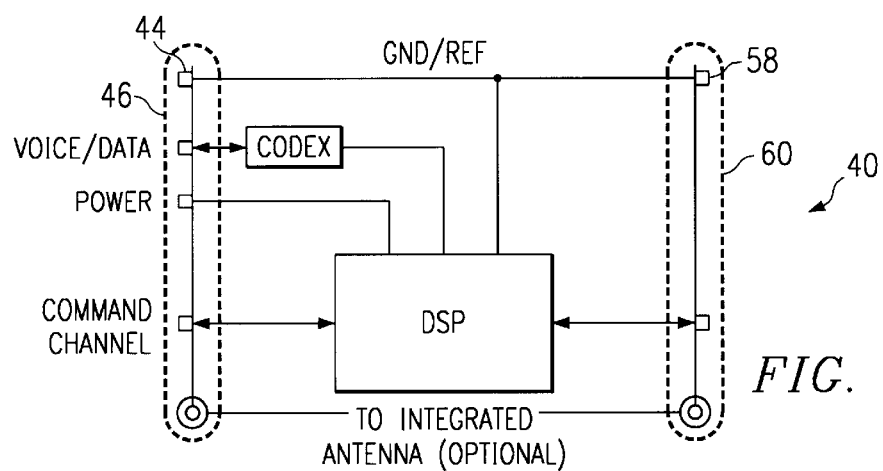
Figure 109:
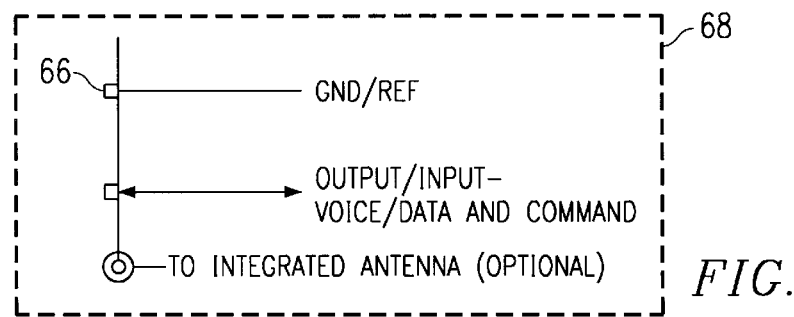

In the embodiment of the invention illustrated in FIG. 106, interface module 40 comprises: power leads for charging the portable telephone's battery(s) while connected to the computer; a codex circuit for coupling a signal line (voice/data input and output for operating in a bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 107. In the embodiment of the invention illustrated in FIG. 108, interface module 40 comprises: a ground/reference signal line; a codex circuit for coupling a signal line (voice/data input and output for operating in bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 109.

Figure 110:
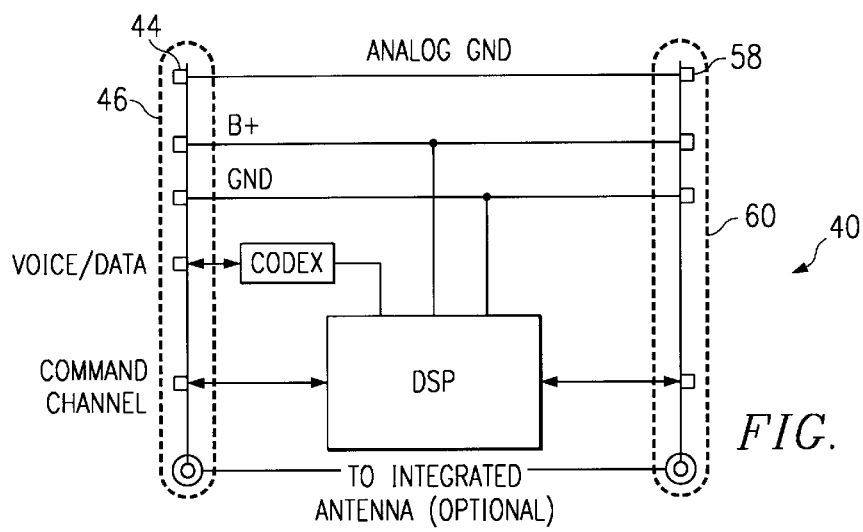
Figure 111:
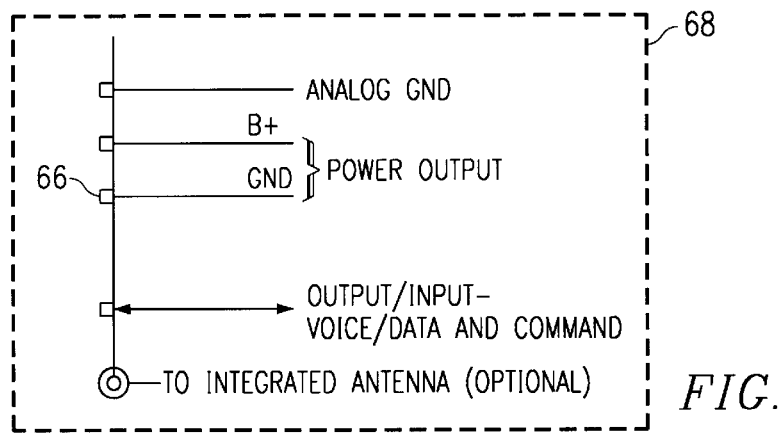
Figure 112:
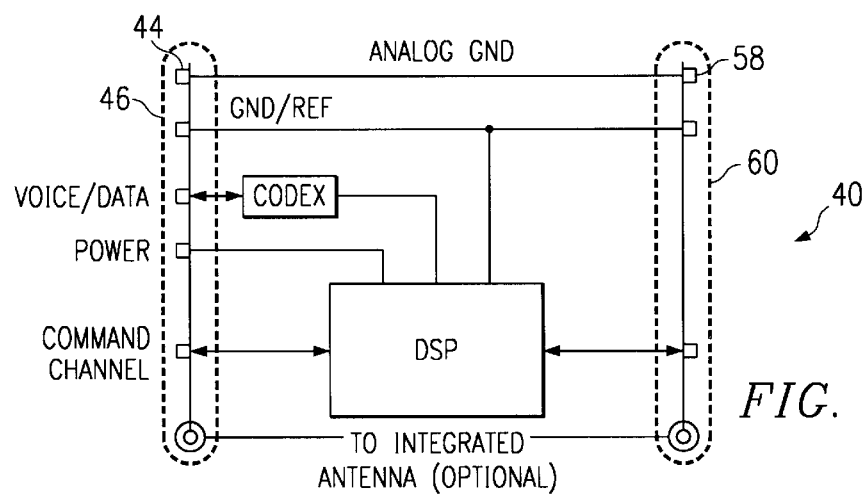
Figure 113:
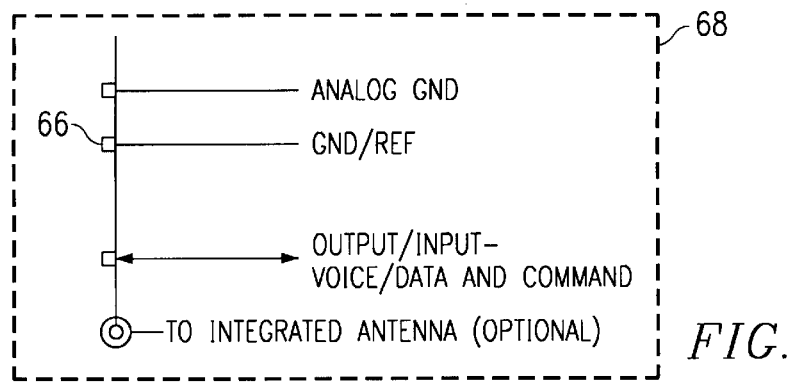

In the embodiment of the invention illustrated in FIG. 110, interface module 40 comprises: an analog ground lead line; power leads for charging the portable telephone's battery(s) while connected to the computer; a codex circuit for coupling a signal line (voice/data input and output for operating in a bi-directional half duplex mode) to a digital signal processor (DSP); and input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 111. In the embodiment of the invention illustrated in FIG. 112, interface module 40 comprises: an analog ground lead line; a ground/reference signal line; a codex circuit for coupling a signal line (voice/data input and output for operating in a bi-directional half duplex mode) to a digital signal processor (DSP); an input and output command channel lead; a signal line (optional) for coupling to an antenna integrated in the computer; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 113.

Figure 114:
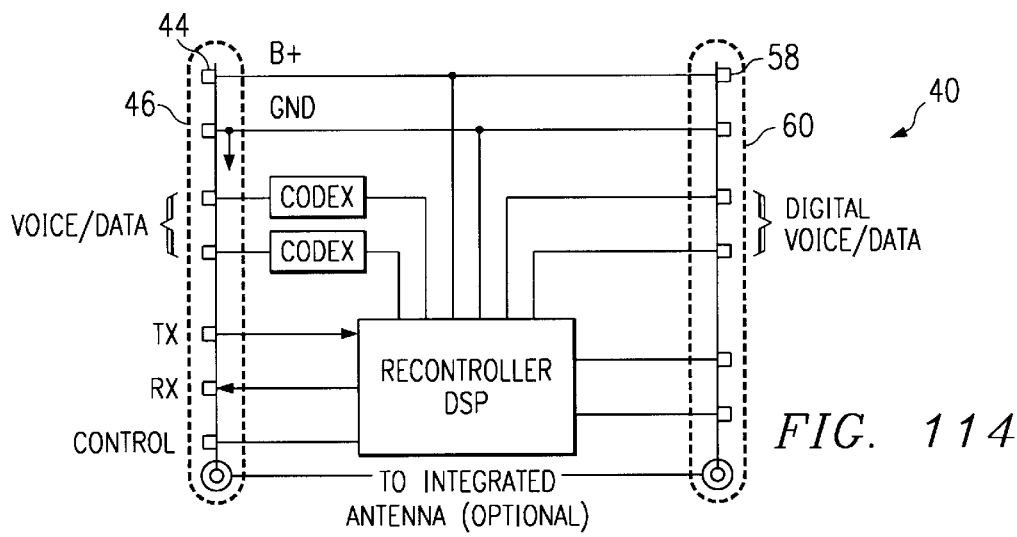
Figure 115:
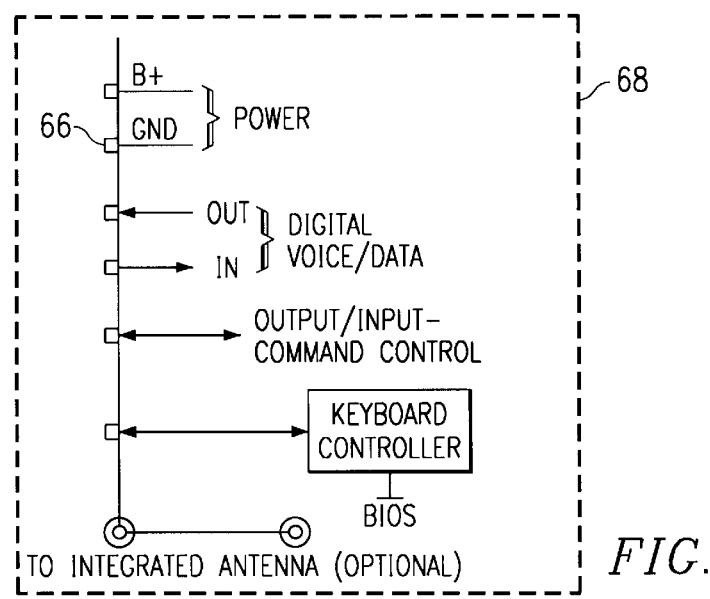
Figure 116:
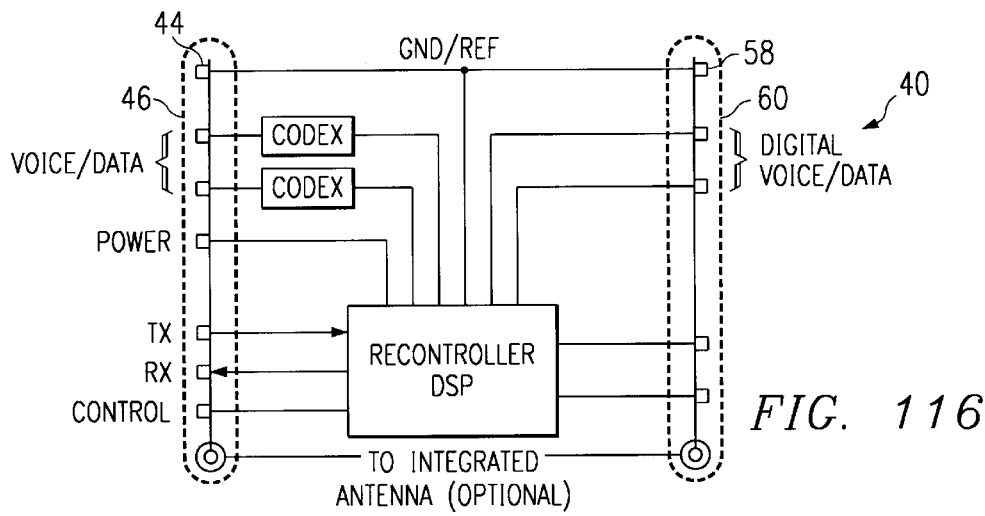
Figure 117:
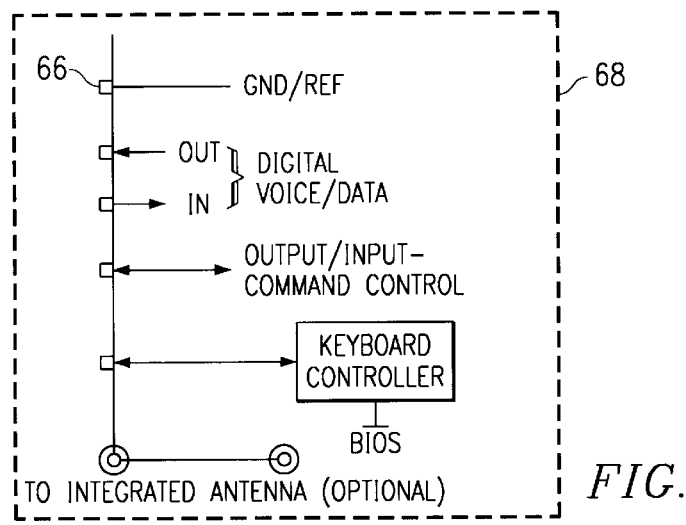

In the embodiment of the invention illustrated in FIG. 114, interface module 40 comprises: power leads for charging the portable telephone's battery(s) while connected to the computer; two codex circuits for coupling two signal lines (voice/data input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 115. In the embodiment of the invention illustrated in FIG. 116, interface module 40 comprises: a ground/reference signal line; two codex circuits for coupling two signal lines (voice/data input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 46 for coupling the leads to corresponding electrical contacts 47 in portable telephone 16 and electrical contacts 58 for coupling the leads to corresponding electrical contacts 66 in portable computer 62, as illustrated in FIG. 117.

Figure 118:
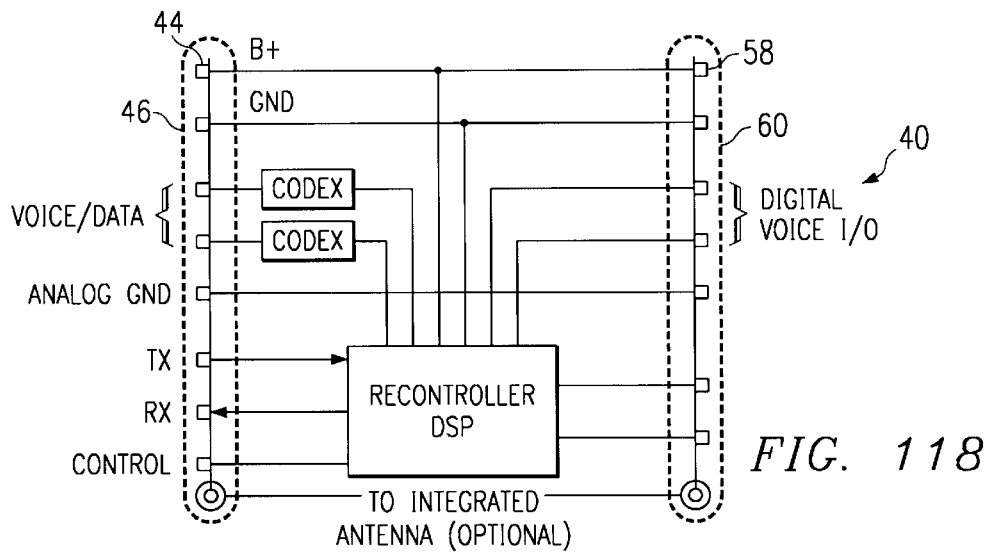
Figure 119:
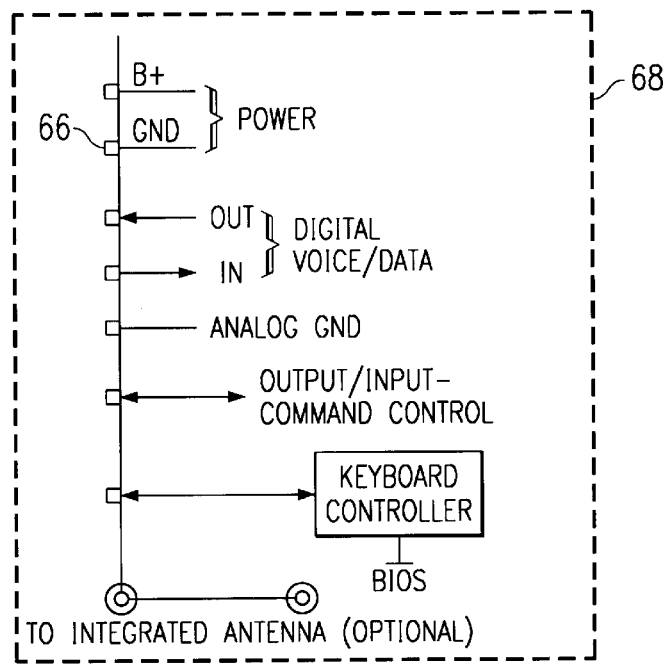
Figure 120:
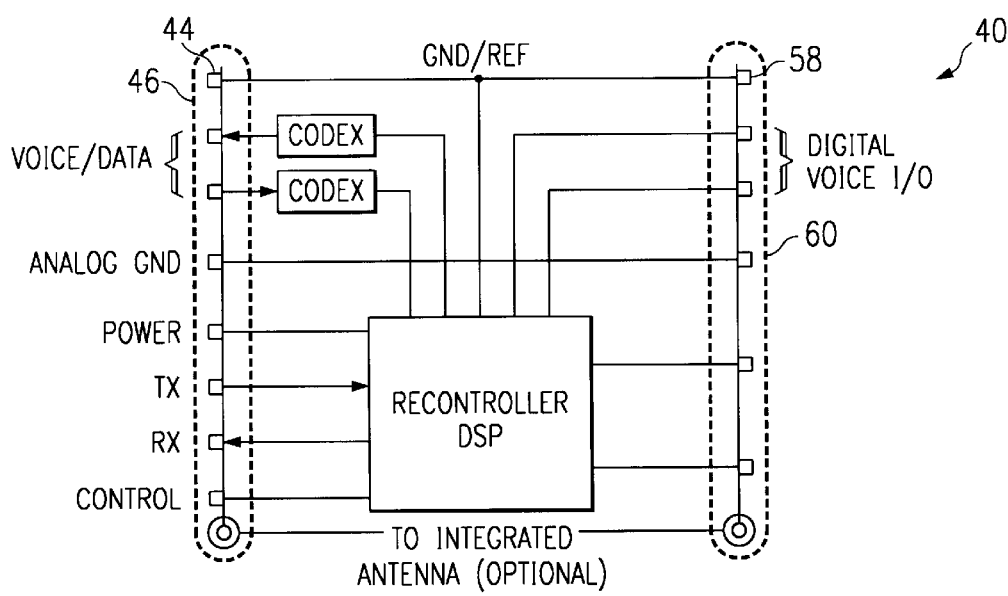
Figure 121:
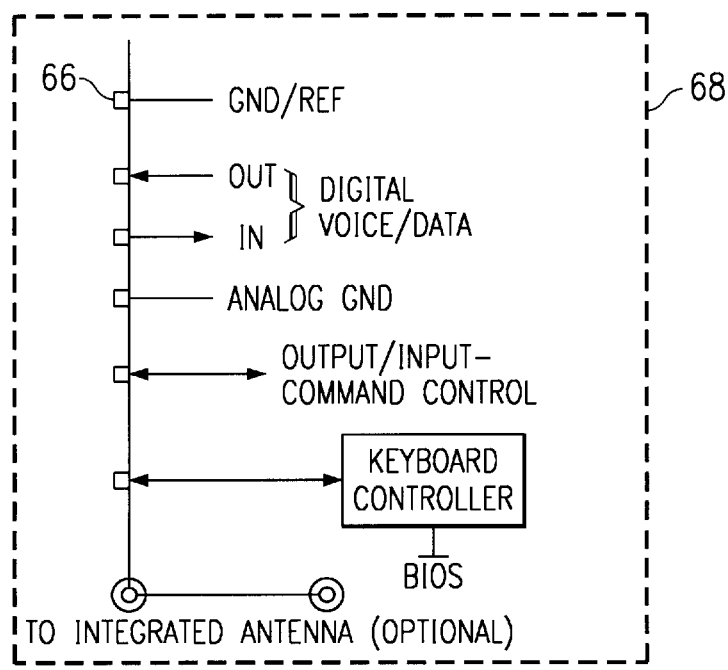

In the embodiment of the invention in FIG. 118, interface module 40 comprises: power leads for changing the portable telephone's battery(s) while connected to the computer; two codex circuits for coupling two signal lines (voice/data input and output) to a microcontroller DSP; an analog ground lead line; transmit, receive and control internal/external audio signal lines coupled to the microcontroller DSP; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 119. In the embodiment of the invention illustrated in FIG. 120, interface module 40 comprises: a ground/reference signal line; two codex circuits for coupling two signal lines (voice input and output) to a microcontroller DSP; an analog ground lead line; transmit, receive and control internal/;external audio signal lines coupled to the microcontroller DSP; and electrical contacts 46 for coupling the leads to corresponding electrical contacts 47 in portable telephone 16 and electrical contacts 58 for coupling the leads to corresponding electrical contacts 66 in portable computer 62, as illustrated in FIG. 121.

Figure 122:
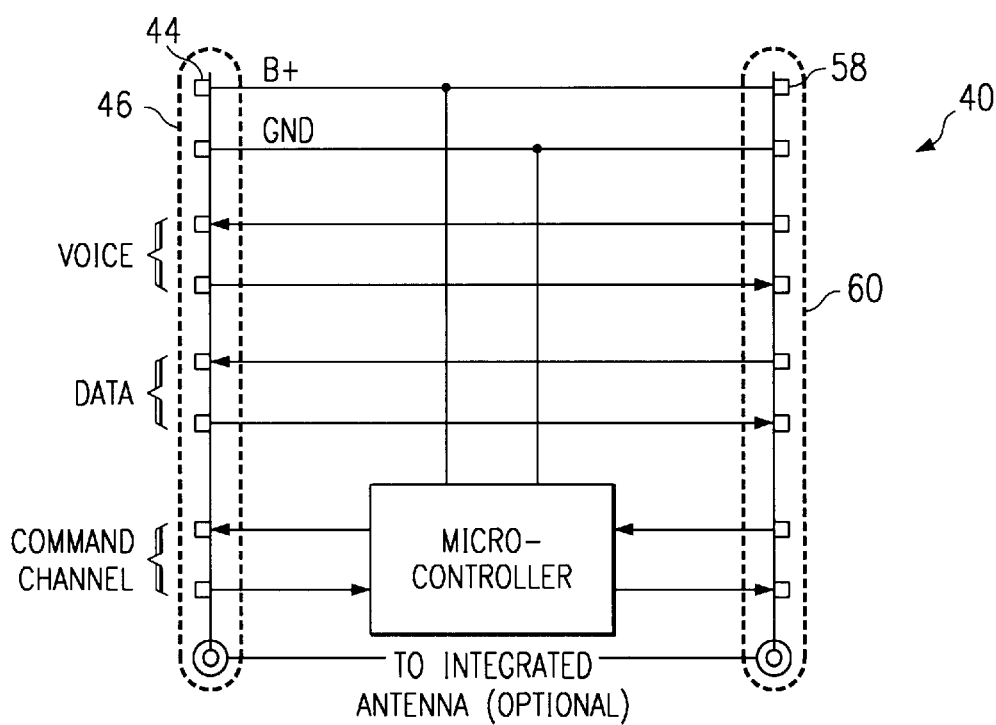
Figure 123:
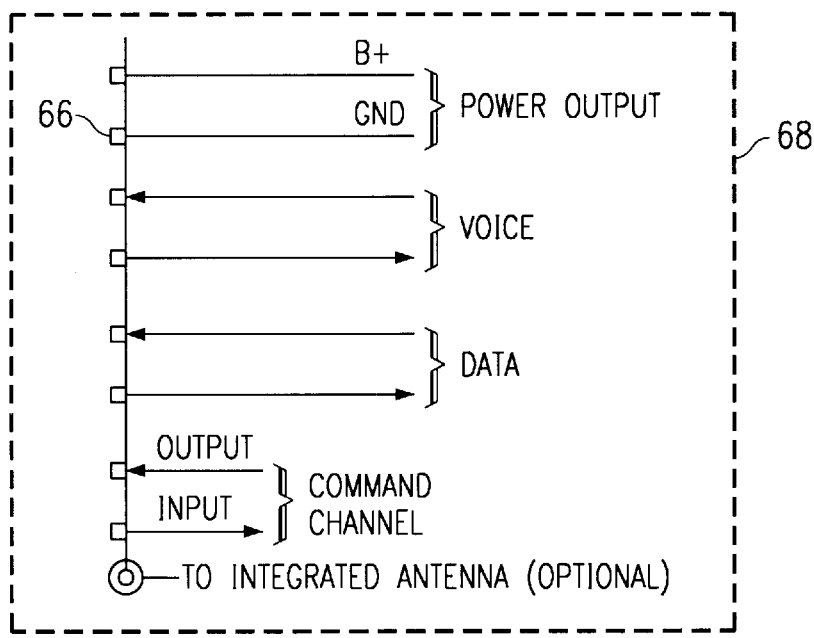
Figure 124:
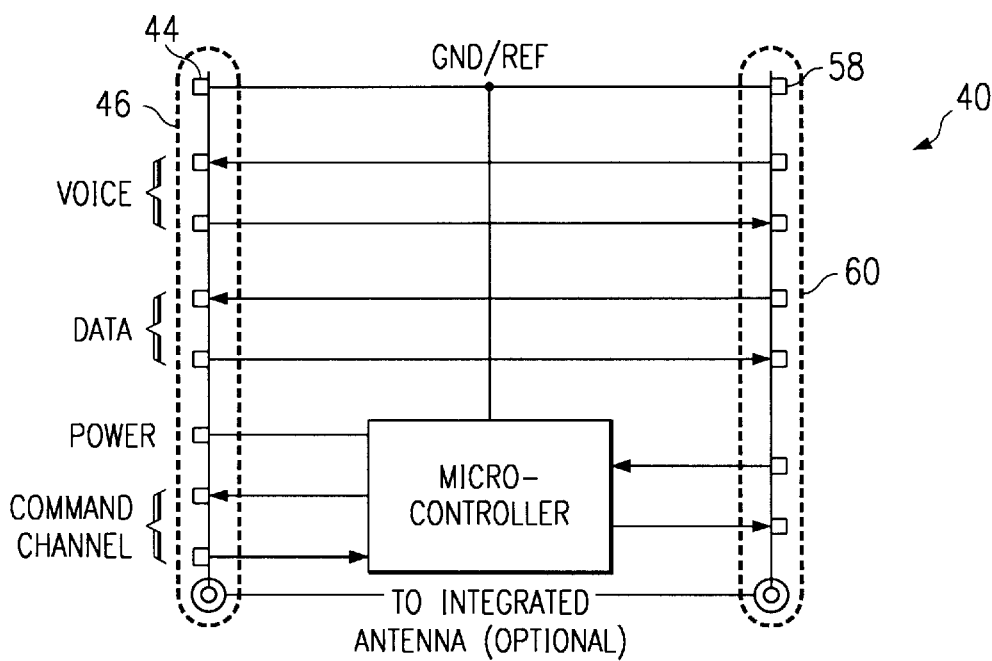
Figure 125:
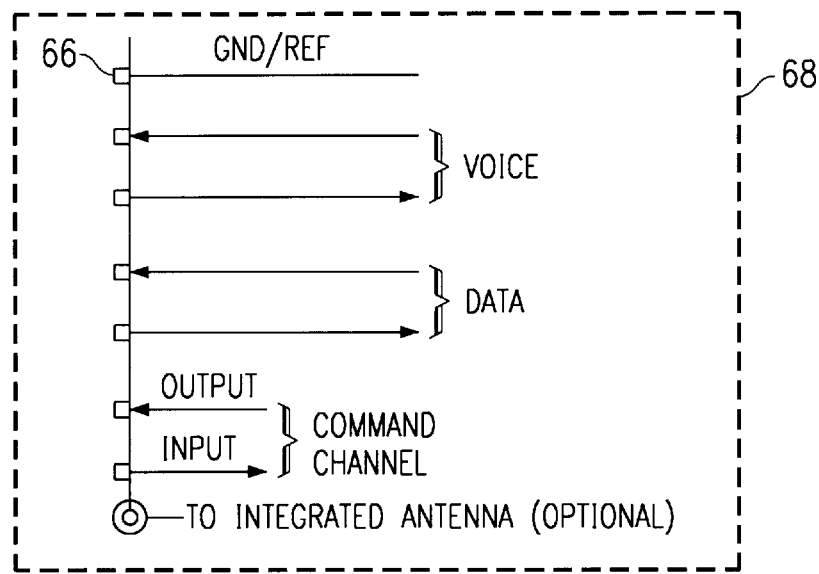

In the embodiment of the invention illustrated in FIG. 122, interface module 40 comprises: power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 123. In the embodiment of the invention illustrated in FIG. 124, interface module 40 comprises: a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 125.

Figure 126:
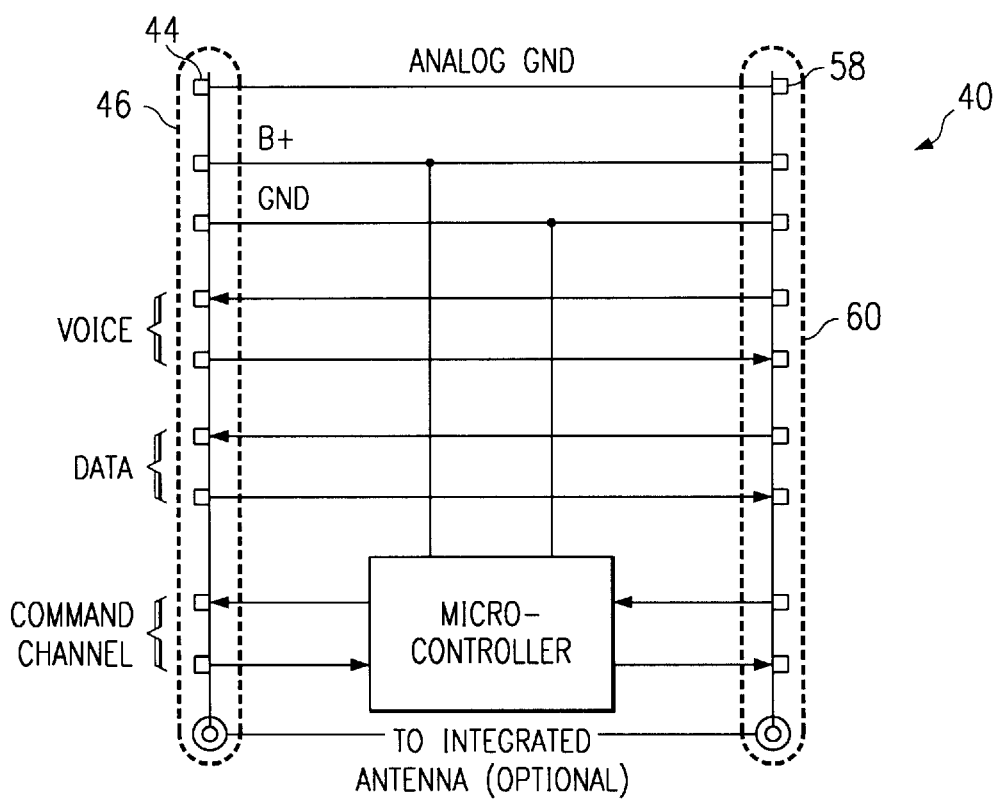
Figure 127:
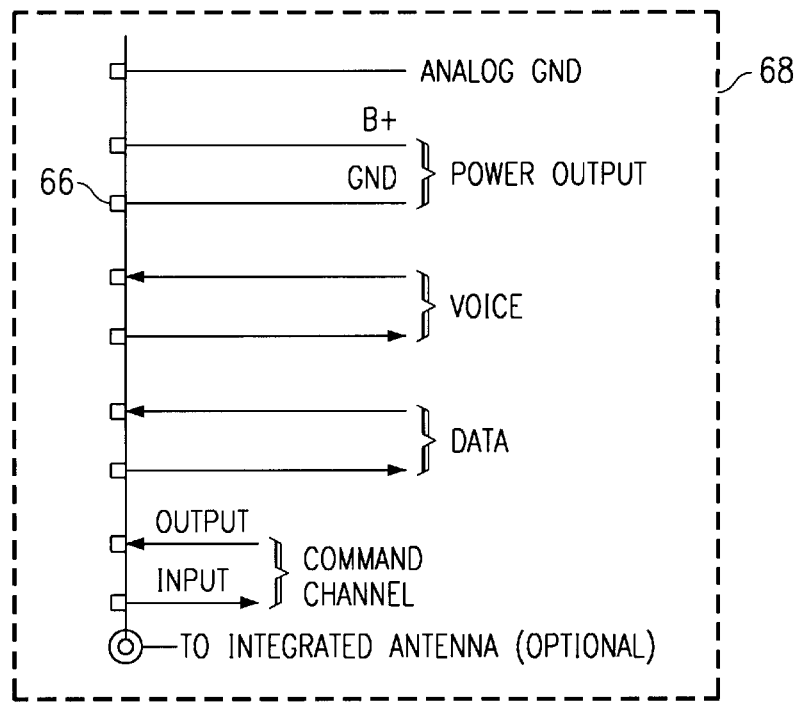
Figure 128:
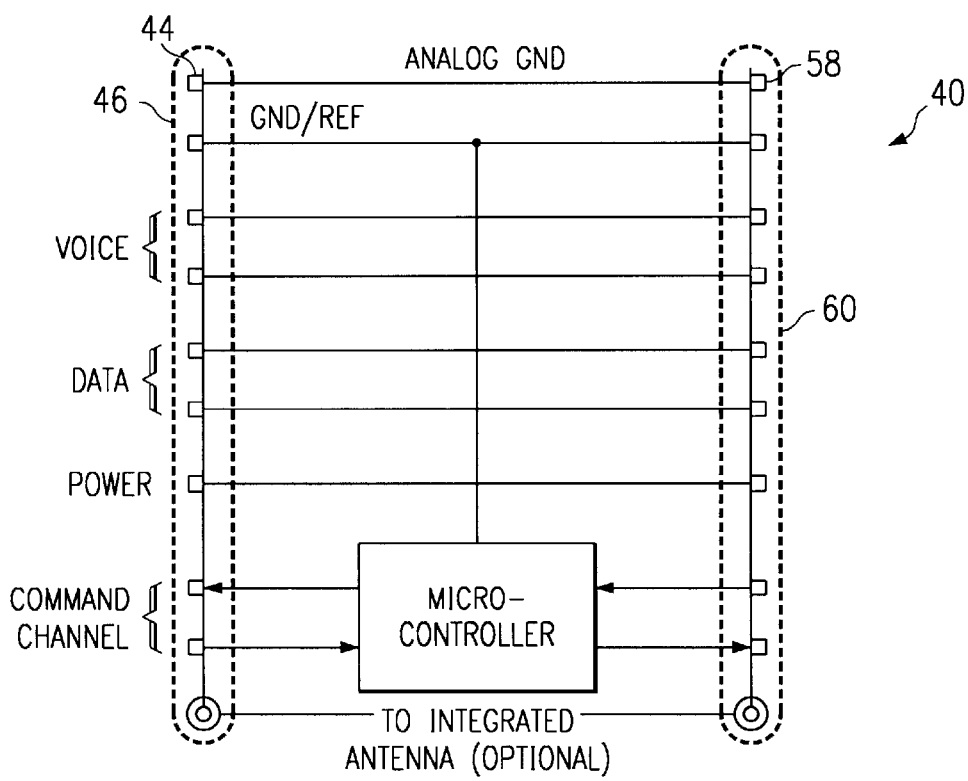
Figure 129:
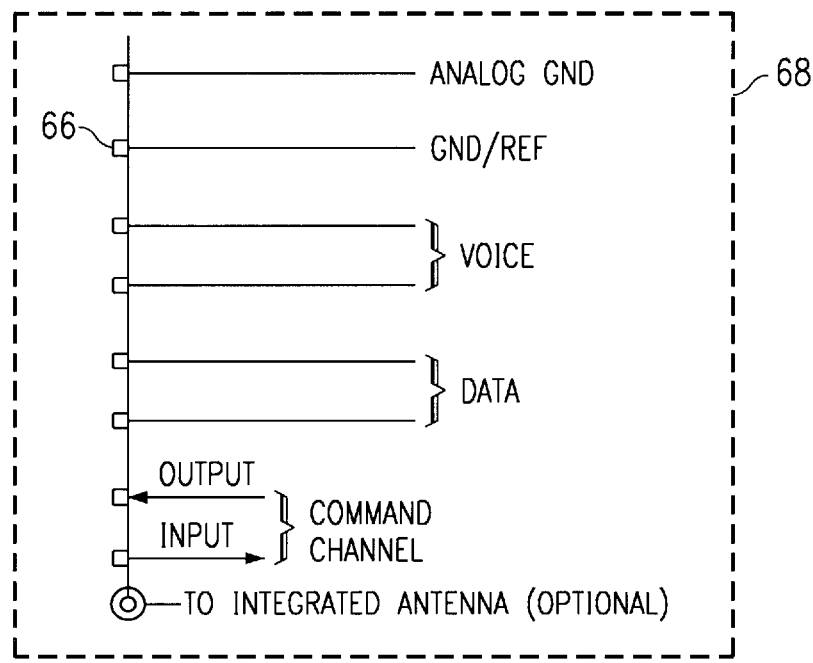

In the embodiment of the invention illustrated in FIG. 126, interface module 40 comprises: an analog ground lead line; power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 127. In the embodiment of the invention illustrated in FIG. 128, interface module 40 comprises: an analog ground lead line; a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 129. Power leads are not necessary in embodiments of the invention where computer charging of the portable telephone's battery (s) is not desired.

Figure 130:
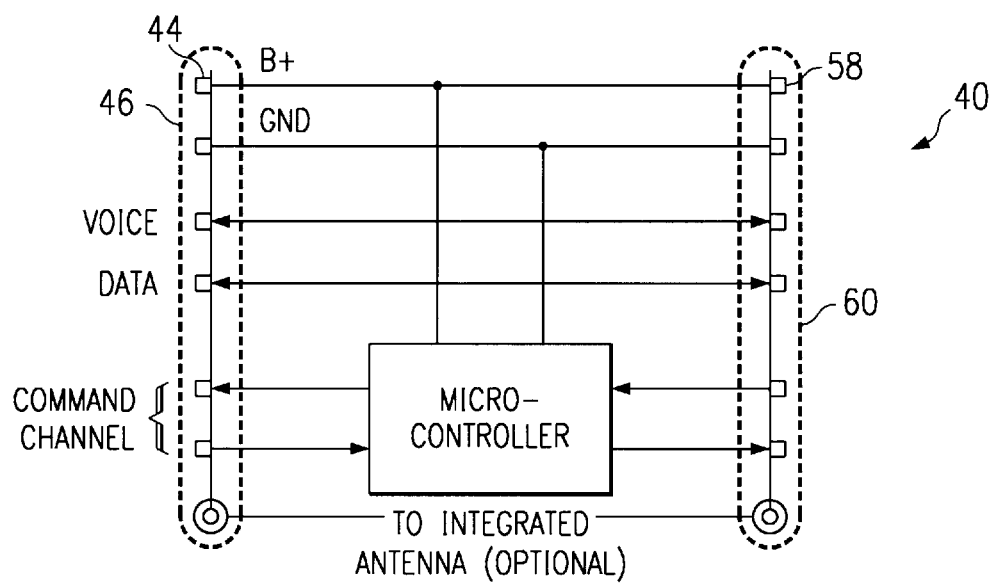
Figure 131:
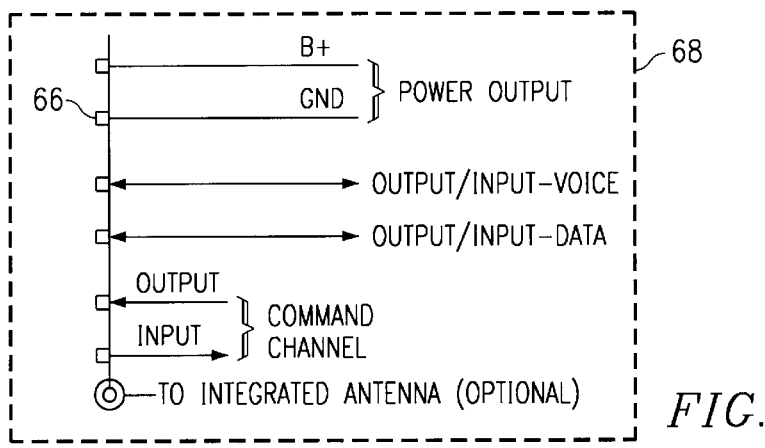
Figure 132:
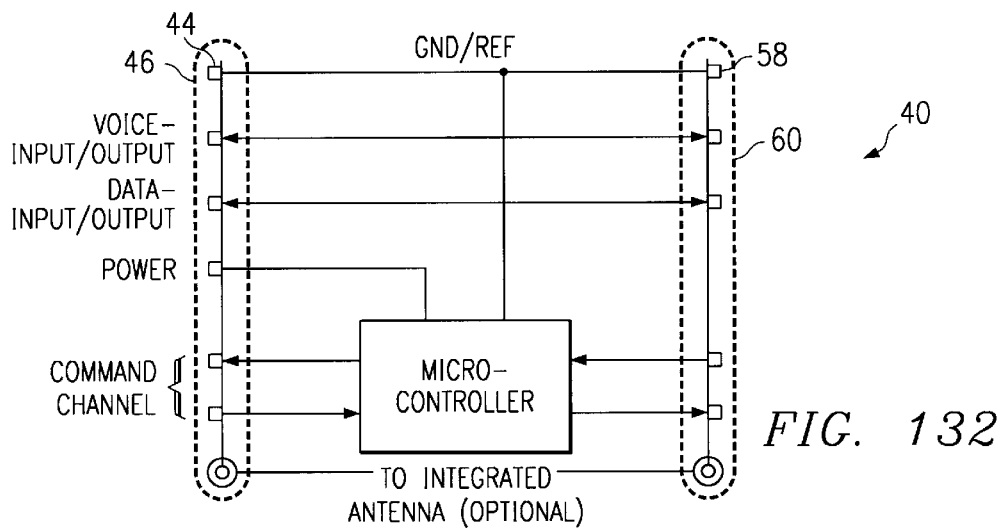
Figure 133:
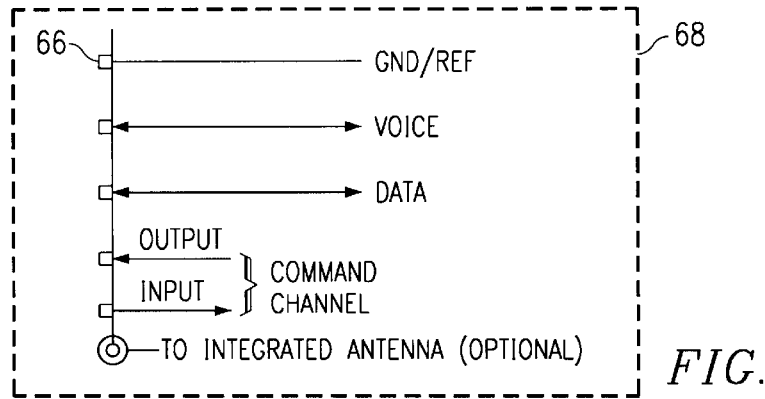

In the embodiment of the invention illustrated in FIG. 130, interface module 40 comprises: power leads for charging the portable telephone's battery(s) while connected to the computer; one voice input and output signal line for operating in a bi-directional half duplex mode and one data input and output signal line for operating in a bi-directional half duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 131. In the embodiment of the invention illustrated in FIG. 132, interface module 40 comprises: a ground/reference signal line; one voice input and output signal line for operating in a bi-directional half duplex mode and one data input and output signal line for operating in a bi-directional half duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 133. Power leads are not necessary in embodiments of the invention where computer charging of the portable telephone's battery(s) is not desired.

Figure 134:
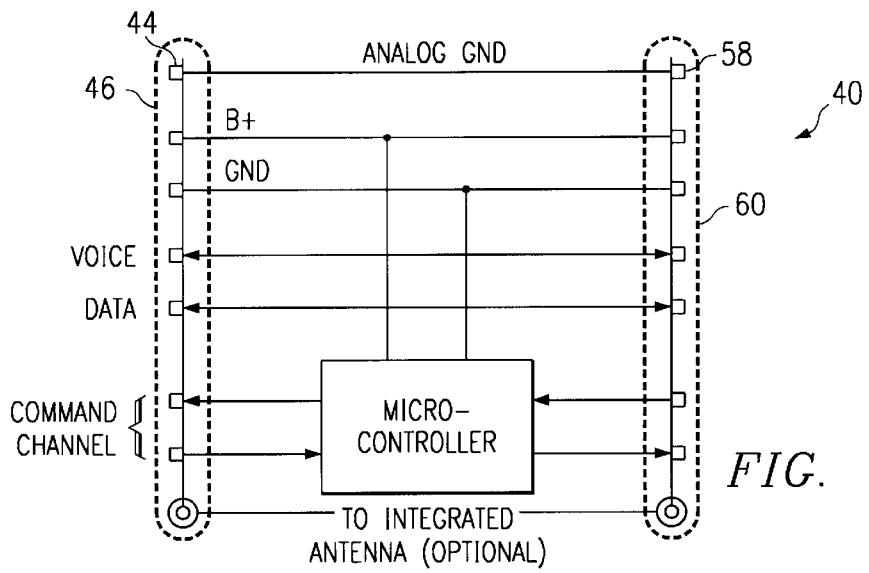
Figure 135:
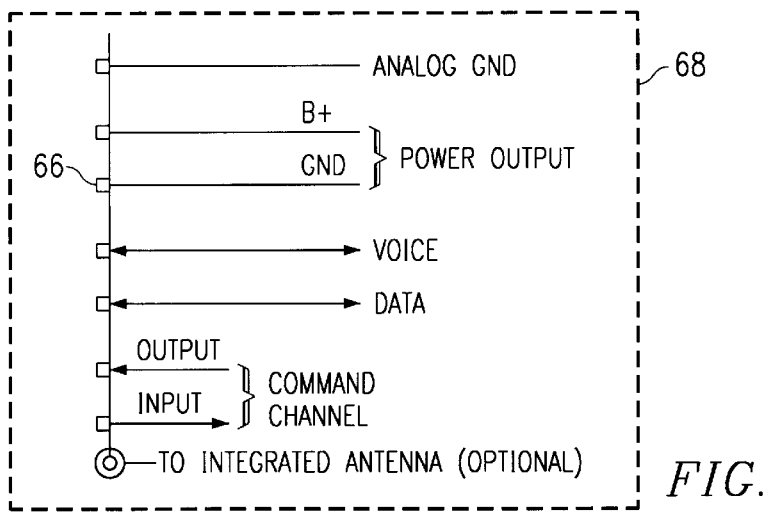
Figure 136:
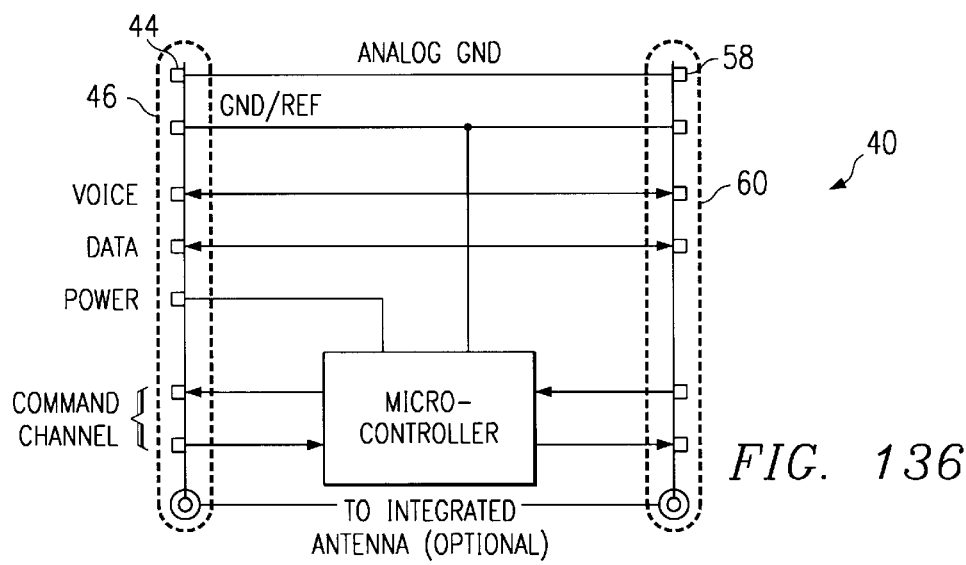
Figure 137:
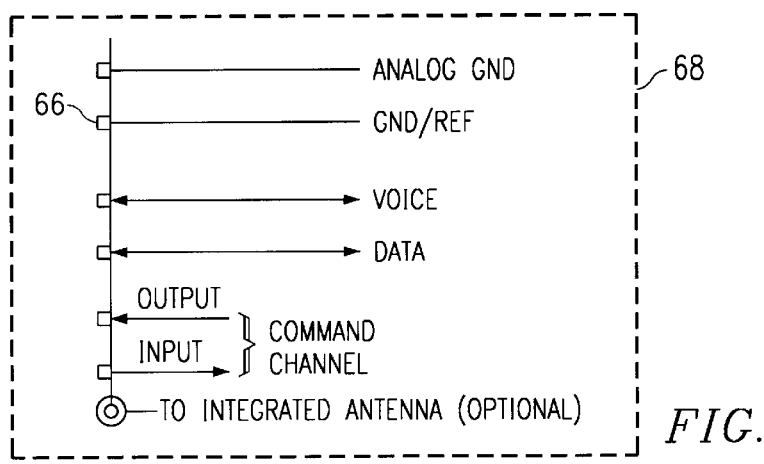

In the embodiment of the invention illustrated in FIG. 134, interface module 40 comprises: an analog ground lead line; power leads for charging the portable telephone's battery(s) while connected to the computer; one voice input and output signal line for operating in a bi-directional half duplex mode and one data input and output signal line for operating in a bi-directional half duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 135. In the embodiment of the invention illustrated in FIG. 136, interface module 40 comprises: an analog ground lead line; a ground/reference signal line; one voice input and output signal line for operating in a bi-directional half duplex mode and one data input and output signal line for operating in a bi-directional half duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 137. Power leads are not necessary in embodiments of the invention where computer charging of the portable telephone's battery(s) is not desired.

Figure 138:
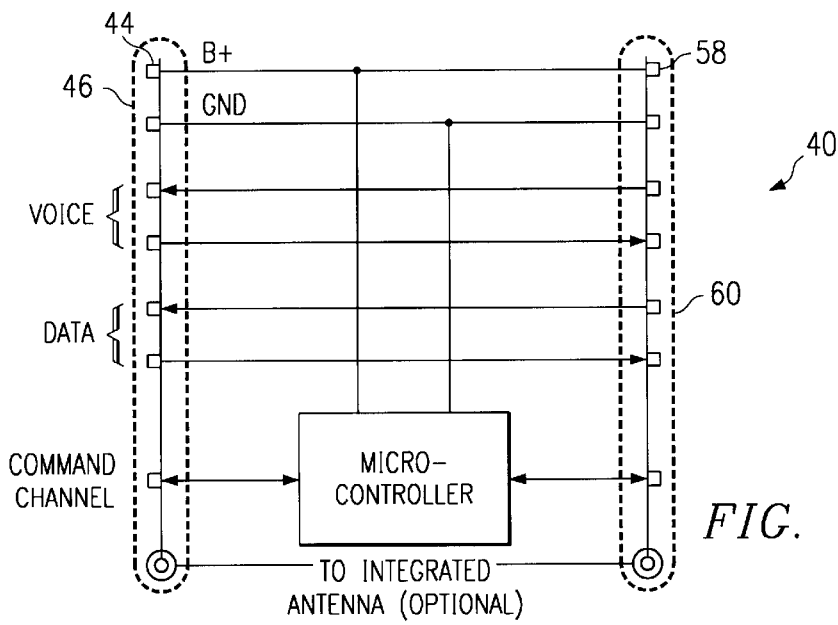
Figure 139:
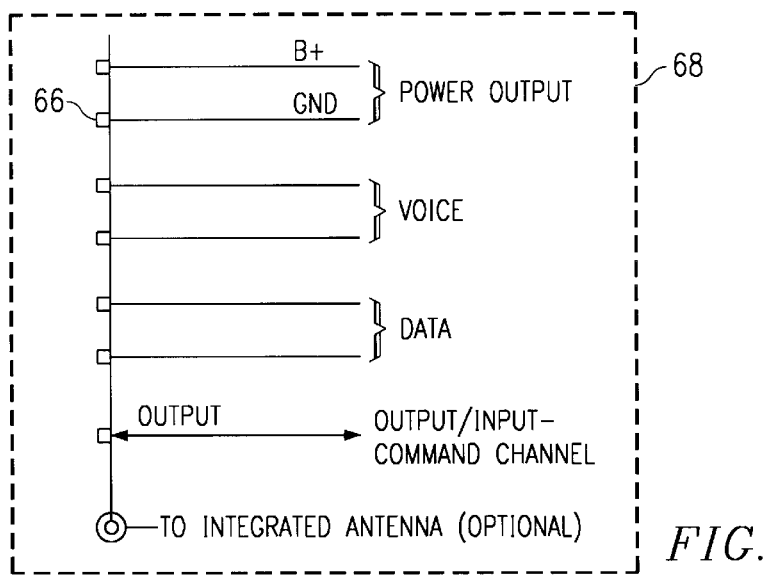
Figure 140:
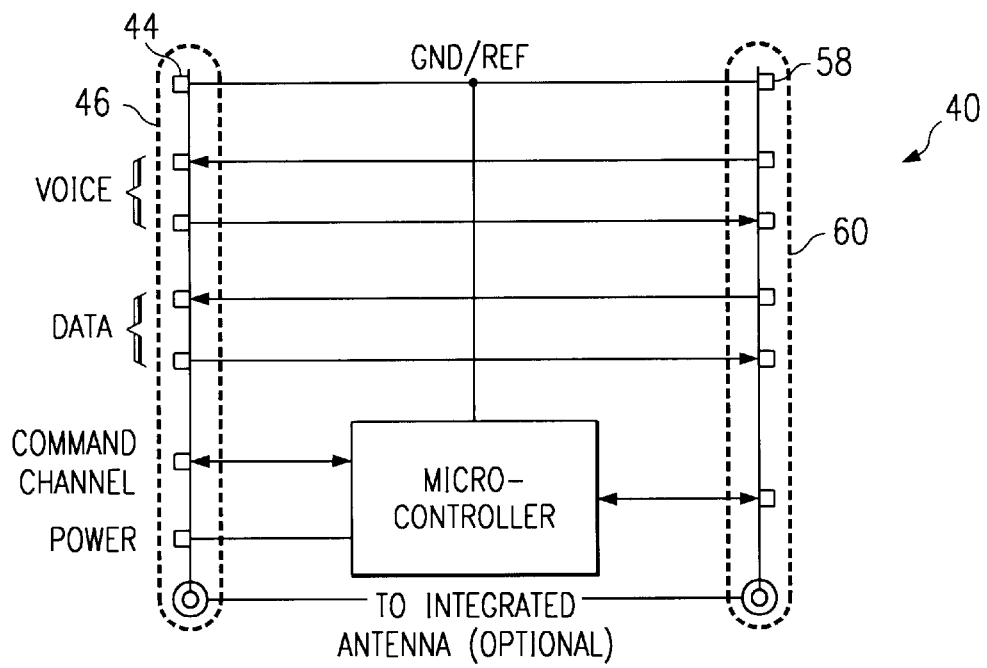
Figure 141:
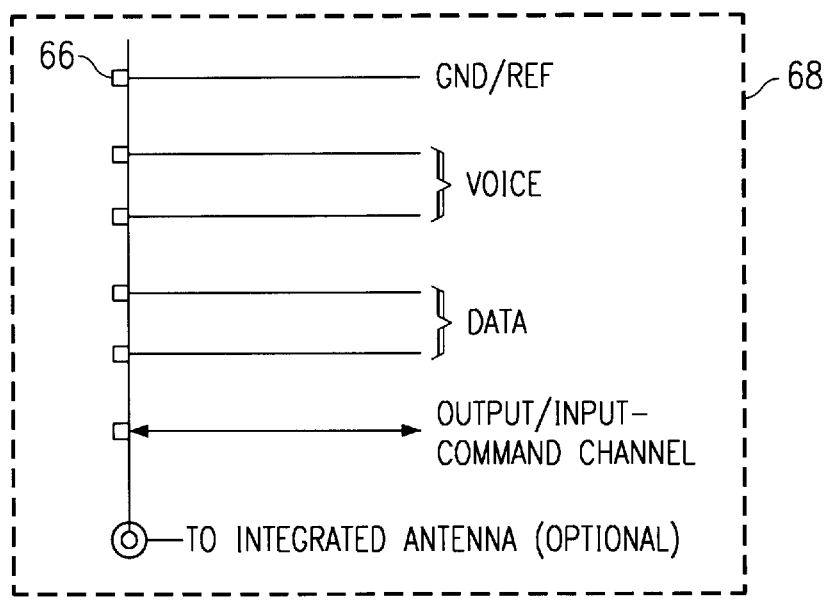

In the embodiment of the invention, illustrated in FIG. 138, interface module 40 comprises: power leads for charging the portable telephone's battery(s) while connected to the computer; two voice input and output signal lines for full duplex mode; two data input and output signal lines for full duplex mode; a microcontroller having one input/output command channel lead line for operating in a bi-directional half duplex mode; a signal line (optional) for coupling to an antenna integrated in the computer; and electrical contacts for coupling the leads to corresponding electrical contacts 66 in portable computer 62, as illustrated in FIG. 139. In the embodiment of the invention illustrated in FIG. 140, interface module 40 comprises: a ground/reference signal line; two voice input and output signal lines for full duplex mode; two data input and output signal lines for full duplex mode; a microcontroller having one input/output command channel lead line for operating in a bi-directional half duplex mode; a signal line (optional) for coupling to an antenna integrated in the computer; and electrical contacts for coupling the leads to corresponding electrical contacts 66 in portable computer 62, as illustrated in FIG. 141. Power leads are not necessary in embodiments of the invention where computer charging of the portable telephone's battery(s) is not desired.

Figure 142:
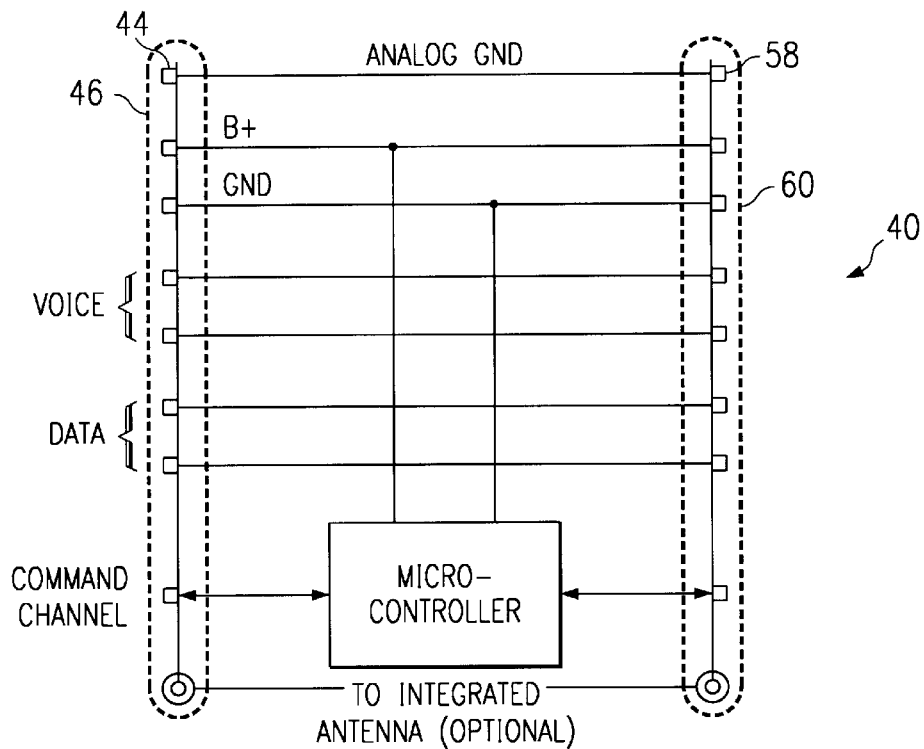
Figure 143:
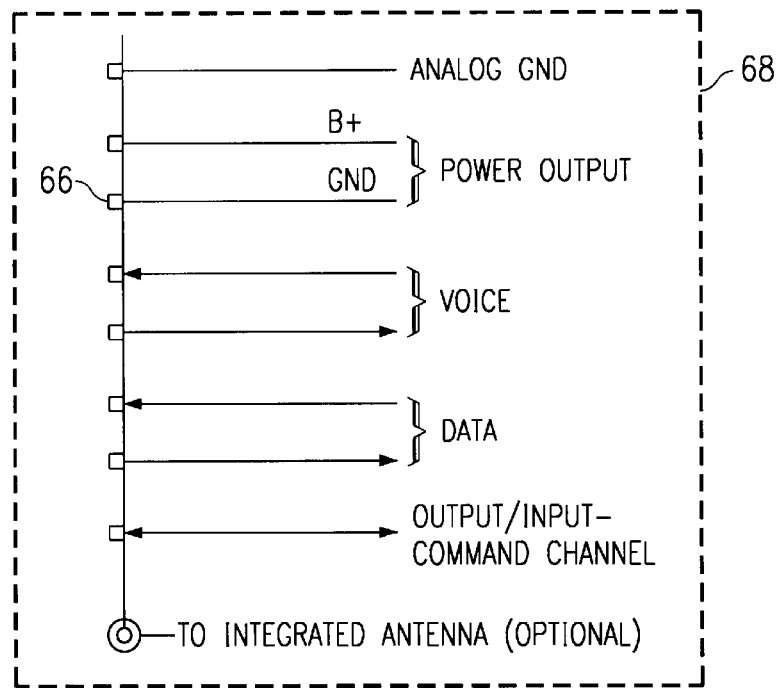
Figure 144:
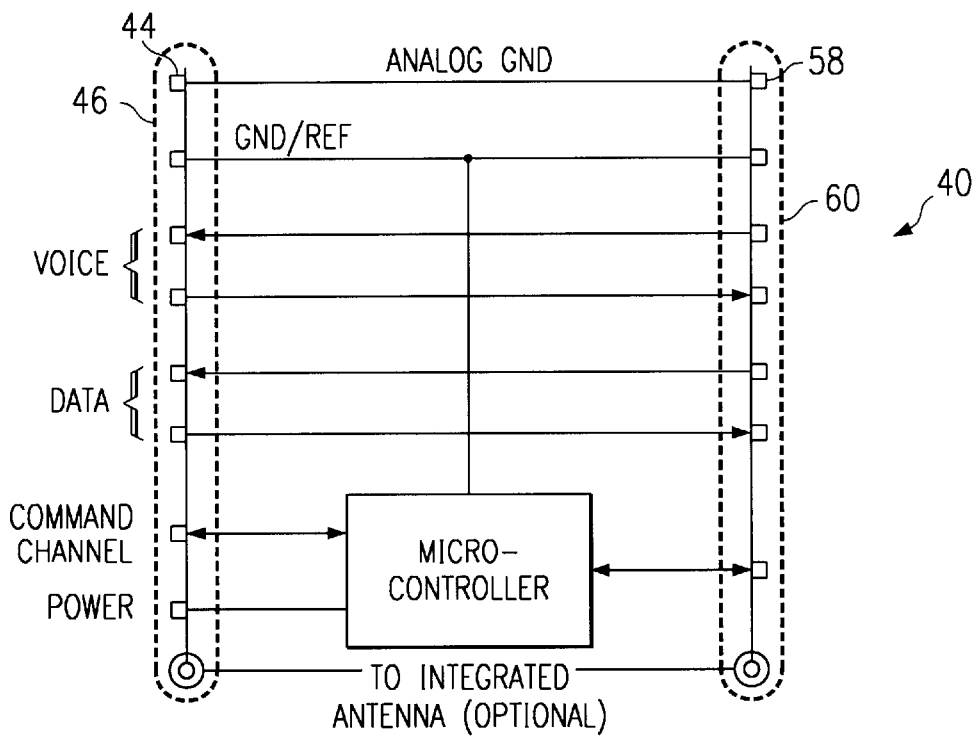
Figure 145:
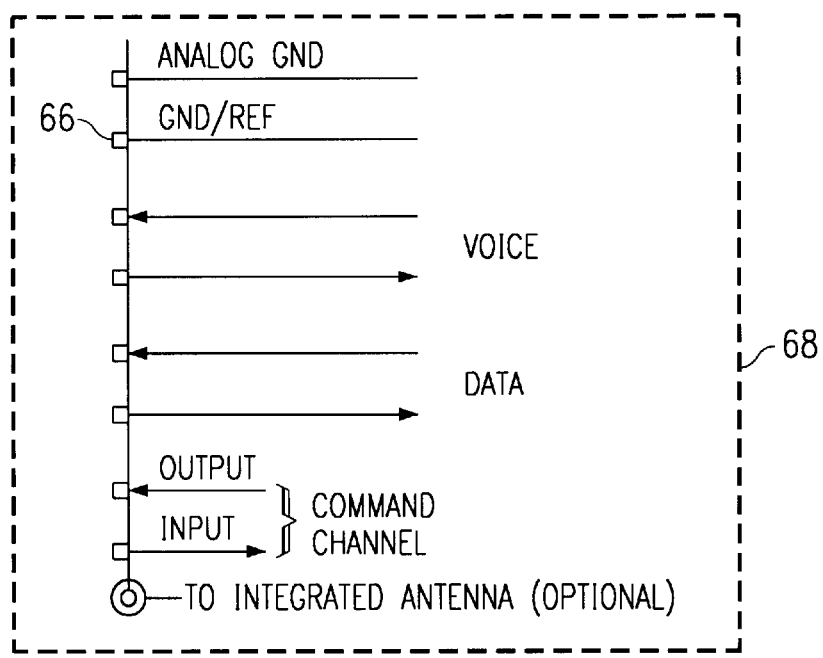

In the embodiment of the invention illustrated in FIG. 142, interface module 40 comprises: an analog ground lead line; power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 143. In the embodiment of the invention illustrated in FIG. 144, interface module 40 comprises: an analog ground lead line; a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts 66 in portable computer 62, as illustrated in FIG. 145.

Figure 146:
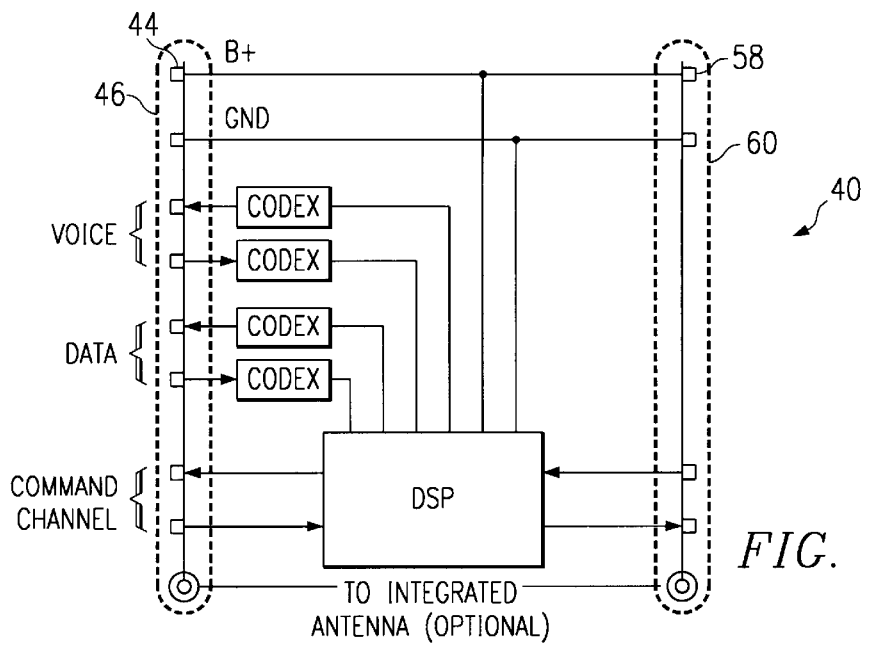
Figure 147:
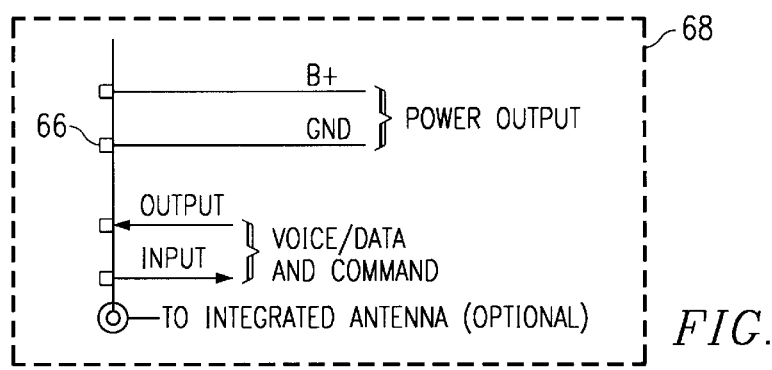
Figure 148:
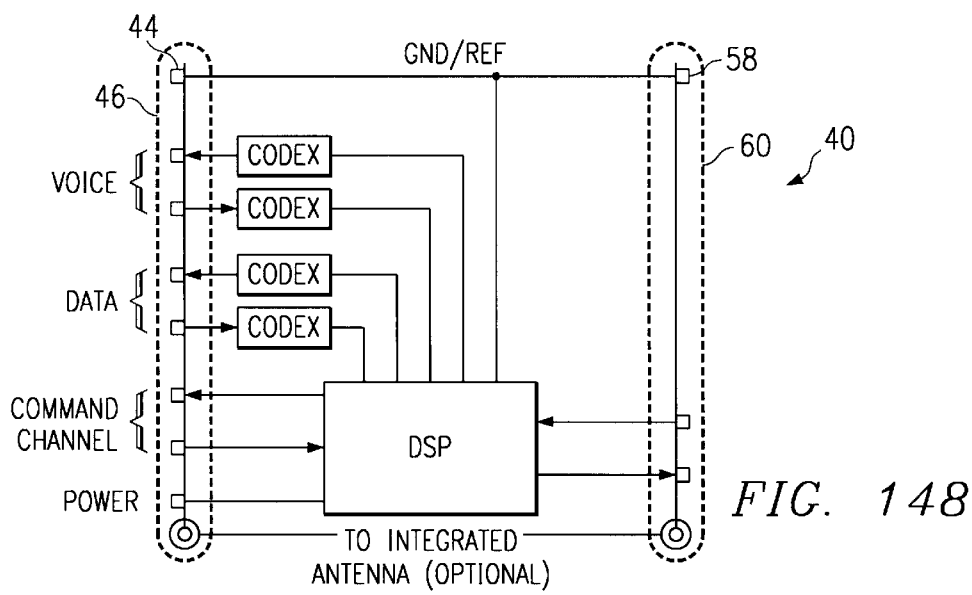
Figure 149:
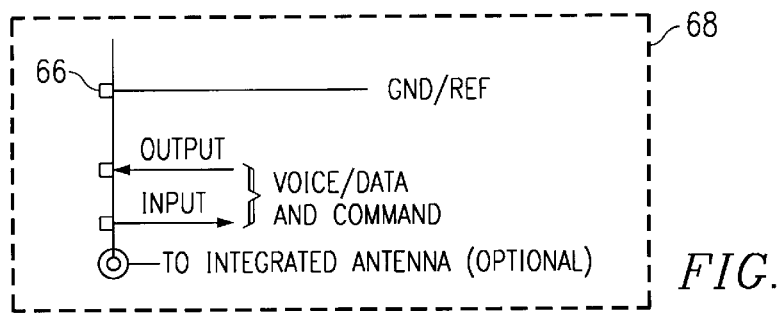

In the embodiment of the invention illustrated in FIG. 146, interface module 40 comprises: power leads for charging the portable telephone's battery(s) while connected to the computer; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts 66 in portable computer 62, as illustrated in FIG. 147. In the embodiment of the invention illustrated in FIG. 148, interface module 40 comprises: a ground/reference signal line; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts 66 in portable computer 62, as illustrated in FIG. 149.

Figure 150:
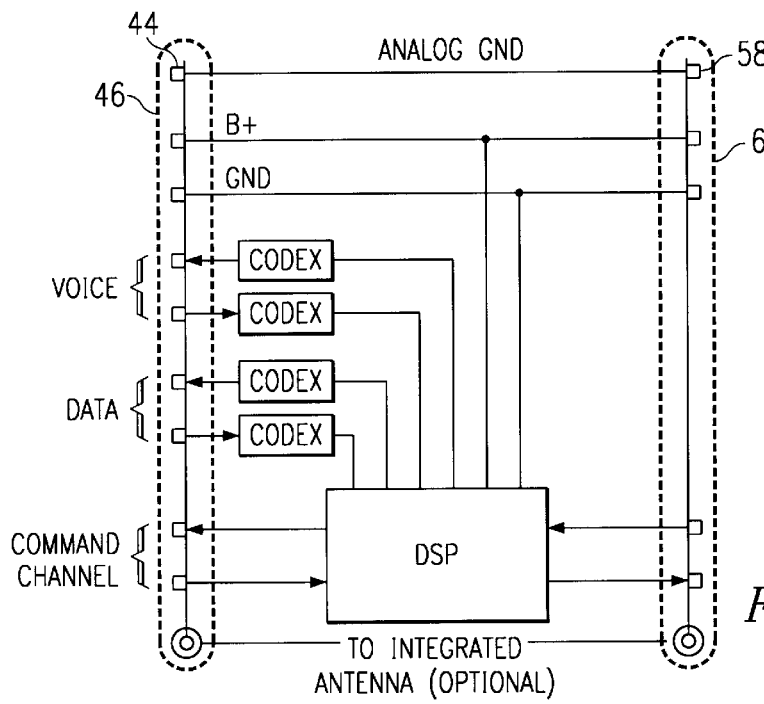
Figure 151:
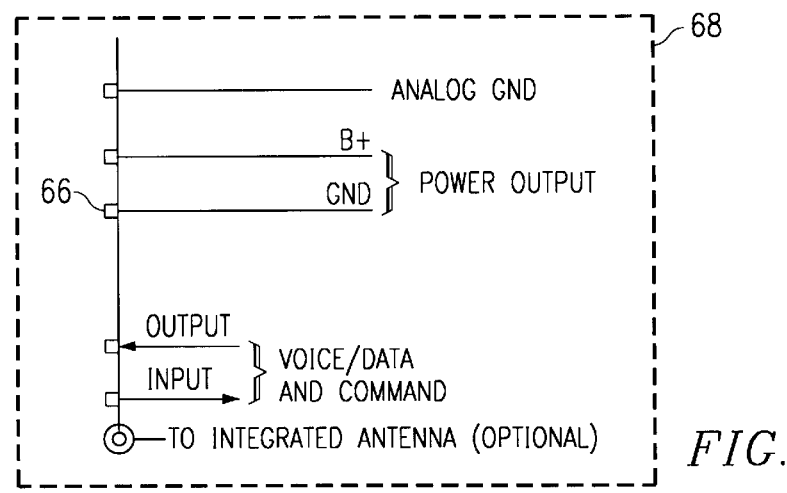
Figure 152:
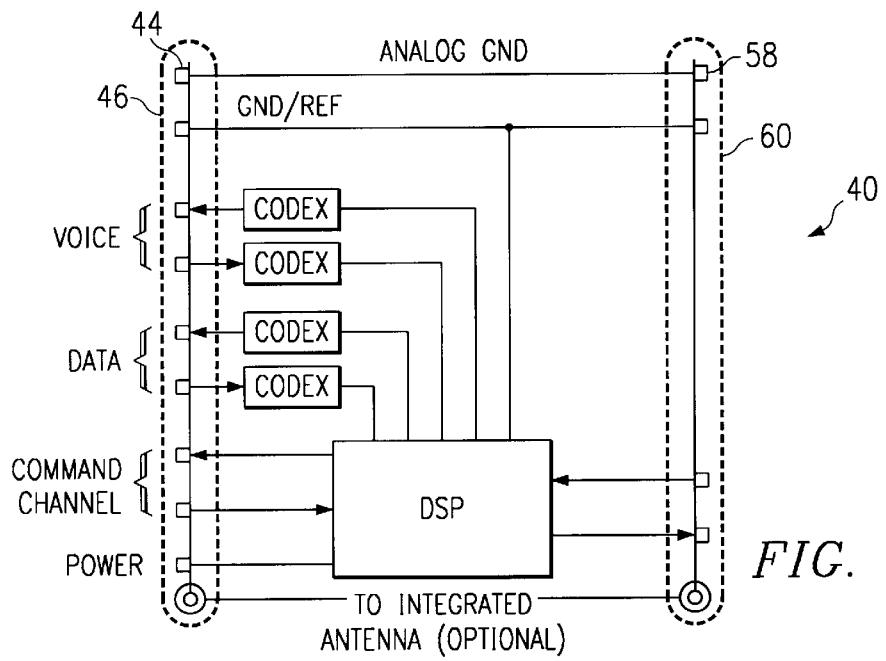
Figure 153:
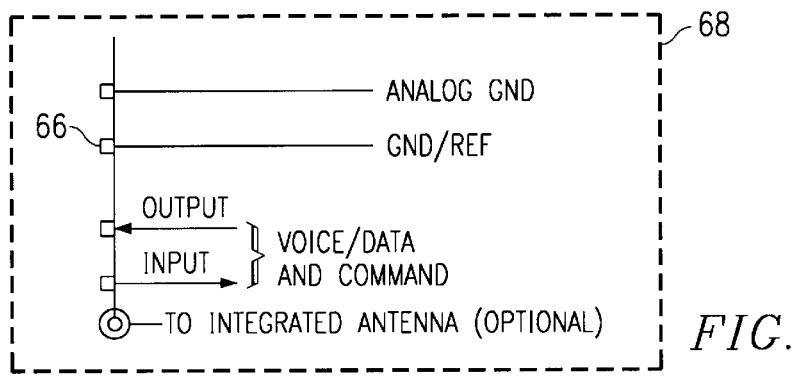

In the embodiment of the invention illustrated in FIG. 150, interface module 40 comprises: an analog ground lead line; power leads for charging the portable telephone's battery(s) while connected to the computer; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts 66 in portable computer 62, as illustrated in FIG. 151. In the embodiment of the invention illustrated in FIG. 152, interface module 40 comprises: an analog ground lead line; a ground/reference signal line; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts 66 in portable computer 62, as illustrated in FIG. 153. Power leads are not necessary in embodiments of the invention where computer charging of the portable telephone's battery(s) is not desired.

Figure 154:
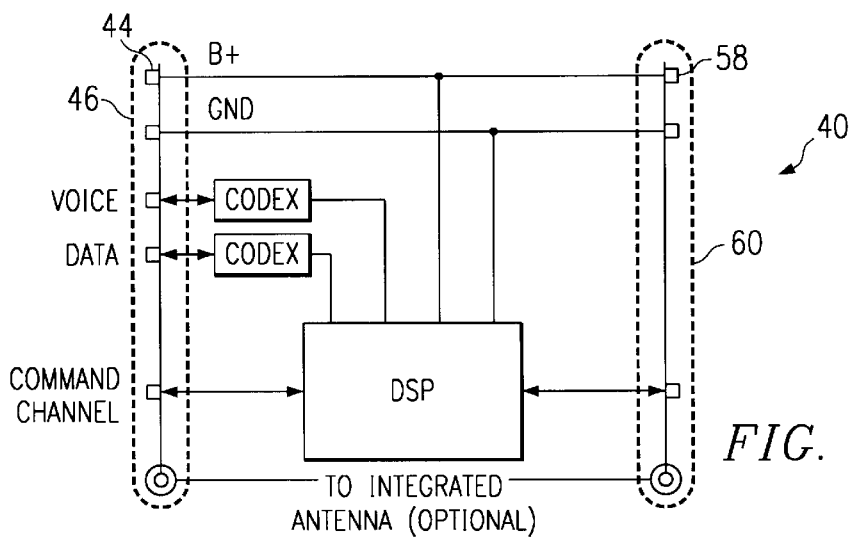
Figure 155:
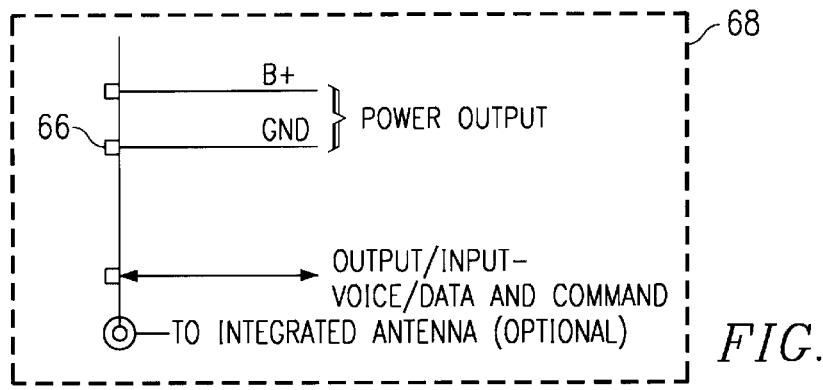
Figure 156:
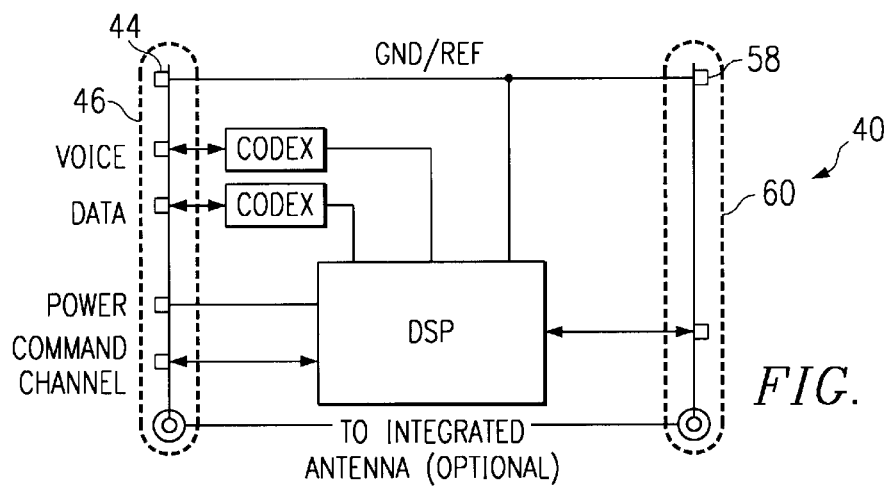
Figure 157:
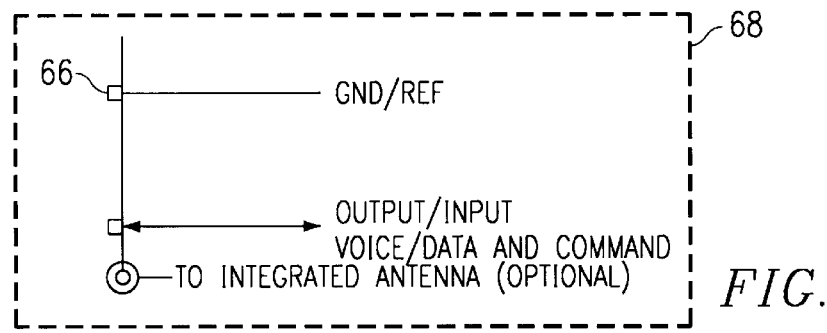

In the embodiment of the invention illustrated in FIG. 154, interface module 40 comprises: power leads for charging the portable telephone's battery(s) while connected to the computer; a codex circuit for coupling a signal line (voice input and output for operating in a bi-directional half duplex mode) to a digital signal processor (DSP); a codex circuit for coupling a signal line (data input and output for operating in a bi-directional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts 66 in portable computer 62, as illustrated in FIG. 155. In the embodiment of the invention illustrated in FIG. 156, interface module 40 comprises: a ground/reference signal line; a codex circuit for coupling a signal line (voice input and output for operating in a bi-directional half duplex mode) to a digital signal processor (DSP); a codex circuit for coupling a signal line (data input and output for operating in a bi-directional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts 66 in portable computer 62, as illustrated in FIG. 157.

Figure 158:
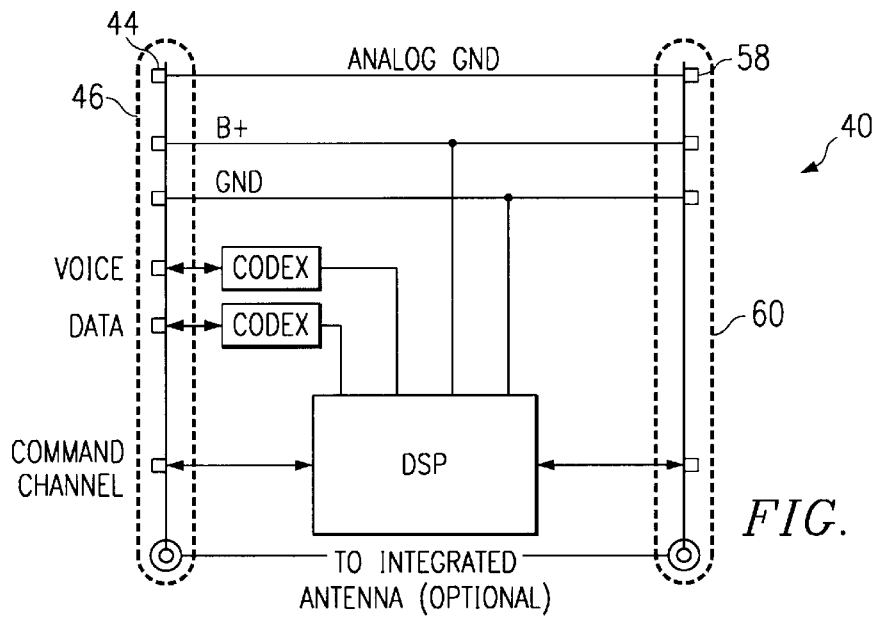
Figure 159:
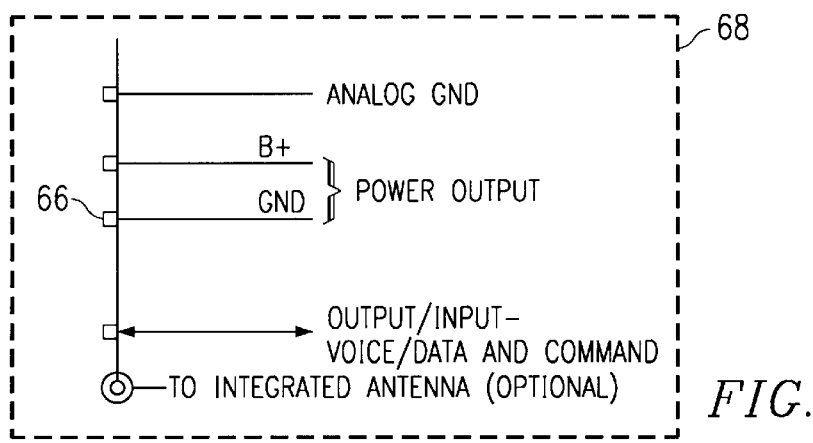
Figure 160:
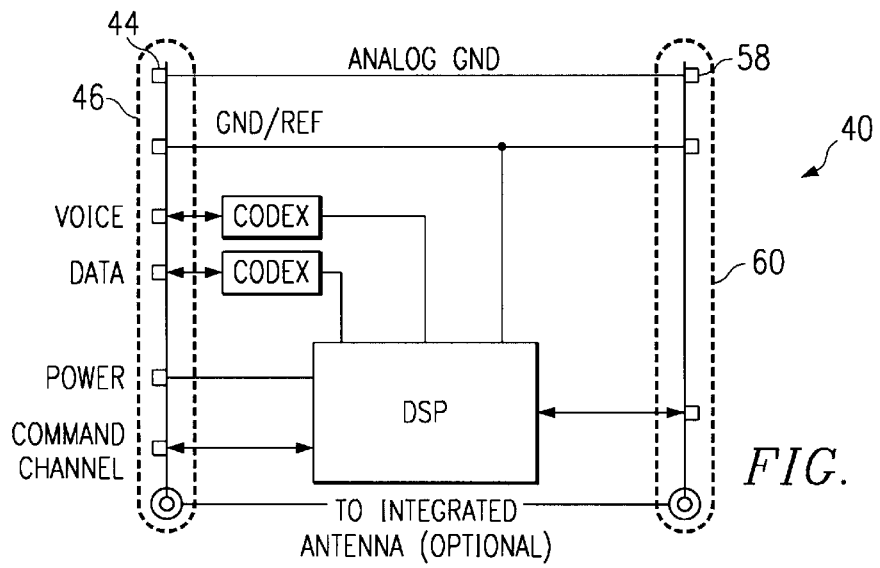
Figure 161:
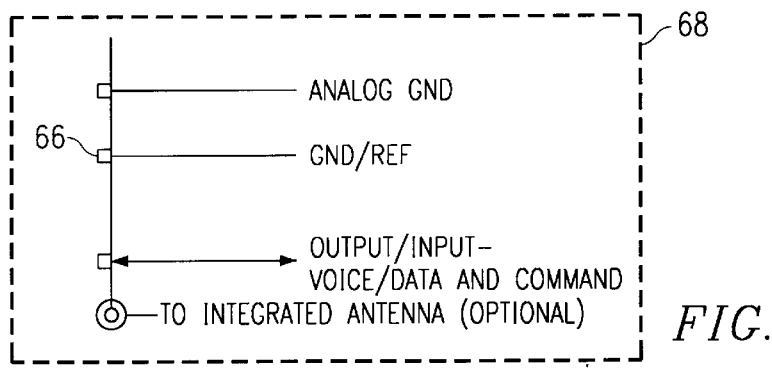

In the embodiment of the invention illustrated in FIG. 158, interface module 40 comprises: an analog ground lead line; power leads for charging the portable telephone's battery(s) while connected to the computer; a codex circuit for coupling a signal line (voice input and output for operating in a bi-directional half duplex mode) to a digital signal processor (DSP); a codex circuit for coupling a signal line (data input and output for operating in a bi-directional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts 66 in portable computer 62, as illustrated in FIG. 159. In the embodiment of the invention illustrated in FIG. 160, interface module 40 comprises: an analog ground lead line; a ground/reference signal line; a codex circuit for coupling a signal line (voice input and output for operating in a bi-directional half duplex mode) to a digital signal processor (DSP); a codex circuit for coupling a signal line (data input and output for operating in a bi-directional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts 66 in portable computer 62, as illustrated in FIG. 161.

Figure 162:
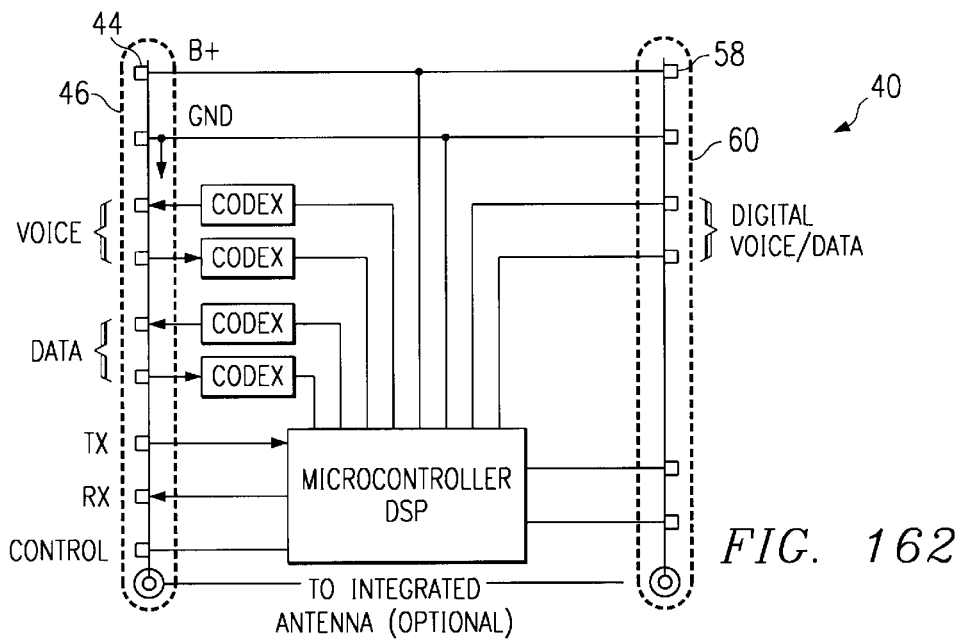
Figure 163:
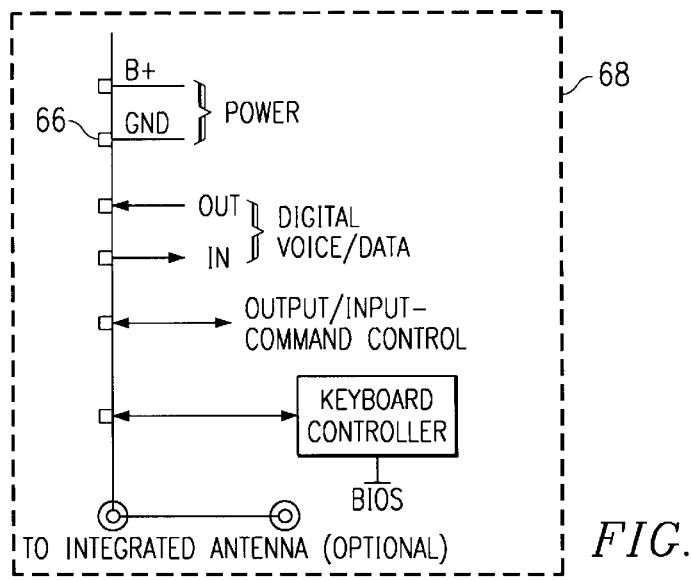
Figure 164:
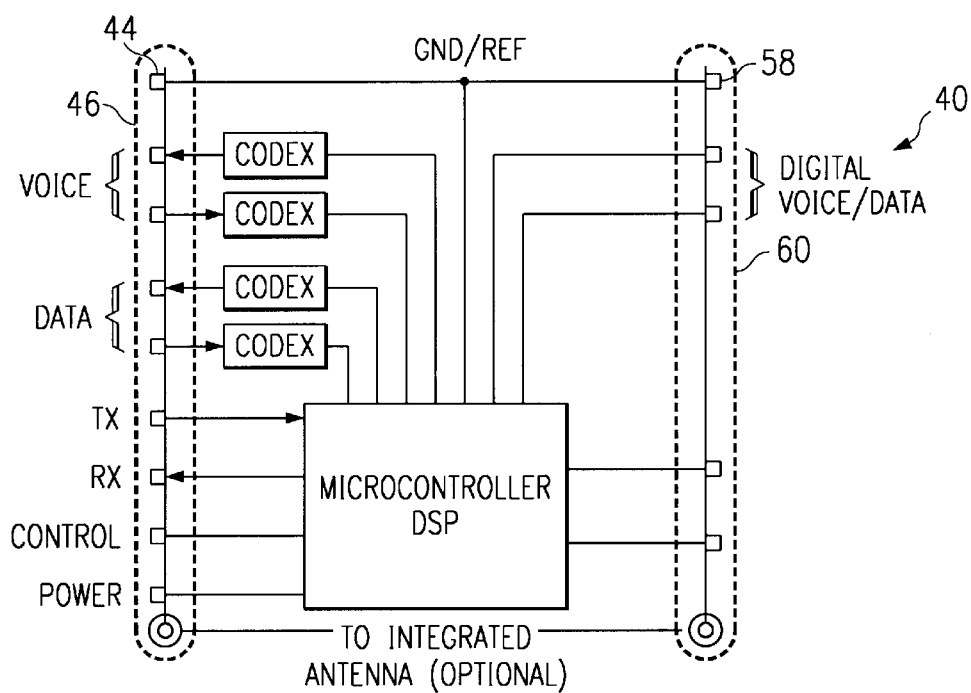
Figure 165:
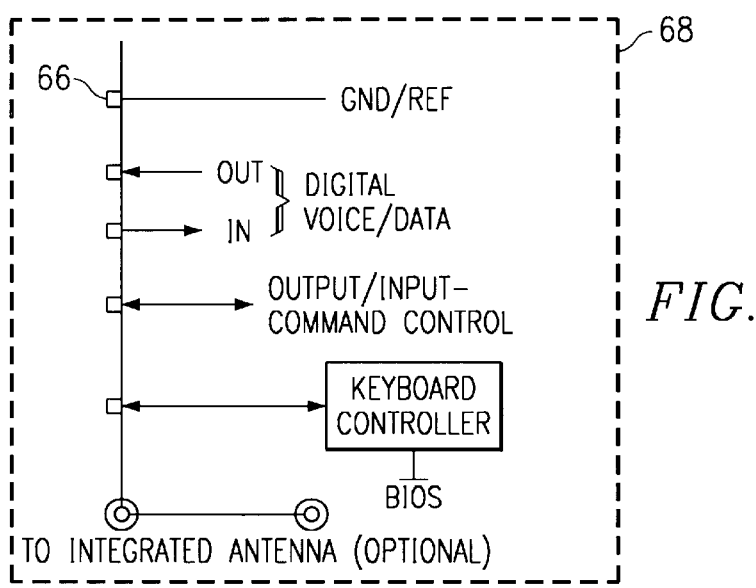

In the embodiment of the invention illustrated in FIG. 162, interface module 40 comprises: power leads for charging the portable telephone's battery(s) while connected to the computer; two codex circuits for coupling two signal lines (voice input and output) to a microcontroller DSP; two codex circuits for coupling two signal lines (data input and output) to the microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 66 in portable computer 62, as illustrated in FIG. 163. In the embodiment of the invention illustrated in FIG. 164, interface module 40 comprises: a ground/reference signal line; two codex circuits for coupling two signal lines (voice input and output) to a microcontroller DSP; two codex circuits for coupling two signal lines (data input and output) to the microcontroller DSP; transmit, receive and control internal/external audio signal lines coupled to the microcontroller DSP; and electrical contacts for coupling the power leads, at least two input/output voice leads. (input and output), a command channel lead (input/output) and a lead line for receiving a keyboard controller signal, to corresponding electrical contacts 66 in portable computer 164, as illustrated in FIG. 165.

Figure 166:
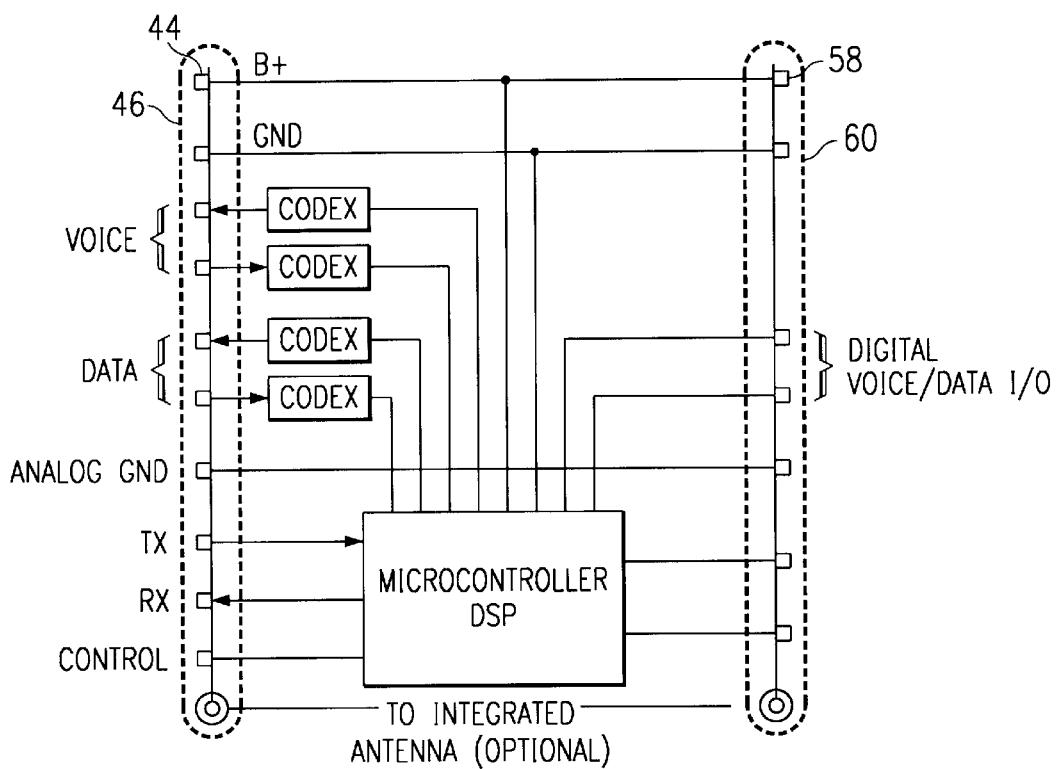
Figure 167:
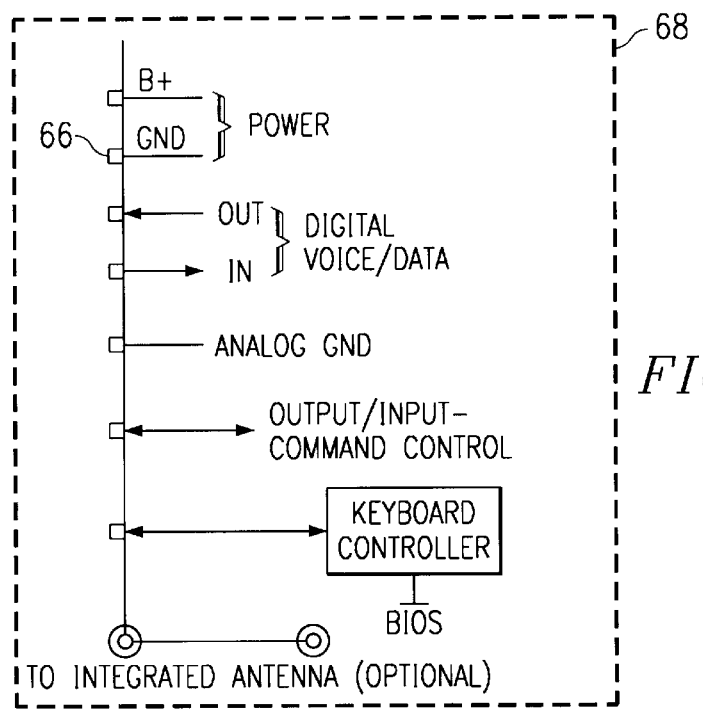
Figure 168:
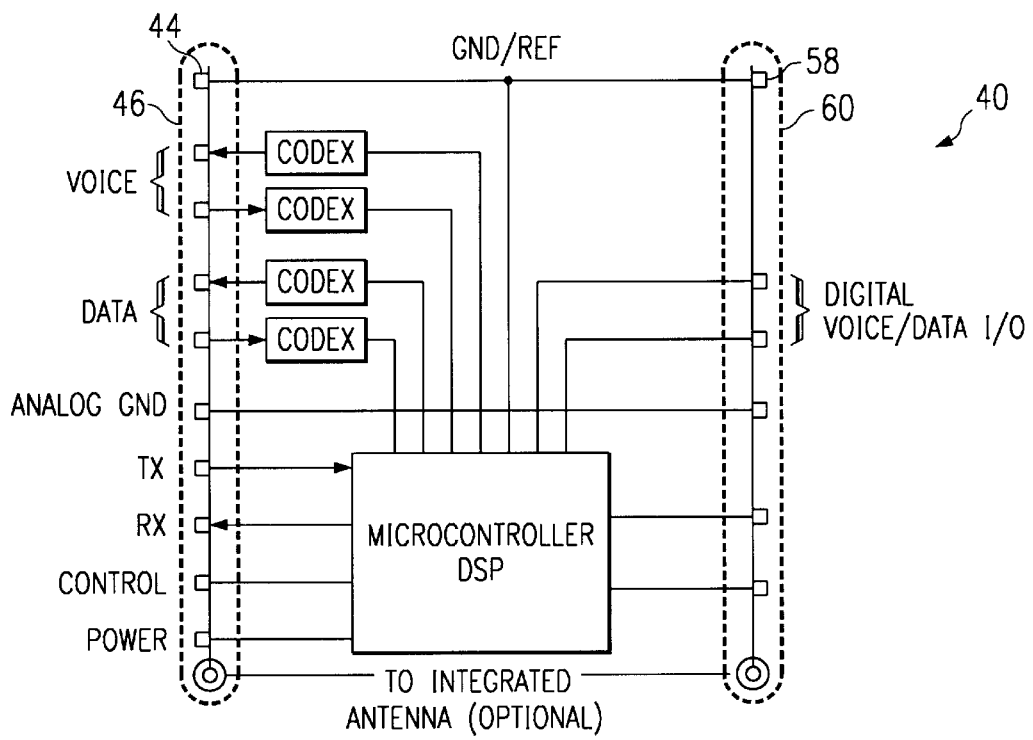
Figure 169:
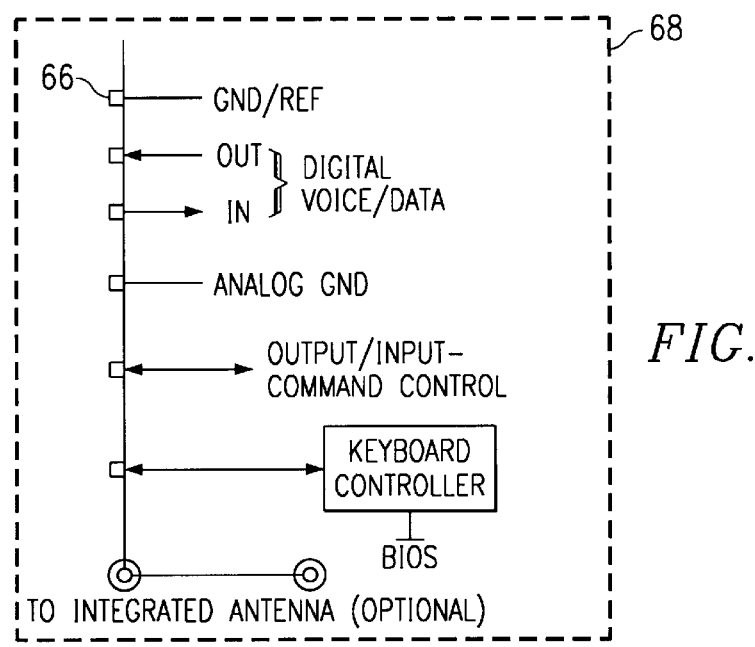

In the embodiment of the invention illustrated in FIG. 166, interface module 40 comprises: power leads for charging the portable telephone's battery(s) while connected to the computer; two codex circuits for coupling two signal lines (voice input and output) to a microcontroller DSP; two codex circuits for coupling two signal lines (data input and output) to the microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 66 in portable computer 62, as illustrated in FIG. 167. In the embodiment of the invention illustrated in FIG. 168, interface module 40 comprises: a ground/reference signal line; two codex circuits for coupling two signal lines (voice input and output) to a microcontroller DSP; two codex circuits for coupling two signal lines (data input and output) to the microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts 66 in portable computer 62, as illustrated in FIG. 169.

It should be noted that while specific key layouts of interface modules, portable telephones and portable computer have been shown herein, the preferred embodiments illustrated could have many different key layouts, as would be known to one skilled in the art. This is particularly true in the present case since there are many different manufacturers of portable telephones and computers, none of which are completely uniform in function or capability with the function and capability of competing products. As an example, it is presently unlikely that cellular telephones manufactured by two different companies will have an interface (if at all), at the same location on their respective telephones and having the same interface 44 having the same number and type of pins 46. Similarly, the interfaces 68 on portable computers vary in type, function, location and number of pins, depending upon the age, capabilities and manufacturer of the portable computer.

The interface module of the present invention provides portable telephone and/or computer manufacturers an efficient and cost effective method of directly coupling different types and/or models of portable telephones to different types and/or models of computers. The mechanical and electrical design of the interface module ultimately used will depend on such factors as the types of interfaces 34 and 68 located in the portable telephone and portable computer, respectively, the coupling type used, if any, the number of pins used, the functionality of the portable computer and the functionality of the portable telephone to be utilized, etc. The invention encompasses any modifications or alternative embodiments that fall within the scope of the Claims.

What is claimed is:

1. A telecommunications apparatus, comprising:
   a portable telephone having an interface; and
   an interface module removably connected to said portable telephone along one and only one surface of said portable telephone, said interface module having a first interface directly connected to said portable telephone interface; and a second interface, coupled to said first interface, said second interface facilitating a direct physical and electrical connection to a computer interface.

2. The telecommunications apparatus of claim 1, wherein said portable telephone, comprises:
   a radio frequency (RF) transceiver;
   a microprocessor coupled to said transceiver;
   a power source coupled to said microprocessor;
   a telephone interface coupled to said processor;
   a keypad coupled to said telephone interface;
   a microphone and speaker coupled to said telephone interface; and
   an interface coupled to said microprocessor.

3. The telecommunications apparatus of claim 2, wherein said portable telephone is a cellular telephone.

4. The telecommunications apparatus of claim 2, further including a modem coupled to said microprocessor.

5. The telecommunications apparatus of claim 1, wherein said first interface includes a connector and said portable telephone interface includes a connector that mates with said connector on said first interface.

6. The telecommunications apparatus of claim 1, wherein said second interface includes a connector and said computer interface comprises a connector that mates with said connector on said second interface.

7. The telecommunications apparatus of claim 1, wherein said interface module further comprises a protective case housing said first and said second interfaces.

8. The telecommunications apparatus of claim 7, wherein said first and second interfaces are on opposing surfaces of said protective case.

9. The telecommunications apparatus of claim 7, wherein said interface module further includes an attachment mechanism for securing said interface module to said portable telephone when said first interface is connected to said portable telephone interface.

10. The telecommunications apparatus of claim 9, wherein said attachment mechanism comprises flexible arms for engaging corresponding receptacles in said portable telephone.

11. The telecommunications apparatus of claim 7, wherein said interface module further includes guide pins for engaging corresponding guide receptacles in said portable telephone.

12. The telecommunications apparatus of claim 7, wherein said interface module further includes a mechanism on said protective case that facilitates attachment of said interface module to said portable computer.

13. A telecommunications apparatus, comprising:
   a portable telephone having an interface; and
   an interface module removably connected to said portable telephone along one and only one surface of said portable telephone, said interface module having a first interface directly connected to said portable telephone interface; and a second interface, coupled to said first interface, said second interface facilitating a direct physical and electrical connection to a computer interface, said interface module comprising a microcontroller coupling at least one electrical contact on said first interface to said second interface.

14. The telecommunications apparatus of claim 13, wherein said interface module further includes an antenna lead coupling at least one electrical contact on said first interface to said second interface.

15. The telecommunications apparatus of claim 13, wherein said interface module further includes leads coupling electrical contacts on said first interface to electrical contacts on said second interface, said leads facilitating the transfer of power signals between said first and second interfaces.

16. The telecommunications apparatus of claim 13, wherein said interface module further includes a lead coupling an electrical contact on said first interface to an electrical contact on said second interface, said lead facilitating the transfer of voice signals between said first and second interfaces.

17. The telecommunications apparatus of claim 13, wherein said interface module further includes a lead coupling an electrical contact on said first interface to an electrical contact on said second interface, said lead facilitating the transfer of data signals between said first and second interfaces.

18. The telecommunications apparatus of claim 13, wherein said interface module further includes a lead coupling an electrical contact on said first interface to an electrical contact on said second interface, said lead facilitating the transfer of voice and data signals between said first and second interfaces.

19. A telecommunications apparatus, comprising:
   a portable telephone having an interface; and
   an interface module removably connected to said portable telephone alone one and only one surface of said portable telephone, said interface module having a first interface directly connected to said portable telephone interface; and a second interface, coupled to said first interface, said second interface facilitating a direct physical and electrical connection to a computer interface, said interface module comprising a microcontroller coupling at least one electrical contact on said first interface to said second interface and a codex circuit coupling an electrical contact on said first interface to said microcontroller.

20. The telecommunications apparatus of claim 13, wherein said microcontroller is a digital signal processor.

21. A telecommunications apparatus, comprising:

a portable telephone having an interface; and an interface module removably connected to said portable telephone along one and only one surface of said portable telephone, said interface module comprising:

a first interface removably connected to said portable telephone interface;

a second interface, coupled to said first interface for facilitating a direct physical and electrical connection to a computer interface;

a protective case enclosing said first and second interfaces; and an attachment mechanism, adjacent first interface, for securing said interface module to said portable telephone when said first interface is connected to said interface on said portable telephone.

\* \* \* \* \*